United States Patent [19]
Tateyama

[11] Patent Number: 6,018,816
[45] Date of Patent: Jan. 25, 2000

[54] INFORMATION PROCESSING SYSTEM AND METHOD, IMAGE PROCESSING SYSTEM AND METHOD, INFORMATION PROCESSING APPARATUS AND COMPUTER READABLE MEMORY

[75] Inventor: Jiro Tateyama, Yokohama, Japan

[73] Assignee: Canon Kabushiki Kaisha, Tokyo, Japan

[21] Appl. No.: 09/053,747

[22] Filed: Apr. 2, 1998

[30] Foreign Application Priority Data

Apr. 4, 1997 [JP] Japan ................................. 9-087064
May 6, 1997 [JP] Japan ................................. 9-115831

[51] Int. Cl.[7] .............................. G06F 11/00; H04L 1/08; H04N 1/40; H04N 1/46
[52] U.S. Cl. .......................... 714/746; 714/822; 358/462; 358/502
[58] Field of Search ..................................... 714/746, 748, 714/749, 750, 751, 822, 5, 18, 712, 713; 364/265, 265.1, 265.2, 944.5, 945.5; 358/502, 504, 406, 462

[56] References Cited

U.S. PATENT DOCUMENTS

| | | | |
|---|---|---|---|
| 5,731,882 | 3/1998 | Kawamura | 358/426 |
| 5,802,059 | 9/1998 | Hayashi | 370/429 |
| 5,844,918 | 12/1998 | Kato | 714/751 |
| 5,845,152 | 12/1998 | Anderson et al. | 710/52 |

*Primary Examiner*—Trinh L. Tu
*Attorney, Agent, or Firm*—Fitzpatrick, Cella, Harper & Scinto

[57] ABSTRACT

A system comprising devices connected via a 1394 serial bus solves a problem that if omission of data packet occurs in isochronous transfer capable of high-speed data transfer, only data without the omitted data packet is sent to a transfer destination. A recording/reproduction device 101 repeatedly sends image data stored in a storage medium by the isochronous transfer, and a printer 102 receives the image data repeatedly sent by the isochronous transfer. If a data packet has been omitted in the received data, the omitted data packet is obtained from the data repeatedly sent by the isochronous transfer, thus the printer 102 can print an image based on the complete image data.

59 Claims, 47 Drawing Sheets

CLOCK : EXCLUSIVE-OR SIGNAL BETWEEN DATA AND STROBE

BRANCH : NODE WITH TWO OR MORE NODE CONNECTIONS

LEAF : NODE WITH SINGLE PORT CONNECTION

□ : PORT
c : PORT CORRESPONDING TO CHILD NODE
p : PORT CORRESPONDING TO PARENT NODE

FIG. 15B

| ABBREVIATION | NAME | CONTENT |
|---|---|---|
| destination_ID | destination identifier | ID OF DESTINATION NODE (ASYNCHRONOUS ONLY) |
| t ℓ | transaction label | LABEL INDICATING A SERIES OF TRANSACTIONS (ASYNCHRONOUS ONLY) |
| rt | retry code | CODE INDICATING RETRANSMISSION STATUS (ASYNCHRONOUS ONLY) |
| tcode | transaction code | CODE INDICATING PACKET TYPE (ASYNCHRONOUS ONLY) |
| pri | priority | PRIORITY ORDER (ASYNCHRONOUS ONLY) |
| source_ID | source identifier | SOURCE NODE (ASYNCHRONOUS ONLY) |
| destination_offset | destination memory address | MEMORY ADDRESS OF DESTINATION NODE (ASYNCHRONOUS ONLY) |
| rcode | response code | RESPONSE STATUS (ASYNCHRONOUS ONLY) |
| quadiet_data | quadiet(4bytes) data | 4-BYTE LENGTH DATA (ASYNCHRONOUS ONLY) |
| data_length | length of data | LENGTH OF data_field (EXCEPT pad bytes) |
| extended_tcode | extended transaction code | EXTENDED TRANSACTION CODE (ASYNCHRONOUS ONLY) |
| chanel | isochronous identifier | IDENTIFICATION OF ISOCHRONOUS PACKET |
| sy | synchronization code | SYNCHRONIZATION OF VIDEO IMAGE AND AUDIO INFORMATION |
| cycle_time_data | contents of the CYCLE_TIME register | CYCLE TIMER REGISTER VALUE OF CYCLE MASTER NODE (CYCLE PACKET ONLY) |
| data_field | data + pad bytes | DATA STORAGE (ISOCHRONOUS AND ASYNCHRONOUS) |
| header_CRC | CRC for header field | CRC FOR HEADER |
| data_CRC | CRC for data field | CRC FOR DATA |
| tag | tag label | ISOCHRONOUS PACKET FORMAT |

FIG. 17
CSR CORE REGISTER

| OFFSET (hexadecimal) | REGISTER NAME | FUNCTION |
|---|---|---|
| 000 | STATE_CLEAR | INFORMATION ON STATUS AND CONTROL |
| 004 | STATE_SET | INFORMATION ON WRITE ENABLE/DISABLE STATUS OF STATE_CLEAR |
| 008 | NODE_IDS | BUS ID + NODE ID |
| 00C | RESET_START | TO RESET BUS BY WRITING INTO THIS AREA |
| 010~014 | INDIRECT_ADDRESS, INDIRECT_DATA | REGISTER TO ACCESS ROM AREA GREATER THAN 1KB |
| 018~01C | SPLIT_TIMEOUT | TIMER VALUE TO DETECT TIME-OUT OF SPLIT TRANSACTION |
| 020~02C | ARGUMENT, TEST_START, TEST_STATUS | REGISTER FOR DIAGNOSIS |
| 030~04C | UNITS_BASE, UNITS_BOUND, MEMORY_BASE, MEMORY_BOUND | NOT INSTALLED IN IEEE 1394 |
| 050~054 | INTERRUPT_TARGET, INTERRUPT_MASK | REGISTER OF INTERRUPTION NOTIFICATION |
| 058~07C | CLOCK_VALUE, CLOCK_TICK_PERIOD, CLOCK_STOROBE_ARRIVED, CLOCK_INFO | NOT INSTALLED IN IEEE 1394 |
| 080~0FC | MESSAGE_REQUEST, MESSAGE_RESPONSE | REGISTER FOR MESSAGE NOTIFICATION |
| 100~17C | | RESERVATION |
| 180~1FC | ERROR_LOG_BUFFER | TO RESERVE FOR IEEE 1394 |

FIG. 18
SERIAL BUS REGISTER

| OFFSET (hexadecimal) | REGISTER NAME | FUNCTION |
|---|---|---|
| 200 | CYCLE_TIME | COUNTER FOR ISOCHRONOUS TRANSFER |
| 204 | BUS_TIME | REGISTER FOR TIME SYNCHRONIZATION |
| 208 | POWER_FAIL_IMMINENT | REGISTER RELATING TO POWER SUPPLY |
| 20C | POWER_SOURCE | |
| 210 | BUSY_TIMEOUT | TO CONTROL RETRY IN TRANSACTION LAYER |
| 214~218 | | RESERVATION |
| 21C | BUS_MANAGER_ID | NODE ID OF BUS MANAGER |
| 220 | BANDWIDTH_AVAILABLE | TO MANAGE ISOCHRONOUS TRANSFER BAND |
| 224~228 | CHANNELS_AVAILABLE | TO MANAGE CHANNEL NUMBER FOR ISOCHRONOUS TRANSFER |
| 22C | MAINT_CONTROL | REGISTER FOR DIAGNOSIS |
| 230 | MAINT_UTILITY | |
| 234~3FC | | RESERVATION |

FIG. 19

SERIAL-BUS NODE RESOURCE REGISTER

| OFFSET (hexadecimal) | REGISTER NAME | FUNCTION |
|---|---|---|
| 800~FFC | | RESERVATION |
| 1000~13FC | TOPOLOGY-MAP | INFORMATION ON SERIAL BUS STRUCTURE |
| 1400~1FFC | | RESERVATION |
| 2000~2FFC | SPEED-MAP | INFORMATION ON TRANSFER SPEED OF SERIAL BUS |
| 3000~FFFC | | RESERVATION |

FIG. 20

MINIMUM FORMAT CONFIGURATION ROM

| 01 | VENDOR ID |
|---|---|

FIG. 21

GENERAL FORMAT CONFIGURATION ROM

| LENGTH OF bus_info_block | LENGTH OF ROM | CRC |
|---|---|---|
| bus_info_block (ASCII CODE OF 1394 BUS AND INFORMATION ON WHETHER OR NOT NODE HAS CAPABILITIES OF ISOCHRONOUS RESOURCE MANAGEMENT, CYCLE MASTER, AND BUS MANAGEMENT) | | |
| root_directory (INDICATE VENDOR ID AND NODE FUNCTION) | | |
| unit_directories (INDICATE UNIT TYPE AND DRIVER SOFT VERSION) | | |
| root & unit_leaves | | |
| vendor_dependent_information | | |

FIG. 26

AV/C COMMAND FRAME

| 0000 | ctype | subunit_type | subunit ID | opcode | operand [0] |
|------|-------|--------------|------------|--------|-------------|
| operand [1] | | operand [2] | | operand [3] | operand [4] |
| operand [n] | | | zero pad bytes (if necessary) | | |

TRANSMITTED FIRST → TRANSMITTED LAST

FIG. 27

AV/C RESPONSE FRAME

| 0000 | response | subunit_type | subunit ID | opcode | operand [0] |
|------|----------|--------------|------------|--------|-------------|
| operand [1] | | operand [2] | | operand [3] | operand [4] |
| operand [n] | | | zero pad bytes (if necessary) | | |

TRANSMITTED FIRST → TRANSMITTED LAST

FIG. 30

| SID | DBS | FN | QPC | SPH | rsv | DBC |
|---|---|---|---|---|---|---|
| 0 | | | | | | |

CIP HEADR

| FMT | FDF |
|---|---|
| 10 | |

FIG. 34

YUV (4:2:2) 16 BITS PIXEL
720 × 480 PIXELS DATA FORMAT

LINE 0

| U (0, 0) | Y (0, 0) | V (0, 0) | Y (1, 0) |
|---|---|---|---|
| U (2, 0) | Y (2, 0) | V (2, 0) | Y (3, 0) |
| U (4, 0) | Y (4, 0) | V (4, 0) | Y (5, 0) |
| U (6, 0) | Y (6, 0) | V (6, 0) | Y (7, 0) |
| ⋮ | ⋮ | ⋮ | ⋮ |
| U (718, 0) | Y (718, 0) | V (718, 0) | Y (719, 0) |

LINE 1

| U (0, 1) | Y (0, 1) | V (0, 1) | Y (1, 1) |
|---|---|---|---|
| U (2, 1) | Y (2, 1) | V (2, 1) | Y (3, 1) |
| ⋮ | ⋮ | ⋮ | ⋮ |
| U (718, 1) | Y (718, 1) | V (718, 1) | Y (719, 1) |

LINE 479

| U (0, 479) | Y (0, 479) | V (0, 479) | Y (1, 479) |
|---|---|---|---|
| U (2, 479) | Y (2, 479) | V (2, 479) | Y (3, 479) |
| ⋮ | ⋮ | ⋮ | ⋮ |
| U (718, 479) | Y (718, 479) | V (718, 479) | Y (719, 479) |

FIG. 35

RGB 24 BITS PIXEL
720 × 480 PIXELS DATA FORMAT

LINE 0

| R (0, 0) | G (0, 0) | B (0, 0) | R (1, 0) |
|---|---|---|---|
| G (1, 0) | B (1, 0) | R (2, 0) | G (2, 0) |
| B (2, 0) | R (3, 0) | G (3, 0) | B (3, 0) |
| R (4, 0) | G (4, 0) | B (4, 0) | R (5, 0) |
| ⋮ | ⋮ | ⋮ | ⋮ |
| B (718, 0) | R (719, 0) | G (719, 0) | B (719, 0) |

LINE 1

| R (0, 1) | G (0, 1) | B (0, 1) | R (1, 1) |
|---|---|---|---|
| G (1, 1) | B (1, 1) | R (2, 1) | G (2, 1) |
| ⋮ | ⋮ | ⋮ | ⋮ |
| B (718, 1) | R (719, 1) | G (719, 1) | B (719, 1) |

⋮

LINE 479

| R (0, 479) | G (0, 479) | B (0, 479) | R (1, 479) |
|---|---|---|---|
| G (1, 479) | B (1, 479) | R (2, 479) | G (2, 479) |
| ⋮ | ⋮ | ⋮ | ⋮ |
| B (718, 479) | R (719, 479) | G (719, 479) | B (719, 479) |

INFORMATION PROCESSING SYSTEM AND METHOD, IMAGE PROCESSING SYSTEM AND METHOD, INFORMATION PROCESSING APPARATUS AND COMPUTER READABLE MEMORY

BACKGROUND OF THE INVENTION

1. Field of the Invention

The present invention relates to information processing system and method, image processing system and method, processing apparatus and computer readable memory, and more particularly, to information processing system and image processing system comprising a plurality of devices interconnected by a serial bus capable of isochronous transfer, and methods thereof, and information processing apparatus.

2. Description of Related Art

An image processing system constructed by connecting digital devices such as an image scanner, a digital still camera and a digital video camera to a personal computer (PC) is known. In this system, video data inputted from the respective digital devices is temporarily stored in a hard disk or the like on the PC, then converted by an application software program which operates on the PC into print data, and printing is performed based on the print data by a printer.

In the above system, the PC has driver software programs for controlling the respective digital devices, the printer and the like. The video data inputted from the digital devices is converted by the drivers into video data in a format which can be easily processed and displayed on the PC, and stored in the hard disk or the like.

When printing is performed based on the stored video data, the application program performs image processing on the video data such that an appropriate processing result can be obtained between the input device and the output device of the video data, and the printer performs printing.

However, the PC is already connected to a number of peripheral devices as well as the image scanner, the digital still camera, the digital video camera and the printer, as described above. The number of types of peripheral devices will increase, and further, by improvement of interfaces and the like, a number of audio visual (AV) devices and the like as well as the PC peripheral devices may be connected on one network.

The development of peripheral devices will be of great advantage to PC users, however, it may increase the amount of data communication among the respective devices, which may increase traffic on the network.

For example, in image printing, if the printing is continued or performed at a high speed, the data communication between the PC and the printer may influence the overall network and a server, and as a result, a desired image cannot be normally printed or the image printing may be delayed. That is, the heavy traffic on the network disturbs processing by the PC, or reduces the data communication speed.

Especially, in a network where the priority order of communication data can be set by using asynchronous transfer mode (ATM) or the like, if the traffic on the network is heavy, the speed of communication treating data at a lower position in the priority order is extremely lowered.

On the other hand, as isochronous transfer which can send data of a necessary amount within a predetermined period is used for realtime data transfer, if omission of a data packet occurs on the network, the data received by the communication destination side lacks the omitted data packet, therefore, there is a problem in data re-transmission.

Furthermore, in systems of this kind, the video data from the digital device is saved as data having a format that is easiest for the PC to use and easiest for the PC to display. When the data is to be printed, printing data is created by execution of appropriate image processing between input and output units in dependence upon the state of the saved image.

The print data includes control commands and image data decided by printer emulation (e.g., ESC/P, PostScript, etc.) supported by the particular printer. With conventional interfaces, the speed at which data is transmitted between devices is not that high but the print data is compressed as by software processing to reduce the quantity of data, thereby making it possible to achieve satisfactory printing speed.

Printers are now required to have sufficient buffer capacity for performing a data processing function based upon emulation and for saving and processing data. The result is that printers have a hardware structure of greater complexity.

Further, modern printers must handle a greater quantity of image data, which is sent to the printer from the host, owing to an improvement in the printing resolution of such printers. Moreover, it is required that this large quantity of image data be transmitted at higher speed in view of the higher printing speed of these printers. A disadvantage of these printers is a rise in printer cost brought about by the need to satisfy these requirements.

Data transfer between a host and a printer is now being performed using a serial bus in accordance with IEEE 1394. However, with isochronous transmission using this serial bus, it is necessary to send data constantly in real-time even when correct data cannot be transmitted owing to the occurrence of error packets. Consequently, processing for sending an error response back to the transmitting source at a synchronized timing cannot be supported. In other words, there is no method of dealing with loss of image data that occurs during printing.

SUMMARY OF THE INVENTION

The present invention has its object to perform high-speed data transfer by isochronous transfer, and if abnormal portion such as omission of data packet occurs, to correct the abnormal portion, in information processing system and image processing system comprising a plurality of devices interconnected by a serial bus capable of isochronous transfer, and methods thereof, information processing apparatus and computer readable memory.

According to the present invention, the foregoing object is attained by providing an information processing system having devices connected by a serial bus which is capable of isochronous transfer, the system comprising: supply means for repeatedly transmitting data stored in a storage medium by the isochronous transfer; and reception means for receiving the data transmitted by the isochronous transfer; wherein if the data received by the reception means includes an abnormal portion, the reception means corrects the abnormal portion by using the data repeatedly transmitted by the isochronous transfer.

Further, the foregoing object is attained by providing an information processing system having devices connected by a serial bus which is capable of isochronous transfer, the system comprising: supply means for repeatedly transmitting data stored in a storage medium by the isochronous transfer; reception means for receiving the data transmitted by the isochronous transfer; and output means for outputting the data received by the reception means to a printer, wherein the reception means receives the data repeatedly transmitted by the isochronous transfer by the supply means, in a unit corresponding to a capability of the printer.

Further, the foregoing object is attained by providing an image processing system having devices connected by a serial bus which is capable of isochronous transfer, the system comprising: supply means for repeatedly transmitting image data stored in a storage medium by the isochronous transfer; reception means for receiving the image data transmitted by the isochronous transfer; and formation means for forming a visual image on a printing medium based on the image data received by the reception means, wherein if the image data received by the reception means includes an abnormal portion, the reception means corrects the abnormal portion by using the image data repeatedly transmitted by the isochronous transfer.

Further, the foregoing object is attained by providing an information processing apparatus connected to at least one device through a serial bus which is capable of isochronous transfer, the apparatus comprising: reception means for receiving data repeatedly transmitted by the isochronous transfer; and correction means for, if the data received by the reception means includes an abnormal portion, correcting the abnormal portion by using the data repeatedly transmitted by the isochronous transfer.

Further, the foregoing object is attained by providing an information processing apparatus connected to at least one device through a serial bus which is capable of isochronous transfer, the apparatus comprising: reception means for receiving data repeatedly transmitted by the isochronous transfer; and output means for outputting the data received by the reception means to a printer, wherein the reception means receives the data repeatedly transmitted by the isochronous transfer, in a unit corresponding to a capability of the printer.

Another object of the present invention is to provide a data communication method and apparatus, a printing apparatus and a printing system which includes the printing apparatus, wherein print data transmitted from a host is printed while making up for any loss of data.

Another object of the present invention is to provide a data communication method and apparatus, a printing apparatus and a printing system which includes the printing apparatus, wherein high-speed printing can be performed without requiring that the printing apparatus have a large-capacity print buffer.

A further object of the present invention is to provide a data communication method and apparatus, a printing apparatus and a printing system which includes the printing apparatus, wherein if an error develops in print data, it is possible to recover from the error efficiently so that printing can be performed at high speed.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15B is a table showing the details of packet format fields for the isochronous transfer in a 1394 serial bus;

FIG. 17 is a table showing functions of a CSR architecture of the 1394 serial bus;

FIG. 18 is a table showing registers for the 1394 serial bus;

FIG. 19 is a table showing registers for node resources of the 1394 serial bus;

FIG. 20 is an example of a minimum format of a configuration ROM of the 1394 serial bus;

FIG. 21 is an example of a general format of the configuration ROM of the 1394 serial bus;

FIG. 26 is an example of the structure of an AV/C command frame;

FIG. 27 is an example of the structure of an AV/C response frame;

FIG. 30 is a schematic view showing a CIP header;

FIG. 34 is a table showing the structure of image data for one frame of non-compressed format in YUV (4:2:2) representation;

FIG. 35 is a table showing the structure of image data for one frame of non-compressed format in RGB representation;

DETAILED DESCRIPTION OF THE PREFERRED EMBODIMENTS

Figure 1A:
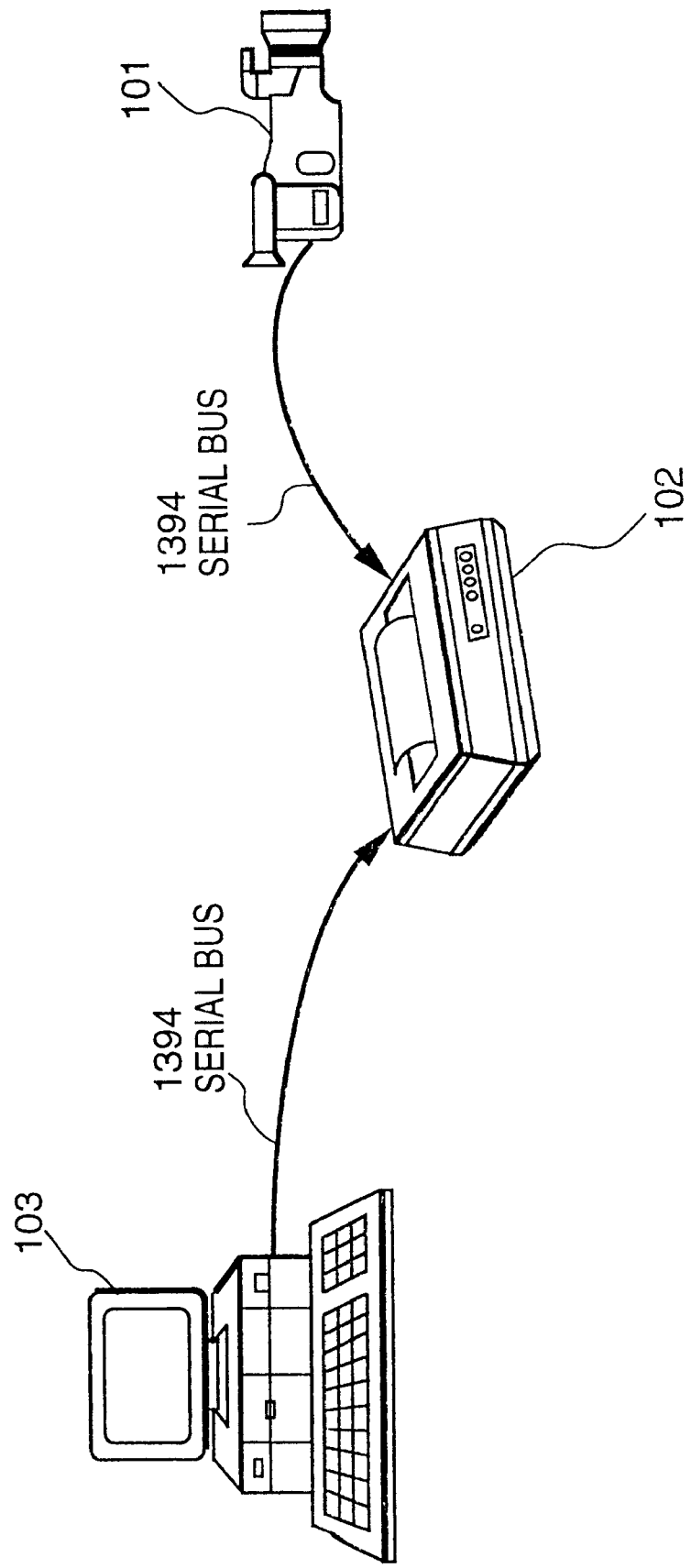
FIG. 1A is an explanatory view showing a general construction of a system to which the present invention is applied.

Hereinbelow, an image processing system according to an embodiment of the present invention will be described in detail in accordance with the accompanying drawings. FIG. 1A shows an example of general construction of a system to which the present invention is applied, where a PC 103, a printer 102 and a digital video camera 101 are connected by an IEEE 1394 serial bus. Then, the outline of the 1394 serial bus will be described below.

[Outline of 1394 Serial Bus]

With the appearance of general digital video cam recorder (VCR) and digital video disk (DVD) player, there is a need for transferring realtime and large amount data such as video data and audio data (hereinafter referred to as "AV data"). To transfer AV data in realtime to a personal computer (PC) or other digital devices, an interface capable of high-speed data transfer is required. From the above point, the IEEE 1394-1995 (High Performance Serial Bus) (Hereinafter referred to as "1394 serial bus") has been developed.

Figure 1B:
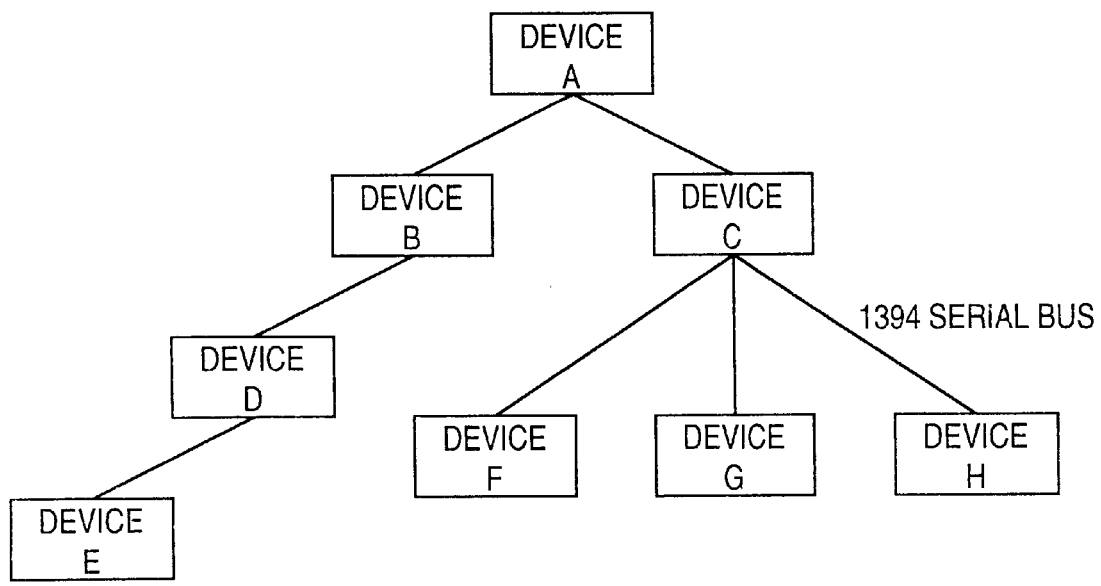
FIG. 1B is a block diagram showing an example of a network system constructed with an IEEE 1394 serial interface.

FIG. 1B shows an example of a network system constructed with a 1394 serial bus. This system comprises devices A to H, and the devices A and B, the devices A and C, the devices B and D, the devices D and E, the devices C and F, the devices C and G, and the device C and H are respectively connected by a twisted pair cable for the 1394 serial bus. These devices A to H may be computers such as a personal computer, or most computer-peripheral devices such as a digital VCR, a DVD player, a digital still camera, a storage device using a storage medium such as a hard disk or an optical disk, a monitor such as a CRT or an LDC, a tuner, an image scanner, a film scanner, a printer, a MODEM, and a terminal adapter (TA).

Note that the printing method of the printer may be any method, e.g., a laser-beam printing, an electrophotographic method using an LED, an ink-jet method, a thermal-transfer method of ink melting or ink sublimation type and a thermo-sensitive printing method.

The connection between the devices may be made by mixedly using a daisy chain method and a node branching method, thus realizing high freedom of connecting. The respective devices have an ID, and they construct a network by identifying each ID within a range connected by the 1394 serial bus. For example, the devices respectively take a relaying role only by daisy-chain connecting the devices with cables for the 1394 serial bus, thus constructing a network.

As the 1394 serial bus corresponds to Plug and Play function, it automatically recognizes a device connected to the cable, thus recognizes connection status. In the system as shown in FIG. 1B, when a device is removed from the network, or a new device is added to the network, the bus is automatically reset (i.e., the current network constructing information is reset), and a new network is constructed. This function enables realtime setting and recognition of network construction.

The 1394 serial bus has a data transfer speed defined as 100/200/400 Mbps. A device having a high transfer speed supports a lower transfer speed, thus maintaining compatibility. As data transfer modes, an asynchronous transfer mode (ATM) for transferring asynchronous data such as a control signal, an isochronous transfer mode for transferring isochronous data such as realtime AV data are available. In data transfer, within each cycle (generally 125 ms/cycle), a cycle start packet (CSP) indicating the start of cycle is transferred, and then asynchronous and isochronous data are transferred such that the isochronous data transfer is transferred prior to the asynchronous data.

Figure 2:
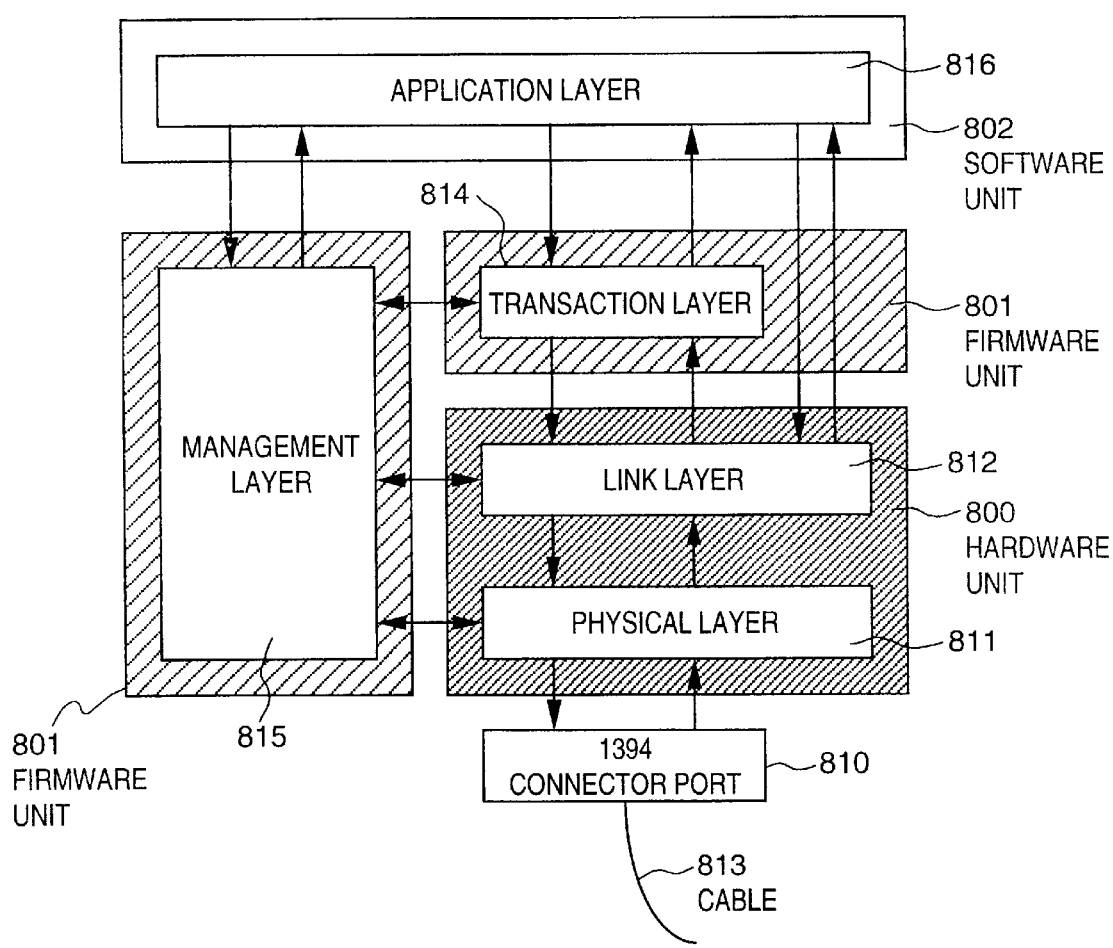
FIG. 2 is a block diagram showing the construction of the IEEE 1394 serial interface.

FIG. 2 shows the construction of the 1394 serial bus, as a layer structure. As shown in FIG. 2, a connector port 810 is connected to a connector at the end of a cable 813 for the 1394 serial bus. A physical layer 811 and a link layer 812 in a hardware unit 800 are positioned as upper layers with respect to the connector port 810. The hardware unit 800 comprises interface chips. The physical layer 811 performs coding, connection-related control and the like, and the link layer 812, packet transfer, cycle-time control and the like.

In a firmware unit 801, a transaction layer 814 manages data to be transferred (transaction data), and outputs commands Read, Write and Lock. A management layer 815 in the firmware unit 801 manages connection statuses and ID's of the respective devices connected to the 1394 serial bus, thus manages the network construction. The above hardware and firmware units substantially constructs the 1394 serial bus.

In a software unit 802, an application layer 816 differs in software used by the system, and the data transfer protocol indicating how to transfer data on the interface is defined by a protocol such as a printer protocol or an AVC protocol.

Figure 3:
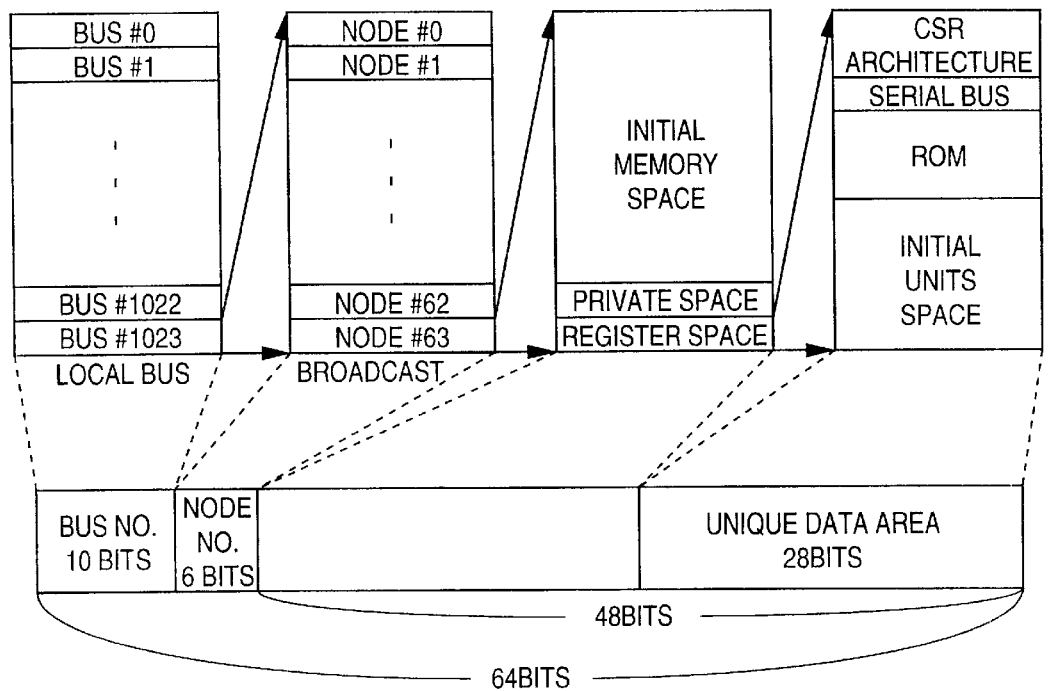
FIG. 3 is an explanatory view showing address space of the IEEE 1394 serial interface.

FIG. 3 shows address space of the 1394 serial bus. All the devices (nodes) connected to the 1394 serial bus have a unique 64 bit address. The 64 bit address is stored in a memory of the devices. Data communication with a designated destination device can be performed by always recognizing the node addresses of the transmitting- and receiving-side nodes.

Addressing of the 1394 serial bus is made based on the IEEE 1212 standards, such that first 10 bits are allocated for designating a bus number, then next 6 bits are allocated for designating an node ID.

48-bit address used in the respective devices are divided into 20 bits and 28 bits, and utilized in the unit of 256 Mbytes. In the initial 20-bit address space, "0" to "0xFFFFD" is called a memory space; "0xFFFFE", a private space; "0xFFFFF", a register space. The private space is an address freely used in the device. The register space, holding information common to the devices connected with the bus, is used for communication among the respective devices.

In the register space, the initial 512 bytes are assigned to a register core (CSR core) as a core of a Command/Status Register (CSR) architecture; the next 512 bytes, to a register of the serial bus; the next 1024 bytes, to a configuration ROM; and the remaining bytes, to a register unique to the device in a unit space.

Generally, for the sake of simplification of bus system design for different node types, it is preferable that only the initial 2048 bytes are used for the nodes, and as a result, total 4096 bytes are used including the initial 2048 bytes for the CSR core, the register of the serial bus, the configuration ROM and the unit space.

The 1394 serial bus has the construction as described above. Next, the features of the 1394 serial bus will be described in more detail.

[Electrical Specification of 1394 Serial Bus]

Figure 4:
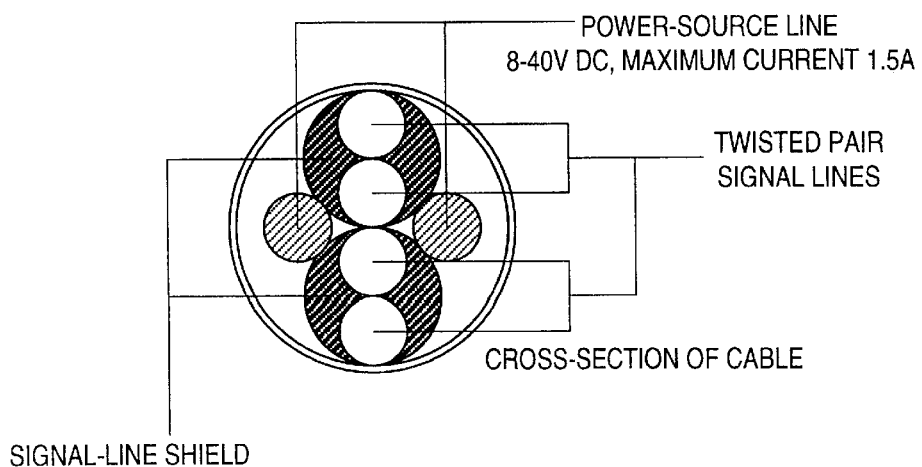
FIG. 4 is a cross-sectional view showing a cable for the IEEE 1394 serial interface.

FIG. 4 shows a cross-section of the cable of the 1394 serial bus. The 1394 serial cable comprises two sets of twisted pair signal lines and two power-source lines. This construction enables power supply to a device which lacks a power source, or a device where a voltage is degraded due to a failure or the like. The direct-current voltage supplied by the power-source lines is 8 to 40 V; the current is maximum 1.5 A. Note that in the standards for so-called DV cable, four lines except the power-source line construct the cable.

[DS-Link]

Figure 5:
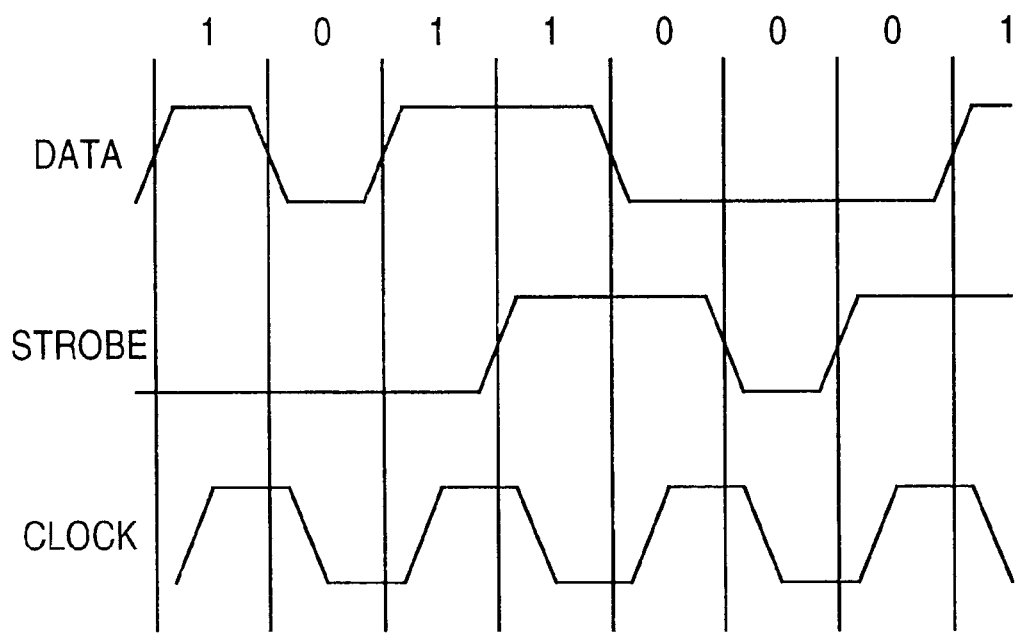
FIG. 5 is a timing chart explaining a Data/Strobe Link method.

FIG. 5 is a timing chart explaining a DS-Link (Data/Strobe-Link) method as a data transfer method.

The DS-Link method, appropriate for high-speed serial data communication, requires two sets of two signal lines. That is, one of the two sets of twisted-pair signal lines is used for sending a data signal, and the other one set of twisted-pair signal lines is used for sending a strobe signal. On the receiving side, an EXCLUSIVE-OR between the data signal and the strobe signal is obtained so as to generate a clock signal. In the DS-Link transfer, it is unnecessary to mix a clock signal into a data signal, therefore, transfer efficiency is higher than that in other serial-data transfer methods. Further, as a clock signal is generated from the data signal and the strobe signal, a phase locked loop (PLL) circuit can be omitted, which attains downsizing of the scale of a controller LSI. Further, in the DS-Link transfer, it is unnecessary to send information indicative of idle status when there is no data to be transferred, therefore, a transceiver of each device can be set in a sleep status, which reduces electric consumption.

[Bus-Reset Sequence]

The respective devices (nodes) connected to the 1394 serial bus are provided with a node ID, and are recognized as nodes constructing the network. For example, when increase/decrease of the number of nodes due to connection/disconnection or power ON/OFF status of network devices, i.e., network construction changes and it is necessary to recognize a new network construction, the respective nodes detect the change of network construction, send a bus-reset signal onto the bus, and enter a mode for recognizing the new network construction. The detection of change of network construction is made by detecting change of bias voltage at the connector port 810.

When the bus-reset signal is sent from one node, the physical layer 811 of the respective nodes receives the bus-reset signal, and at the same time, notifies the link layer 812 of the occurrence of bus reset, and forwards the bus-reset signal to the other nodes. When all the nodes have received the bus-reset signal, a bus-reset sequence is started. Note that the bus-reset sequence is started when the cable is attached/detached, or the hardware unit 800 has detected network abnormality or the like. Further, the bus-reset sequence is also started by a direct instruction to the physical layer 811 such as host control by a protocol. As the bus-reset sequence is started, data transfer is suspended during the bus reset, and after the bus reset, the data transfer is restarted in the new network construction.

[Node-ID Determination Sequence]

After the bus reset, the respective nodes start to obtain a node ID so as to construct a new network construction. A general sequence from the bus reset to node-ID determination will be described with reference to the flowcharts of FIGS. 6 to 8.

Figure 6:
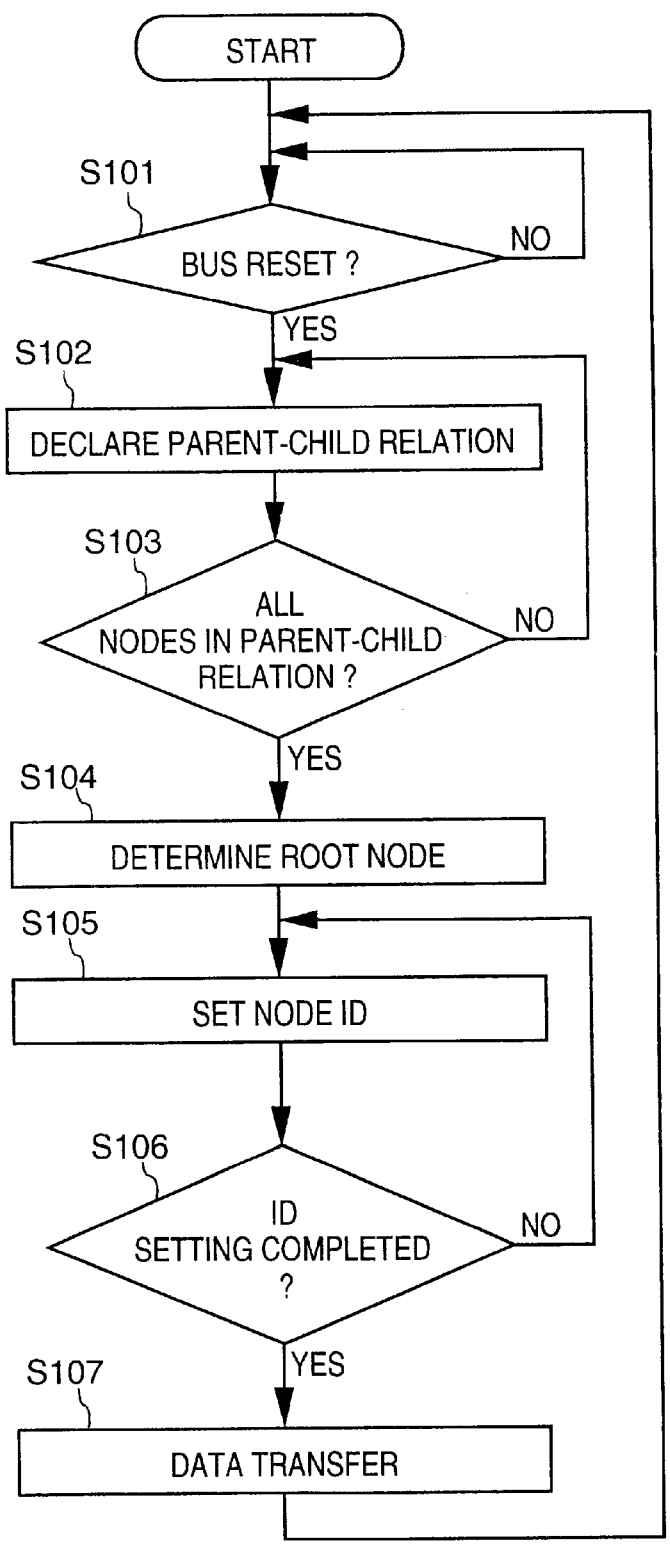
FIGS. 6 to 8 are flowcharts showing a procedure of network construction in the IEEE 1394 serial interface.

FIG. 6 is a flowchart showing a sequence from occurrence of bus-reset signal to node-ID determination and data transfer. At step S101, the respective nodes always monitor occurrence of bus-reset signal. When the bus-reset signal has occurred, the process proceeds to step S102, at which to obtain a new network construction in a state where the network construction has been reset, parent-child relation is declared between nodes connected to each other. Step S102 is repeated until it is determined at step S103 that the parent-child relation has been determined among all the nodes.

As the parent-child relation has been determined, the process proceeds to step S104, at which one "root (node)" is determined. At step S105, node-ID setting is performed so as to provide an ID to the respective nodes. The node-ID setting is made in a predetermined order of the nodes. Step S105 is repeated until it is determined at step S106 that the ID's have been given to all the nodes.

As the node-ID setting has been completed, since the new network construction has been recognized by all the nodes, data transfer among the nodes is possible. At step S107, data transfer is started, and the process returns to step S101, at which occurrence of bus-reset signal is monitored again.

Figure 7:
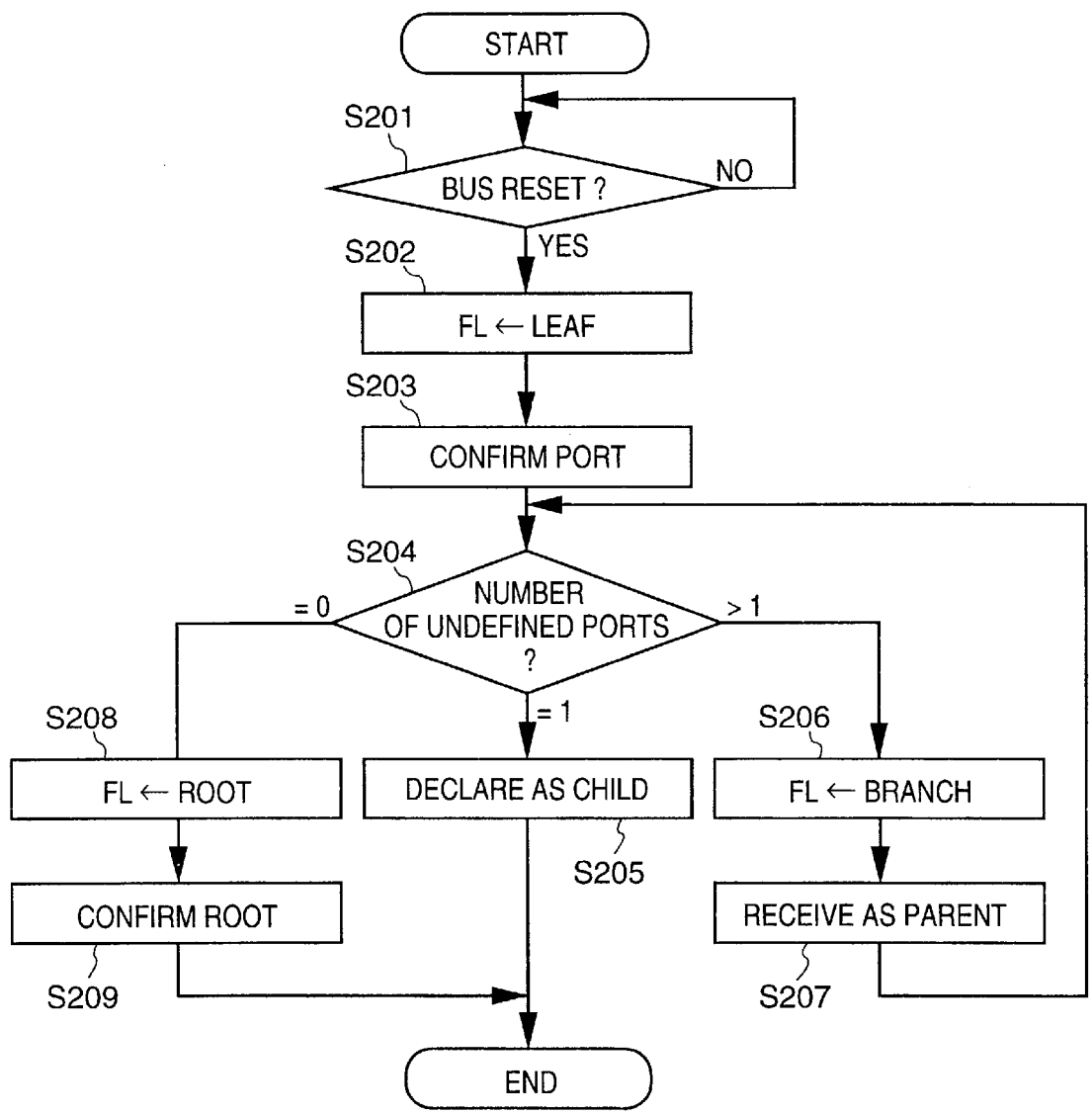
Figure 8:
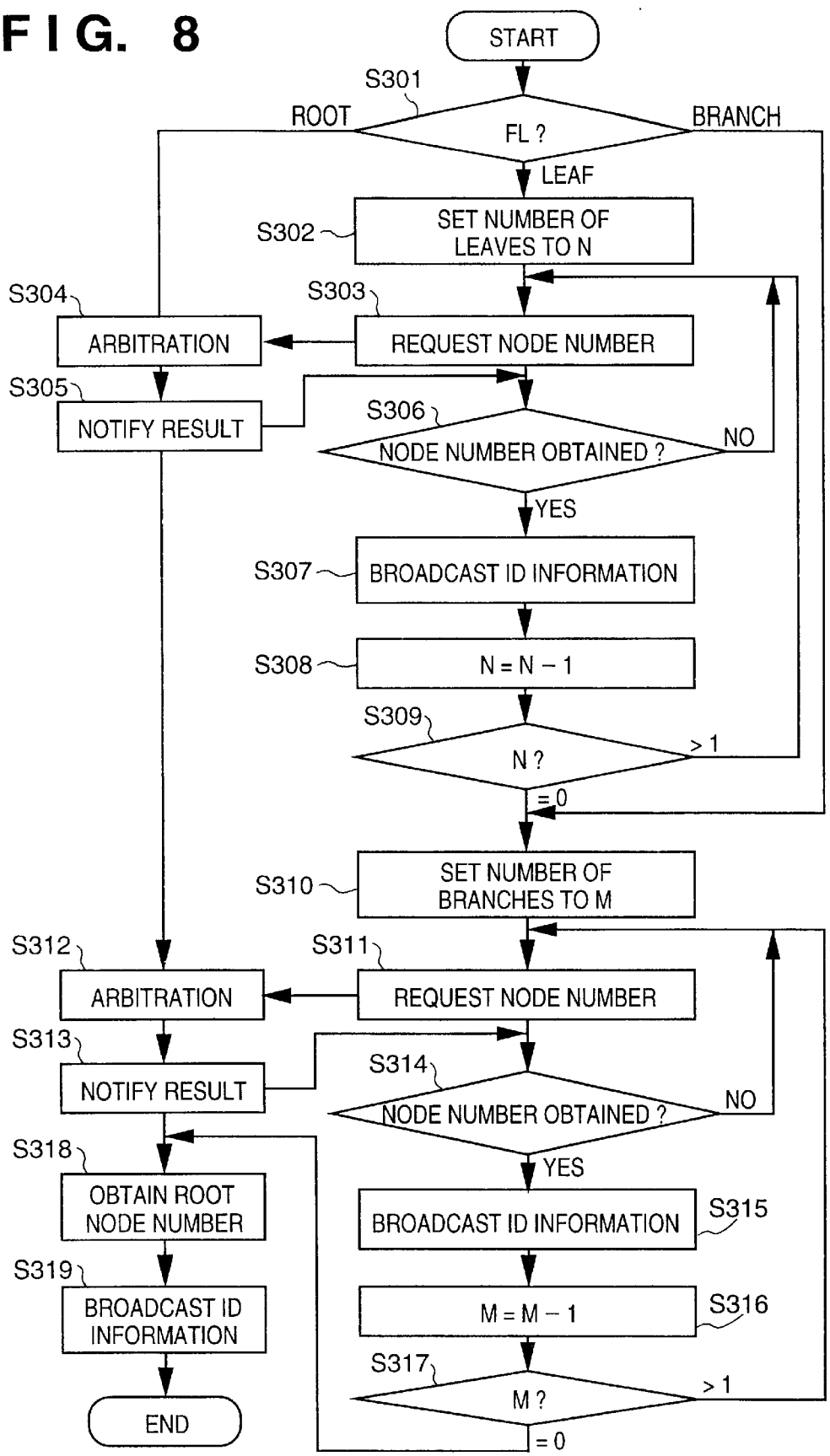

FIG. 7 is a flowchart showing the sequence from the monitoring of bus-reset signal (S101) to the root determination (S104) in detail. FIG. 8 is a flowchart showing the node-ID setting (S105 and S106) in detail.

In FIG. 7, at step S201, the occurrence of bus-reset signal is monitored, and as the bus-reset signal has occurred, the network construction is reset. Next, at step S202, as a first step for re-recognizing the reset network construction, the respective devices reset its flag FL with data indicative of "leaf (node)". At step S203, the respective devices examine the number of ports, i.e., the number of other nodes connected to them. At step S204, based on the result of examination at step S203, the devices examine the number of undefined (i.e., parent-child relation has not been determined) ports. The number of undefined ports is equal to that of the ports immediately after the bus reset, however, with the progress of determination of parent-child relation, the number of undefined ports detected at step S204 decreases.

Only actual leaf(ves) can declare parent-child relation immediately after the bus reset. Whether or not the node is a leaf is detected from the number of ports examined at step S203; i.e., if the number of ports is "1", the node is a leaf. The leaf declares that "this node is a child, and the connected node is a parent" at step S205, then terminates the operation.

On the other hand, a node that detected at step S203 that the number of ports is "two or more" is a "branch". Immediately after the bus reset, as "undefined ports >1" holds, the process proceeds to step S206, at which the flag FL is set with data indicative of "branch", then declaration of parent-child relation from another node is waited at step S207. When the parent-child relation is declared from another node, the process returns to step S204 at which the branch examines the number of undefined ports. If the number of undefined ports is "1", the branch can declare at step S205 that "this node is a child, and the connected node is a parent" to the node connected to the remaining port. If the number of undefined ports is still "two or more", the branch waits for declaration of parent-child relation from another node at step S207.

When any one of the branches (or exceptionally leaf(ves) which delayed declaring a child) detects that the number of undefined ports is "0", the parent-child declaration of the overall network has been completed. The only one node that has "0" undefined port, i.e., the parent of all the nodes, sets the flag FL with data indicative of a "root" at step S208. Then at step S209, the node is recognized as a root.

In this manner, the procedure from the bus reset to the parent-child declaration among all the nodes in the network ends.

Next, a procedure of providing each node with an ID will be described. First, the ID setting is performed at the leaves. Then, ID's are set in numerical order (from node number: 0) from leaves→branches→root.

In FIG. 8, at step S301, the process splits in accordance with node type, i.e., leaf, branch or root, based on the data set at the flags FL.

In case of leaf, at step S302, the number of leaves (natural number) in the network is set to a variable N. At step S303, the respective leaves request a node number to the root. If a plurality of requests have been made, the root performs arbitration at step S304, and provides a node number to one node at step S305, while notifies the other nodes of the result of acquisition of node-number indicating that the node number has been failed.

A leaf that has not obtained a node number (NO at step S306) repeats the request for node number at step S303. On the other hand, a leaf that has obtained a node number notifies all the nodes of the obtained node number by broadcasting ID information including the node number. As the broadcasting of the ID information has been completed, the variable N indicative of the number of leaves is decremented at step S308. Then, from the determination at step S309, the procedure from step S303 to step S308 is repeated until the variable N becomes "0" in the determination at step S309. When ID information on all the leaves have been broadcasted, the process proceeds to step S310, for setting ID's of branches.

The ID setting for branches is performed substantially similar to the ID setting for the leaves. First, at step S310, the number of branches (natural number) is set to a variable M. At step S311, the respective branches request the root for a node number. In response to the requests, the root performs arbitration at step S312, and provides a node number, subsequent to the last leaf node number, to a branch at step S313, while notifies the other branches of the result of acquisition of node-number indicating that the node number has been failed.

A branch that has not obtained a node number (NO at step S314) repeats the request for node number at step S315. On the other hand, a branch that has obtained a node number notifies all the nodes of the obtained node number by broadcasting ID information including the node number. As the broadcasting of the ID information has been completed, the variable M indicative of the number of branches is decremented at step S316. Then, from the determination at step S317, the procedure from step S311 to step S316 is repeated until the variable M becomes "0" in the determination at step S317. When ID information on all the leaves have been broadcasted, the process proceeds to step S318, for setting the ID of the root.

At this time, it is only the root that has not obtained a node ID. At step S318, the root obtains the smallest number that has not been provided to any other node as the node ID of the root, and at step S319, broadcasts ID information on the root.

As described above, the procedure until the node ID's for all the nodes have been set ends. Next, the sequence of node ID determination will be described with reference to the network example shown in FIG. 9.

Figure 9:
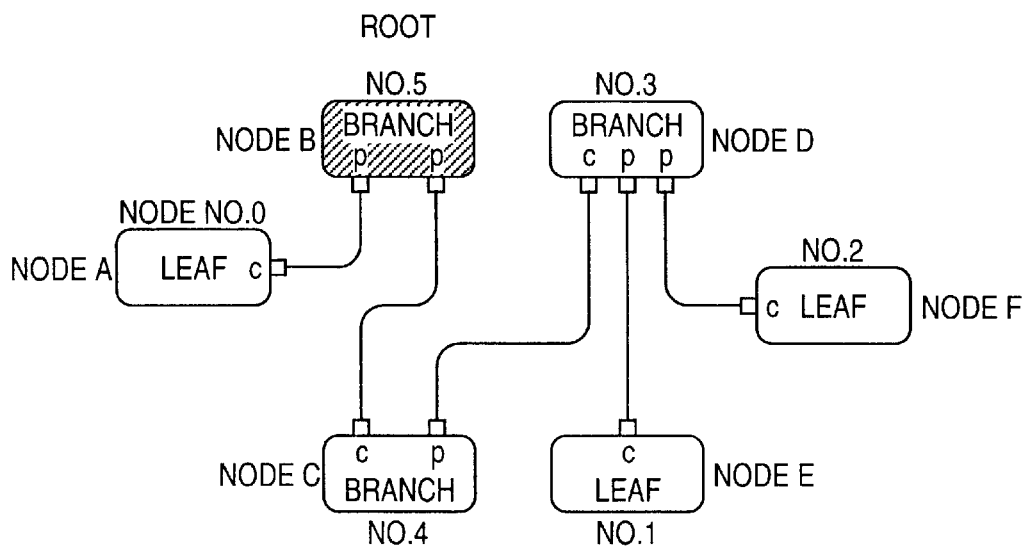
FIG. 9 is a block diagram showing an example of the network.

In the network in FIG. 9, a node B as a root is directly connected to its lower nodes A and C; the node C is directly connected to its lower node D; and the node D is directly connected to its lower nodes E and F. The procedure of determining this hierarchical structure, the root node and the node ID's will be described below.

After the bus reset has occurred, to recognize connection statuses of the respective nodes, parent-child relation is declared between ports of directly connected nodes. "parent" means a node at an upper level and "child" means a node at a lower level in the hierarchical structure. In FIG. 9, the node that first declared parent-child relation after the bus reset is the node A. As described above, nodes (leaves) where only one port is connected can start declaration of parent-child relation. That is, if the number of ports is "1", it is recognized that the node is the end of the network tree, i.e., a leaf. The declaration of parent-child relation is started from the leaf which has first taken action among these leaves. Thus, a port of the leave node is set as a "child", while the port of another node connected to the leave node is set as a "parent". In this manner, "child-parent" relation is sequentially set between the nodes A and B, between the nodes E and D, and between the nodes F and D.

Further, among upper nodes having a plurality of ports, i.e., branches, parent-child relation is sequentially declared with respect to upper node(s), from the node that first received declaration of parent-child relation from the leaf. In FIG. 9, first parent-child relation is determined between the nodes D and E and between the nodes D and F. Then the node D declares parent-child relation with respect to the node C, and as a result, a relation "child-parent" is set between the nodes D and C. The node C, that has received the declaration of parent-child relation from the node D, declares parent-child relation with respect to the node B connected to the other port, thus "child-parent" relation is set between the nodes C and B.

In this manner, the hierarchical structure as shown in FIG. 9 is constructed. The node B, that has finally become the parent at all the ports, is determined as a root. Note that a network has only one root. In a case where the node B that has received declaration of parent-child relation from the node A immediately declares parent-child relation with respect to another node, the other node, e.g., the node C, may be the root node. That is, any node may be a root depending upon timing of transmitting declaration of parent-child relation, and further, even in a network maintaining the same construction, a particular node is not always become a root.

As the root has been determined, the sequence of determining the respective node ID's is started. Each node has a broadcast function to notify its ID information to all the other nodes. ID information includes a node number, information on a connected position, the number of ports, the number of ports connected to other nodes, information on parent-child relation on the respective ports and the like.

As described above, the assignment of node numbers is started from the leaves. In numerical order, node number=0, 1, 2, . . . is assigned. Then, by the broadcasting of ID information, it is recognized that the node number has been assigned.

As all the leaves have obtained a node number, node numbers are assigned to the branches. Similar to the assignment of node numbers to the leaves, ID information is broadcasted from the branch that received a node number, and finally, the root broadcasts its ID information. Accordingly, the root always has the greatest node number.

Thus, as the ID setting of the overall hierarchical structure has been completed and the network has been constructed, then the bus initialization is completed.

[Control Information for Node Management]

The CSR core as shown in FIG. 3 exists on the register as a basic function of the CSR architecture for node management. FIG. 17 shows the positions and functions of the registers. In FIG. 17, the offset is a relative position from "0xFFFFF0000000.

In the CSR architecture, the register for the serial bus is arranged from "0xFFFFF0000200". FIG. 18 shows the positions and functions of the registers.

Further, information on node resources of the serial bus is arranged from "0xFFFFF0000800". FIG. 19 shows the positions and functions of the registers.

The CSR architecture has a configuration ROM for representing functions of the respective nodes. The configuration ROM has a minimum format and a general format, arranged from "0xFFFFF0000400". As shown in FIG. 20, the minimum format configuration ROM merely shows a vendor ID which is a unique numerical value represented by 24 bits.

As shown in FIG. 21, the general format configuration ROM has information on a node. In this case, the vendor ID in this format is included in a "root_directory". Further, "bus_info_block" and "root&unit_leaves" include unique device number including the vendor ID, represented by 64 bits. The device number is used after network reconstruction by bus reset operation, to continue recognition of the node.

[Serial Bus Management]

As shown in FIG. 2, the protocol of the 1394 serial bus comprises a physical layer 811, a link layer 812 and a transaction layer 814. This provides, as the serial bus management, a basic function for node management and bus resource management, based on the CSR architecture.

Only one node which performs bus management (hereinafter referred to as "bus management node") exists on the same bus, and provides the other nodes on the serial bus with management function which includes cycle master control, performance optimization, power source management, transmission speed management, construction management and the like.

The bus management function briefly divides into a bus manager, an isochronous resource manger and a node control function. The node control is a management function which enables communication among the nodes in the physical layer 811, the link layer 812, the link layer 812, the transaction layer 814 and an application program by the CSR. The isochronous resource manager, which is a management function necessary for isochronous-type data transfer on the serial bus, manages assignment of transfer bandwidth and channel number to isochronous data. For this management, after bus initialization, the bus management node is dynamically selected from nodes having the isochronous resource manager function.

Further, in a construction without a bus management node on the bus, a node having the isochronous resource manager function performs a part of the bus management such as the power source management and cycle master control. Further, the bus management is a management function as service to provide a bus control interface to an application program. The control interface uses a serial-bus control request (SB_CONTROL.request), a serial-bus event control confirmation (SB_CONTROL.confirmation) and a serial-bus event indication (SB_EVENT.indication).

The serial-bus control request is used when an application program requires the bus management node to perform bus reset, bus initialization, representation of bus-status information, and the like. The serial-bus event control confirmation is the result of the serial-bus control request, and is notified from the bus management node to the application for confirmation. The serial-bus event control confirmation is made as notification of an asynchronously-caused event from the bus management node to the application.

[Data Transfer Protocol]

The data transfer by using the 1394 serial bus simultaneously sends isochronous data (isochronous packet) which must be periodically transmitted, and asynchronous data (asynchronous packet) which can be transmitted/received at arbitrary timing, further, ensures realtime transmission of isochronous data. In the data transfer, a bus use right is requested prior to transfer, and bus arbitration is performed to obtain bus use permission.

In the asynchronous transfer, a transmitting node ID and a receiving node ID are sent with transfer data as packet data. The receiving node confirms the receiving node ID, i.e., its node ID, receives the packet, and returns an acknowledge signal to the transmitting node. Thus, one transaction is completed.

In the isochronous transfer, a transmitting node requires an isochronous channel with a transmission speed, and a channel ID is sent with transfer data as packet data. A receiving node confirms a desired channel ID and receives the data packet. The necessary channel number and transmission speed are determined by the application layer 816.

These transfer protocols are defined by the physical layer 811, the link layer 812 and the transaction layer 813. The physical layer 811 performs physical and electrical interface with the bus, automatic recognition of node connection, bus arbitration for a bus use right among nodes, and the like. The link layer 812 performs addressing, data checking, packet transmission/reception and cycle control for isochronous transfer. The transaction layer 814 performs processing relating to asynchronous data. Hereinbelow, the processings in the respective layers will be described.

[Physical Layer]

Next, the bus arbitration in the physical layer 811 will be described. The 1394 serial bus always performs arbitration of bus use right prior to data transfer. The devices connected to the 1394 serial bus respectively relay a signal transferred on the network, thus constructing a logical bus-type network transmitting the signal to all the devices within the network. This necessitates bus arbitration to avoid packet conflict. As a result of bus arbitration, one node can transfer data during a certain period.

Figure 10A:
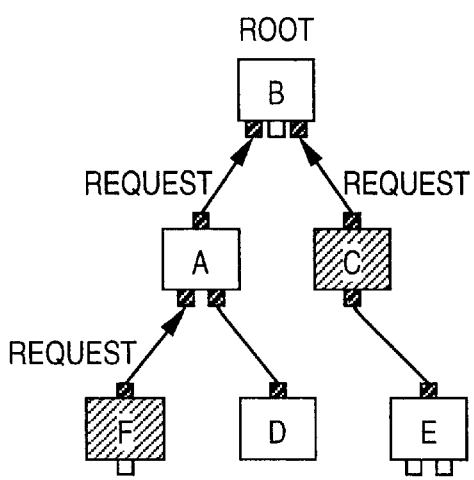
FIGS. 10A and 10B are block diagrams explaining bus arbitration.
Figure 10B:
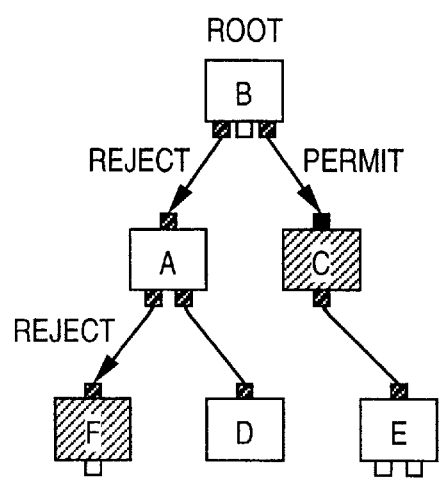

FIGS. 10A and 10B are block diagrams explaining the bus arbitration. FIG. 10A shows operation to request a bus use right; and FIG. 10B, operation to allow to use the bus.

When the bus arbitration is started, a single or plurality of nodes respectively request a bus use right to use the bus to its parent node. In FIG. 10A, the nodes C and F request a bus use right. The parent node (node A in FIG. 10A) that has received the request relays the request by further requesting a bus use right to its parent node. The request is forwarded to a root that finally performs arbitration.

The root that has received the request for bus use right determines a node to be provided with the bus use right. This arbitration can be performed only by the root. The node that dominated in the arbitration is provided with the bus use right. FIG. 10B shows that the node C has obtained the bus use right and the request from the node F has been rejected.

The root sends a DP (data prefix) packet to nodes lost in the bus arbitration so as to notify that their requests have been rejected. The requests from those nodes are held by the next bus arbitration.

Thus, the node that obtained the bus use permission starts data transfer.

Figure 11:
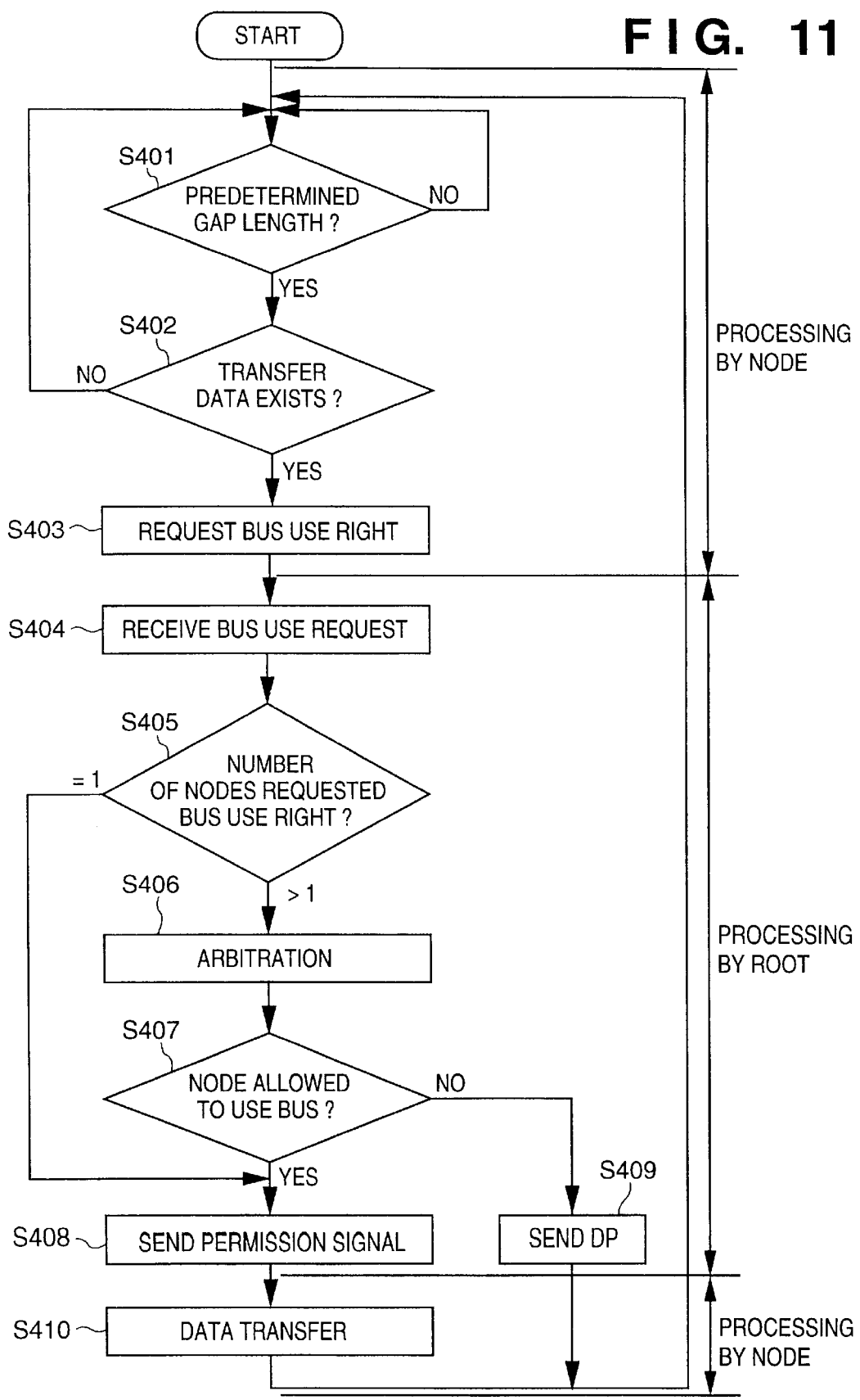
FIG. 11 is a flowchart showing a procedure of the bus arbitration.

The sequence of the bus arbitration will be described with reference to the flowchart of FIG. 11.

To start data transfer by a node, the bus must be in idle status. To confirm that data transfer has been completed and the bus is currently in idle status, each node detects a gap length of a predetermined idle period (e.g., subaction gap) set in each transfer mode, and it determines whether or not the bus is currently in idle status based on the detection result.

At step S401, the node determines whether or not a predetermined gap length corresponding to asynchronous data or isochronous data to be transferred has been detected. So far as the node has not detected the predetermined gap length, it cannot request a bus use right to start data transfer, accordingly, the node waits until the predetermined gap length has been detected.

When the predetermined gap length has been detected at step S401, the node determines whether or not there is data to be transferred at step S402. If YES, it issues a signal requesting a bus use right to the root at step S403. As shown in FIG. 10A, this signal requesting the bus use right is relayed by the respective devices in the network, and forwarded to the root. If it is determined at step S402 that there is no data to be transferred, the process returns to step S401.

At step S404, if the root has received a single or plurality of request signals for the bus use right, it examines the number of nodes requesting the bus use right at step S405. From the determination at step S405, if the number of the nodes requested the bus use right is one, that node is provided with bus use permission immediately after the requirement. On the other hand, if the number of the nodes is more than one, arbitration is performed to determine one node to be provided with the bus use right immediately after the requirement. The arbitration does not always provide a bus use right to the same node, but equally provides a bus use right to the respective nodes (fair arbitration).

The processing at the root branches at step S407 into processing for the node dominated in the arbitration at step S406, and processing for the other nodes lost in the arbitration. In a case where there is one node that requested the bus use right, or one node has dominated in the arbitration, the node is provided with an permission signal indicative of bus use permission at step S408. The node starts data (packet) transfer immediately after it receives the permission signal (step S410). On the other hand, the nodes lost in the arbitration receive a DP (data prefix) packet indicative of rejection of the bus use request at step S409. The processing for the node that received the DP packet returns to step S401 to request a bus use right again. Also, the processing for the node that completed data transfer at step S410 returns to step S401.

[Transaction Layer]

The transaction layer includes a read transaction, a write transaction and a lock transaction.

In a read transaction, an initiator (requiring node) reads data from a specific address in the memory of a target (response node). In a write transaction, the initiator writes data into a specific address of the memory of the target. In a lock transaction, the initiator transfers reference data and update data to the target. The reference data is combined with data of the address of the target, into a designation address to specify a specific address of the target. Data at the designation address is updated by the update data.

Figure 22:
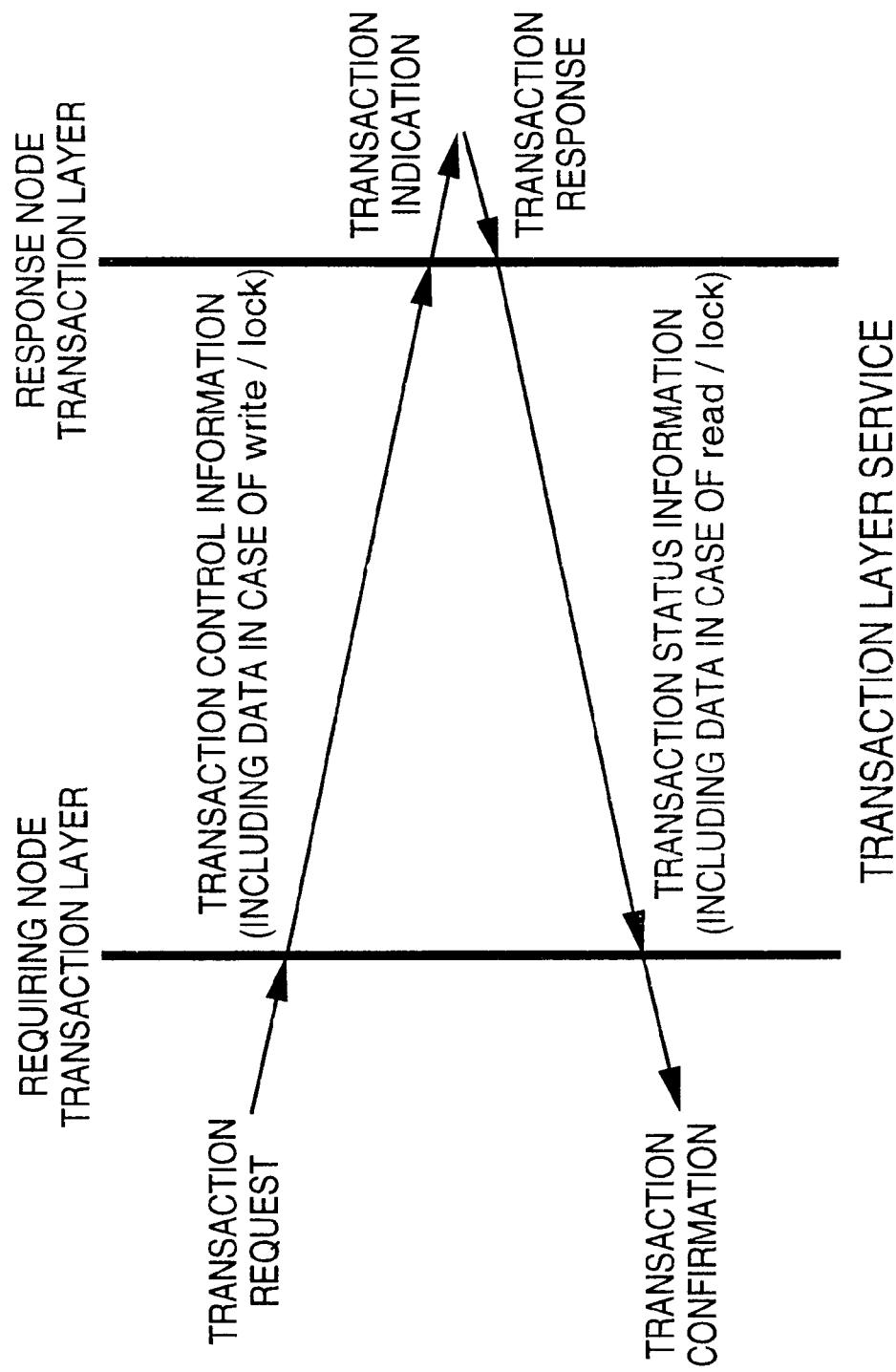
FIG. 22 is a timing chart showing a request-response protocol with read, write and lock commands, based on the CSR architecture in a transaction layer.

FIG. 22 shows a request-response protocol with read, write and lock commands, based on the CSR architecture in the transaction layer. In FIG. 22, the request, notification, response and confirmation are service units in the transaction layer 814.

A transaction request (TR_DATA.request) is packet transfer to a response node; a transaction indication (TR-DATA.indication) is notification of arrival of the request to the response node; a transaction response (TR_DATA.response) is transmission of acknowledgment; and a transaction confirmation (TR_DATA.confirmation) is reception of acknowledgment.

[Link Layer]

Figure 23:
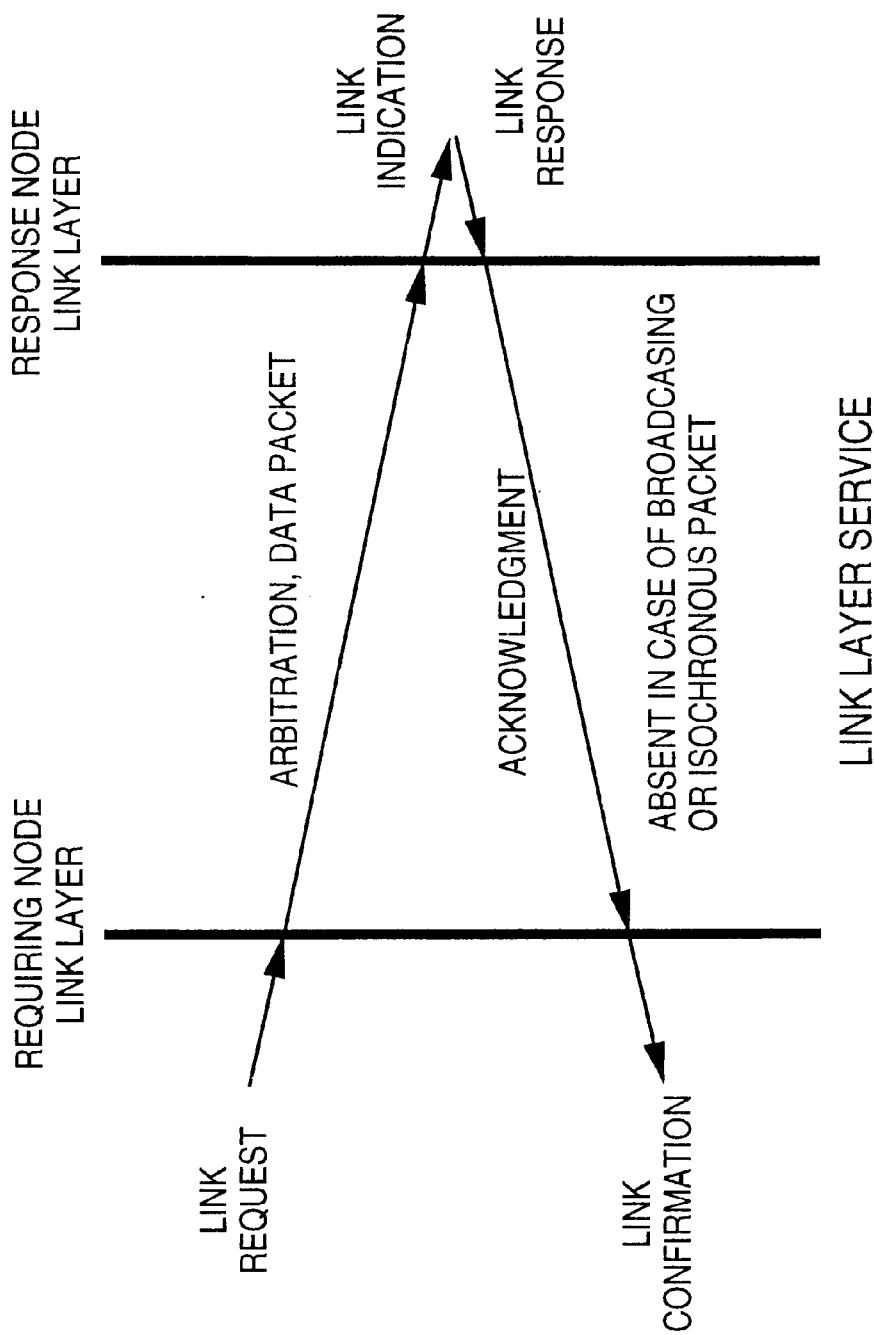
FIG. 23 is a timing chart showing services in a link layer.

FIG. 23 shows services in the link layer 812. The services are service units of a link request (LK_DATA.request) to require packet transfer from the response node, a link indication (LK_DATA.indication) indicating packet reception to the response node, a link response (LK_DATA.response) as acknowledgment transmitted from the response node, a link confirmation (LK_

DATA.confirmation) as confirmation of the acknowledgment transmitted from the response node. One packet transfer process is called a subaction including an asynchronous subaction and an isochronous subaction. Hereinbelow, the respective operations of the subactions will be described.

[Asynchronous Subaction]

Figure 12:
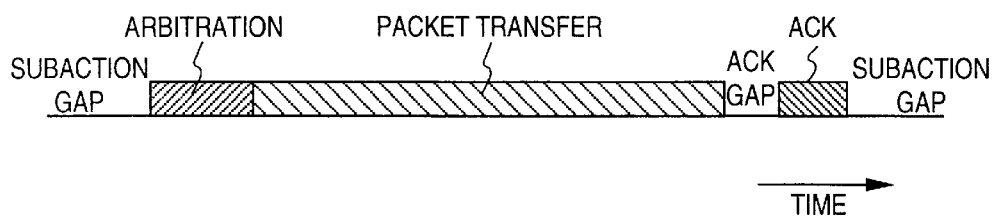
FIG. 12 is a timing chart showing transitional statuses in asynchronous data transfer.

The asynchronous subaction is asynchronous data transfer. FIG. 12 shows transition in the asynchronous transfer. In FIG. 12, the first subaction gap represents the idle status of the bus. At a point where the idle time has become a predetermined value, a node which is to perform data transfer requests a bus use right, then bus arbitration is executed.

When the use of bus has been allowed by the arbitration, data in the form of packet is transferred, and a node which receives the data sends a reception acknowledgment code ACK as a response, or sends a response packet after a short gap called ACK gap, thus the data transfer is completed. The code ACK comprises 4-bit information and a 4-bit checksum. The code ACK, including information indicative of success, busy or pending status, is immediately sent to the data-sender node.

Figure 13:
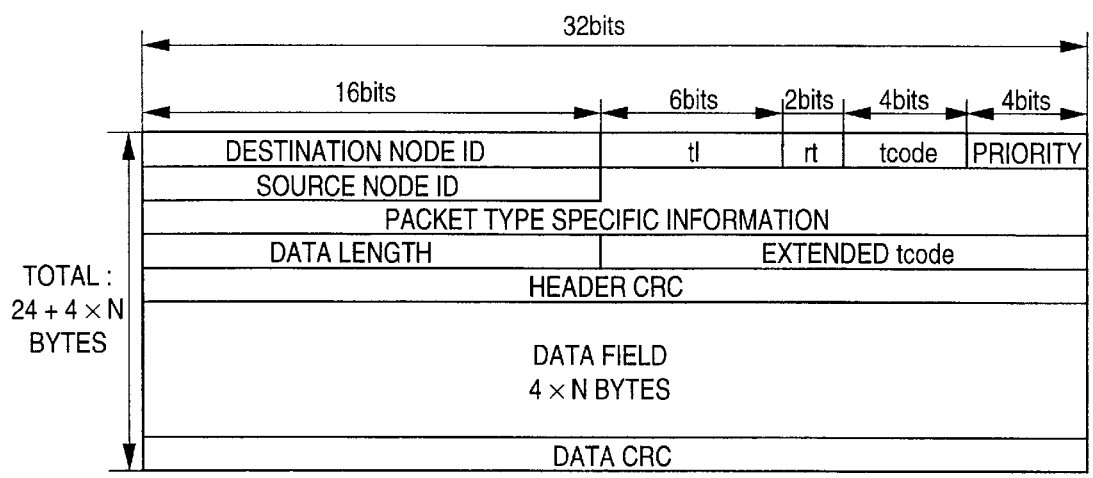
FIG. 13 is a diagram showing a packet format for the asynchronous transfer.

FIG. 13 shows a packet format for asynchronous transfer. The packet has a data area, a data CRC area for error correction, and a header area in which a destination node ID, a source node ID, a transfer data length and various codes are written.

The asynchronous transfer is one-to-one communication from a sender node to a receiver node. A packet sent from the sender node is relayed by the respective nodes in the network, however, as these nodes are not designated as the receiver of the packet, they ignore the packet, then only the receiver node designated by the sender node receives the packet.

[Isochronous Subaction]

Isochronous transfer, which can be regarded as the greatest feature of the 1394 serial bus is appropriate to multimedia data transfer which requires realtime transfer of, especially, AV data.

Further, the asynchronous transfer is one-to-one transfer, whereas the isochronous transfer is broadcasting transfer from one sender node to all the other nodes.

Figure 14:
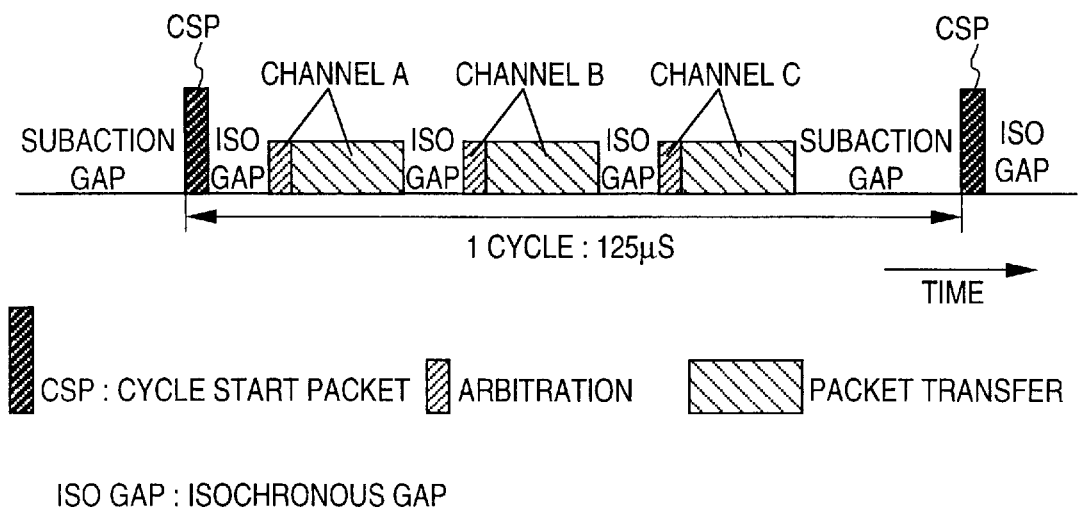
FIG. 14 is a timing chart showing transitional statuses in isochronous data transfer.

FIG. 14 shows transition in the isochronous transfer. The isochronous transfer is executed on the bus in a predetermined cycle, called "isochronous cycle". The period of the isochronous cycle is 125 ms. A cycle start packet (CSP) indicates the start of the isochronous cycle for synchronizing the operations of the respective nodes. When data transfer in a cycle has been completed and a predetermined idle period (subaction gap) has elapsed, a node which is called "cycle master" sends the CSP indicative of the start of the next cycle. That is, this interval between the issuance of CSP's is 125 ms.

As channel A, channel B and channel C in FIG. 14, the respective packets are provided with a channel ID, so that plural types of packets can be independently transferred within one isochronous cycle. This enables substantially-realtime transfer among the plural nodes. The receiver node can receive only data with a predetermined channel ID. The channel ID does not indicate an address of the receiving node, but merely indicates a logical number with respect to the data. Accordingly, one packet sent from a sender node is transferred to all the other nodes, i.e., broadcasted.

Similar to the asynchronous transfer, bus arbitration is performed prior to the packet broadcasting in isochronous transfer. However, as the isochronous transfer is not one-to-one communication like the asynchronous transfer, the reception acknowledgment code ACK used as a response in the asynchronous transfer is not used in the isochronous transfer.

Further, an isochronous gap (iso gap) in FIG. 14 represents an idle period necessary for confirming prior to isochronous transfer that the bus is in idle status. If the predetermined idle period has elapsed, bus arbitration is performed with respect to node(s) desiring isochronous transfer.

Figure 15A:
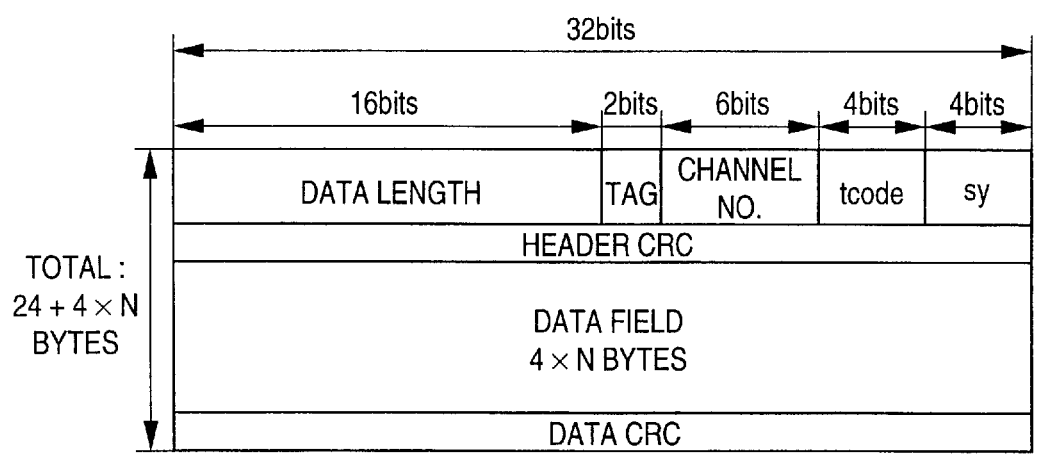
FIG. 15A is an example of a packet format for the isochronous transfer.

FIG. 15A shows a packet format for isochronous transfer. Various packets divided into channels respectively have a data field, a data CRC field for error correction and a header field containing information such as a transfer-data length, a channel No., various codes and error-correction header CRC as shown in FIG. 15B.

[Bus Cycle]

Figure 16:
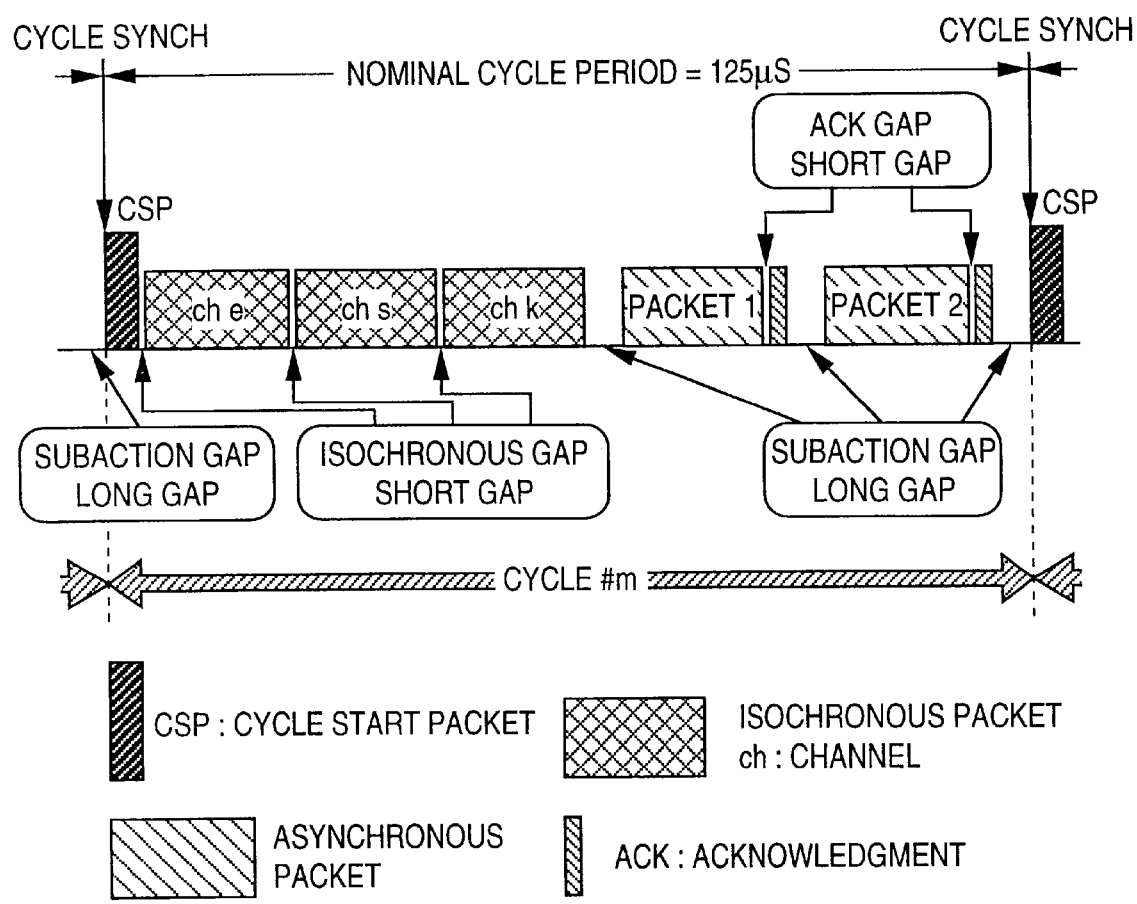
FIG. 16 is a timing chart showing transitional statuses in data transfer on the bus when the isochronous transfer and asynchronous transfer are performed.

In practice, both isochronous transfer and asynchronous transfer can be mixedly performed on the 1394 serial bus. FIG. 16 shows transition in the isochronous transfer and asynchronous transfer mixedly performed on the 1394 serial bus.

The isochronous transfer is performed prior to the asynchronous transfer because after the CSP, the isochronous transfer can be started with a gap (isochronous gap) shorter than the idle period necessary for starting the asynchronous transfer. Accordingly, the isochronous transfer has priority over the asynchronous transfer.

In the typical bus cycle as shown in FIG. 16, upon starting the cycle #m, a CSP is transferred from the cycle master to the respective nodes. The operations of the respective nodes are synchronized by this CSP, and node(s) that waits for a predetermined idle period (isochronous gap) to perform isochronous transfer participates in bus arbitration, then starts packet transfer. In FIG. 16, a channel e, a channel s and a channel k are transmitted by the isochronous transfer.

The operation from the bus arbitration to the packet transfer is repeated for the given channels, and when the isochronous transfer in the cycle #m has been completed, the asynchronous transfer can be performed. That is, when the idle period has reached the subaction gap for the asynchronous transfer, node(s) that is to perform the asynchronous transfer participates in bus arbitration. Note that only if the subaction gap for starting the asynchronous transfer is detected, after the completion of isochronous transfer and before the next timing to transfer the CSP (cycle synch), the asynchronous transfer can be performed.

In the cycle #m in FIG. 16, the isochronous transfer for three channels is performed, and then two packets (packet 1 and packet 2) including ACK are transferred by the asynchronous transfer. When the asynchronous packet 2 has been transferred, as the next cycle synch point to start the subsequent cycle m+1 comes, the transfer in the cycle #m ends. Note that during the asynchronous or isochronous transfer, if the next cycle synch point to transfer the next CSP has come, the transfer is not forcibly stopped but continued. After the transfer has been completed, a CSP for the next cycle is transferred after a predetermined idle period. That is, when one isochronous cycle is continued for more than 125 ms, the next isochronous cycle is shorter than the reference period 125 ms. In this manner, the isochronous cycle can be lengthened or shortened based on the reference period 125 ms.

However, it may be arranged such that the isochronous transfer is performed in every cycle, while the asynchronous transfer is sometimes postponed until the next cycle or the cycle further subsequent to the next cycle, so as to maintain realtime transfer. The cycle master also manages information on such delay.

[FCP]

In an AV/C protocol, a Function Control Protocol (FCP) is provided to control devices on the 1394 serial bus. For transmission of control commands and responses in the FCP protocol, an asynchronous packet defined by the IEEE 1394 standards is employed. In the FCP protocol, a node on the controller side is called a controller, and a node on the controlled side, a target. An FCP packet frame sent from the controller to the target is called an AV/C command frame; an FCP packet frame returned from the target to the controller, an AV/C response frame.

Figure 24:
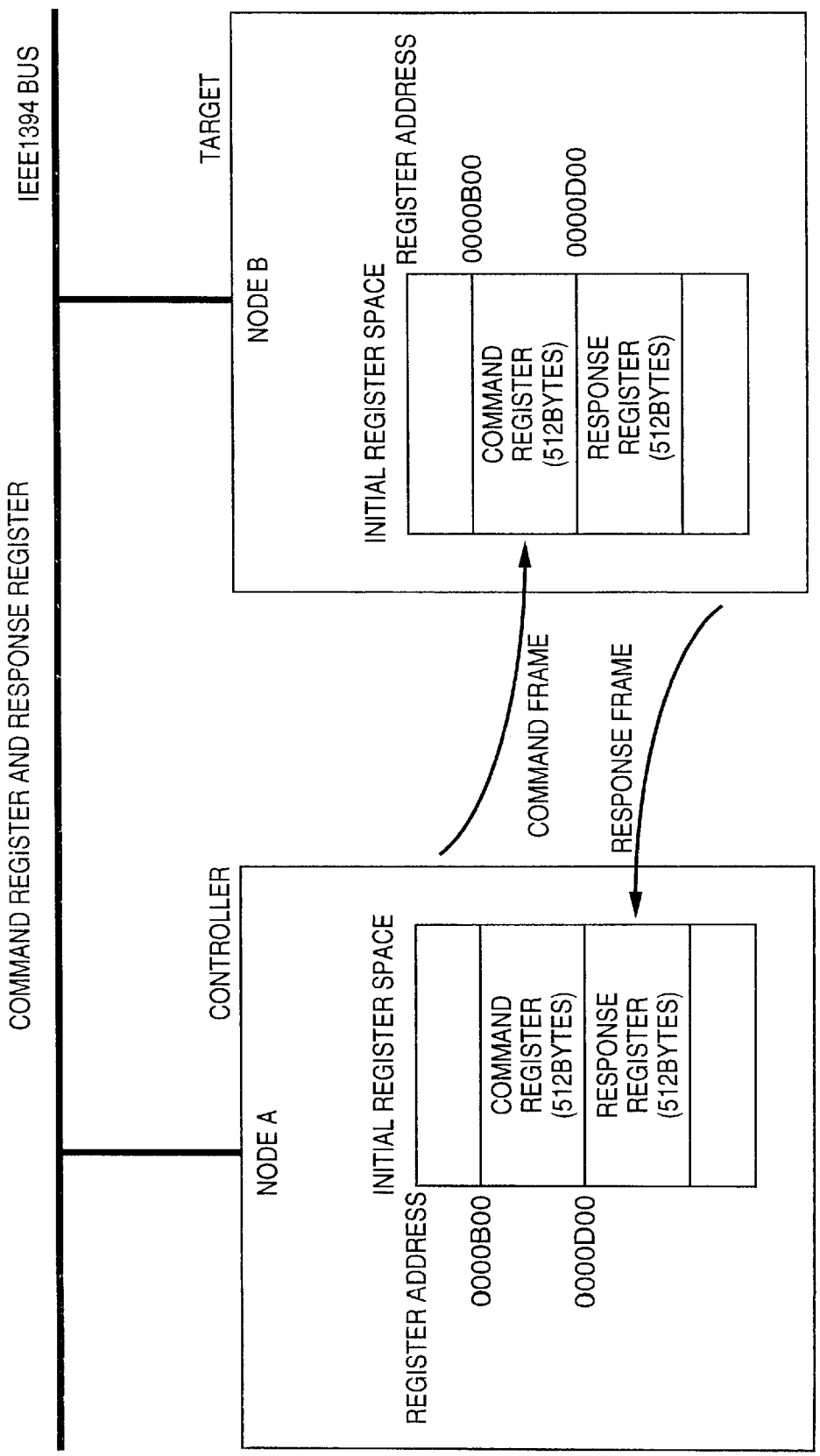
FIG. 24 is an explanatory view showing an AV/C transaction in the 1394 serial bus.

FIG. 24 shows a case where a node A is a controller and a node B is a target. In the register address provided for the respective nodes, 512 bytes from "0x0000B00" are assigned to a command register; and 512 bytes from "0x0000D00" are assigned to a response register. Data is written into the register of a designated address by a packet frame using the asynchronous transfer. The relation between the transmission of the AV/C command frame by the controller and the response with the AV/C response frame by the target is called an AV/C transaction. In a general AV/C transaction, a target which has received a command frame must send a response frame to a controller within 100 ms.

Figure 25:
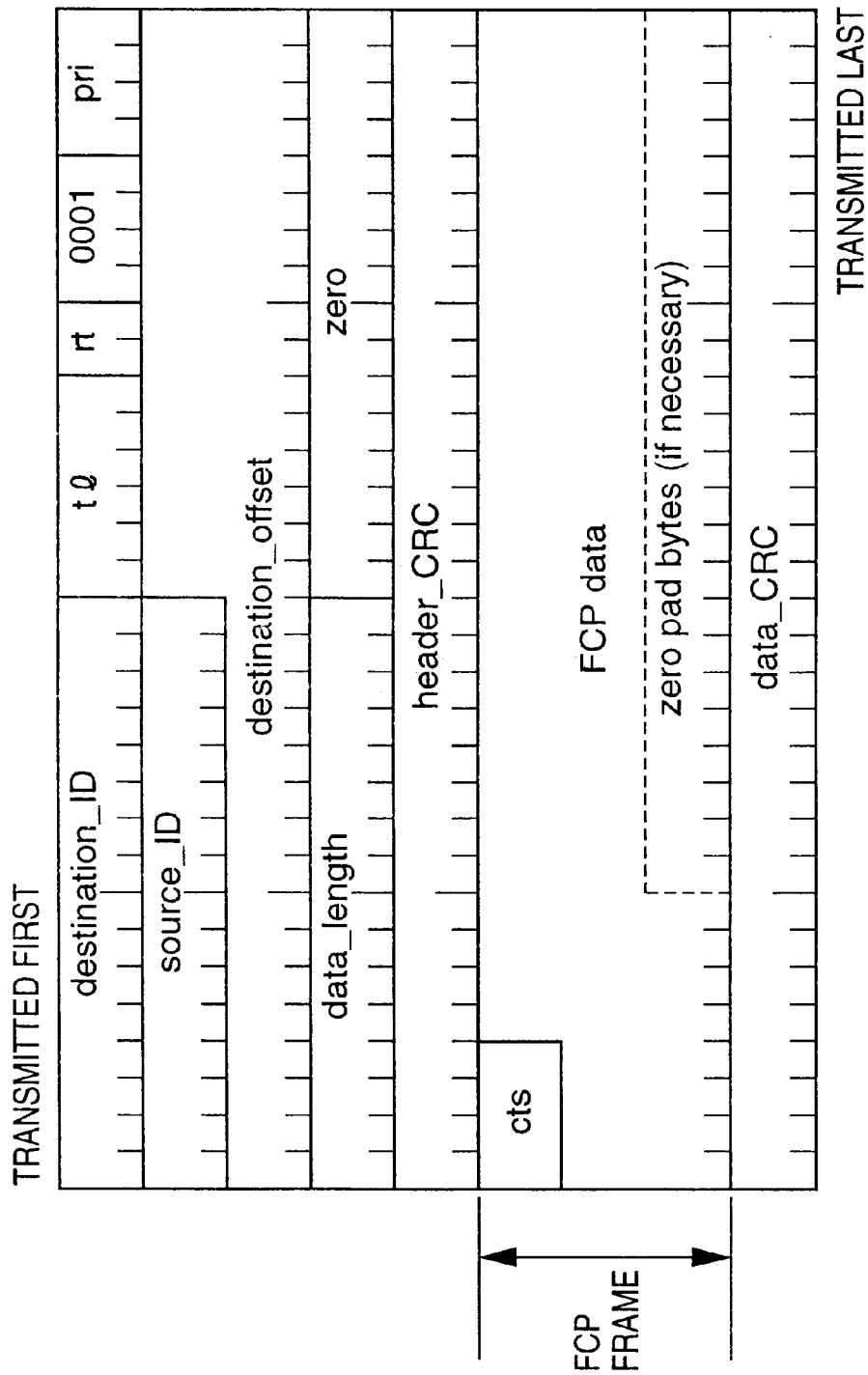
FIG. 25 is an example of the packet format for the asynchronous transfer including an FCP packet frame.

FIG. 25 shows the packet format for the asynchronous transfer including an FCP packet frame. A command frame or a response frame is inserted into a data area of the asynchronous data packet as shown in FIG. 15A, and the AV/C transaction is performed.

FIG. 26 shows the structure of the AV/C command frame. FIG. 27 shows the structure of the AV/C response frame. As the FCP packet frame, an FCP data part is arranged after "ctype", "response", "subunit_type" and "subunit_ID" in the header.

"ctype" indicates a command type in the command frame, with status "CONTROL", "STATUS", "INQUIRY" or "NOTIFY".

"response" indicates a response code in the response frame, with status "ACCEPTED", "REJECTED", "IN_TRANSITION", "IMPLEMENTED", "CHANGED" or "INTERIM".

Further, "subunit_type" indicates the classification of a device, and "subunit_ID" indicates an instance number.

The FCP data part has an operation code (opcode)+ operand (oprand) structure. The target is controlled and the AV/C response is performed by using various AV/C commands.

[CIP]

Figure 28:
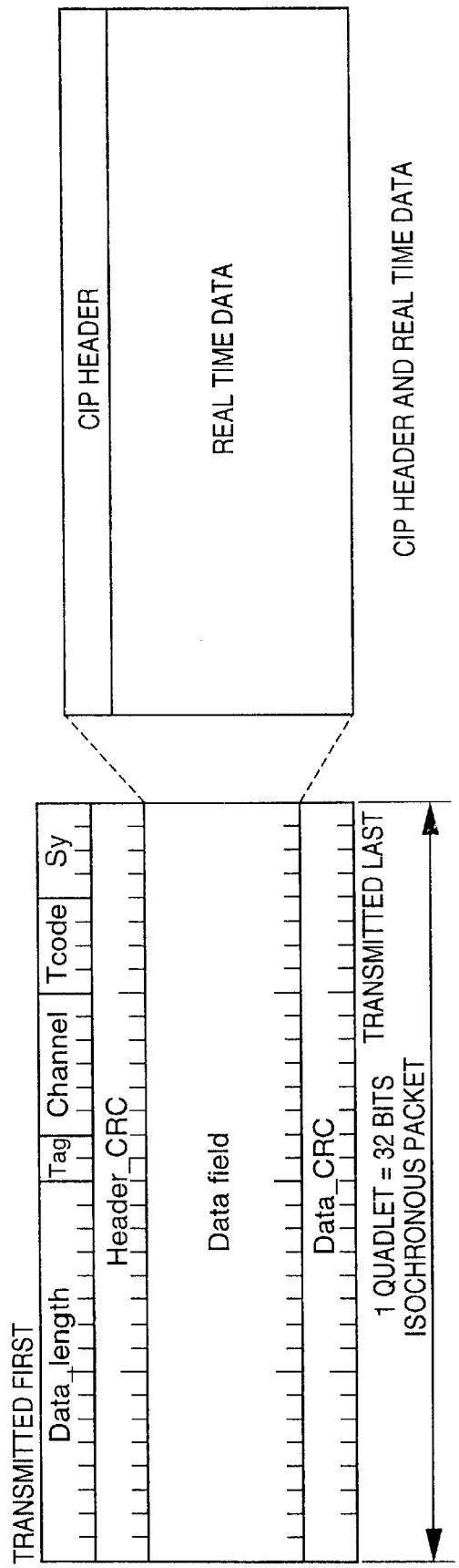
FIG. 28 is an explanatory view showing a CIP and realtime data stored in a data field in an isochronous packet.

A common isochronous packet (CIP) is defined as a realtime data-transfer protocol in the AV/C protocol. As shown in FIG. 28, a CIP header and realtime data are stored in a data field of the isochronous packet.

Figure 29:
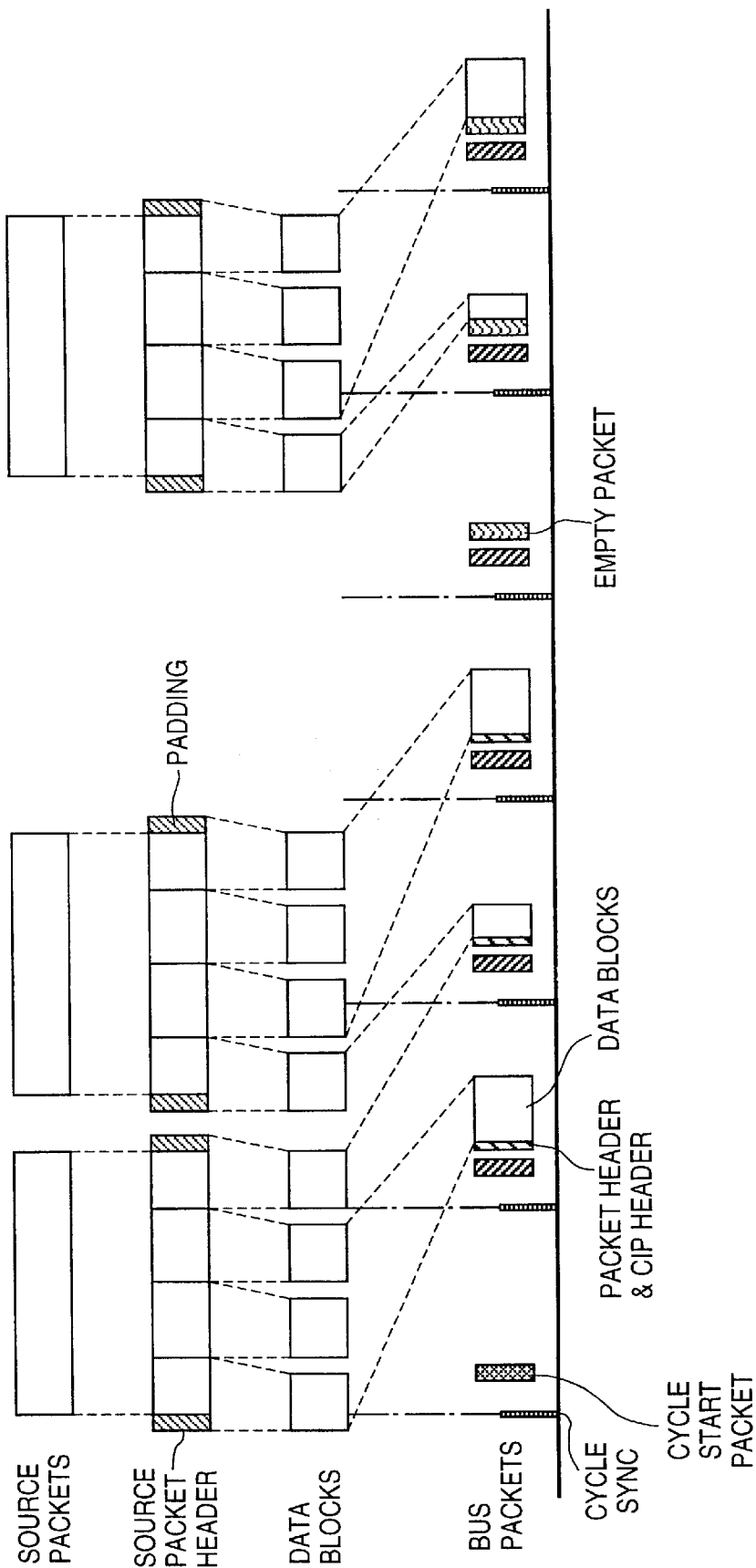
FIG. 29 is an explanatory view showing source packets divided into 1, 2, 4 and 8 data blocks and sent as plural isochronous packets.

The source-packet length of the AV/C protocol is a fixed value for each device. As shown in FIG. 29, the source packet on the transmitting side is divided into 1, 2, 4 or 8 data blocks, and sent as plural isochronous packets. As a node that has received the packets assembles the packets into the initial packet, a source packet header having a time stamp field necessary for restoring the realtime data and the CIP header as shown in FIG. 30 are provided. The CIP header includes information such as a block count value DBC for detecting omission of data block in packet transfer and FMT indicating the type of a data code.

When a device is activated, a packet is transferred by every cycle of the bus. Even if there is no data to be sent, an empty packet only including a source packet header and a CIP header is sent.

First Embodiment

Next, as an embodiment of the present invention, description will be made on an image processing system where respective digital devices are connected with the 1394 serial bus as shown in FIG. 1A.

[Construction]

In the system as shown in FIG. 1A, data transfer can be performed based on the 1394 serial bus specification among the respective devices. Note that in FIG. 1A, the recording/reproduction device 101, which records or reproduces a moving image or a still image, may be a digital still camera or a digital video camera. Direct printing can be made by directly transferring video (image) data outputted from the recording/reproduction device 101 to the printer 102.

Further, the connection method of the 1394 serial bus is not limited to that as shown in FIG. 1A, but the devices may be connected in an arbitrary order. Further, besides the devices as shown in FIG. 1A, input and output devices, a data communication device and the like supporting the 1394 serial bus can be connected. For example, storage devices such as a hard disk, an MO, a CD-R, a CD-RW and a DVD-ROM can be connected.

Figure 31:
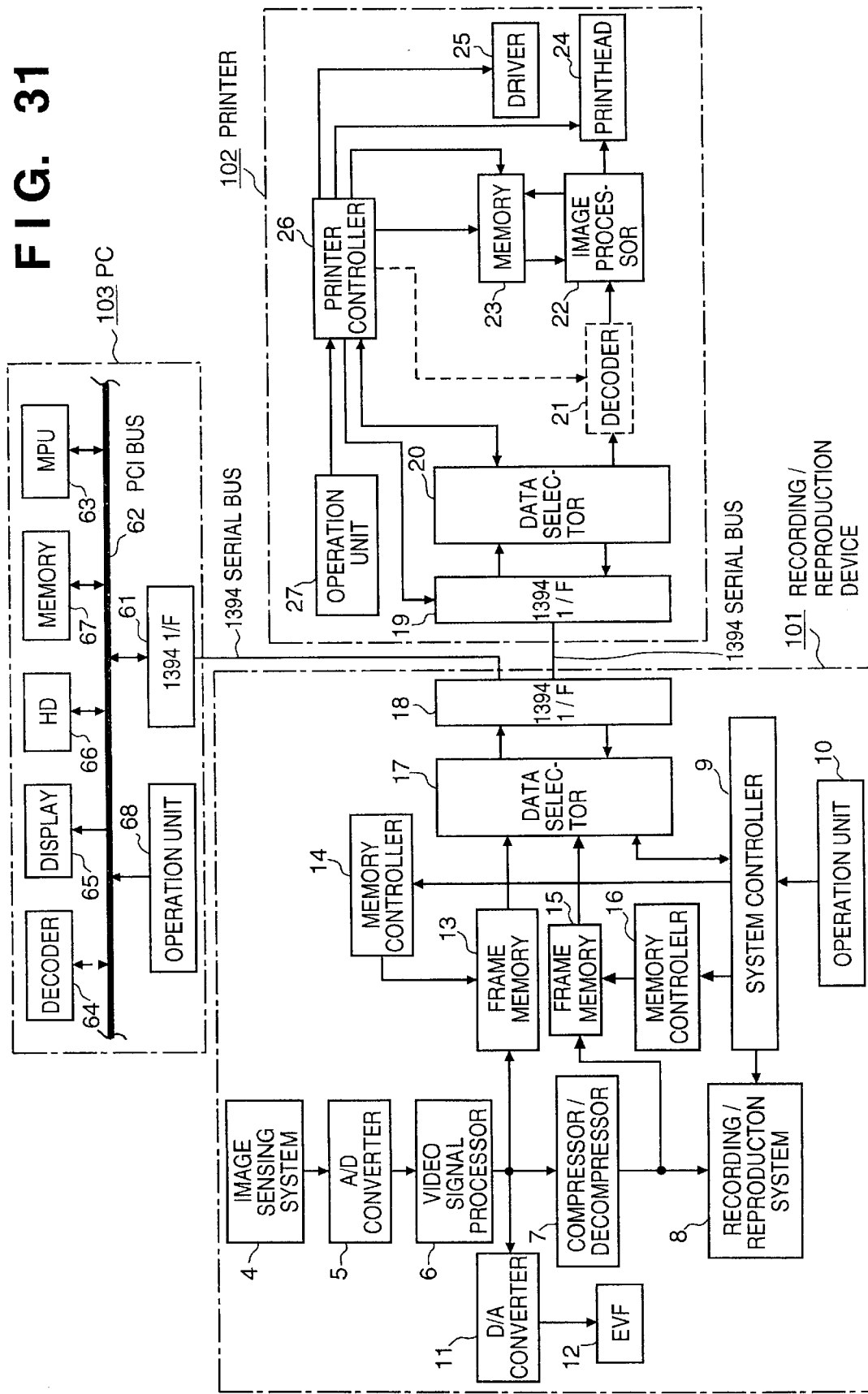
FIG. 31 is a block diagram showing the detailed constructions of the respective digital devices in FIG. 1A.

FIG. 31 is a block diagram showing the detailed constructions of the digital devices in FIG. 1A.

In the recording/reproduction device 101, numeral 4 denotes an image sensing system comprising a lens and a CCD; 5, an A/V converter; 6, a video (image) signal processor; 7, a compressor/decompressor for performing compression/decompression on video (image) data by a predetermined algorithm; 8, a recording/reproduction system including a magnetic tape or magnetic disk and its recording/reproduction head, a PC card and its driver and connector, and the like; 9, a system controller; 10, an operation unit for user's instruction input; 11, a D/A converter; 12, an electronic view finder (EVF) as a display device; 13, a frame memory for storing video (image) data transferred in non-compressed status; 14, a memory controller which controls reading data from the frame memory 13; 15; a frame memory for storing video (image) data transferred in compressed status; 16, a memory controller which controls reading data from the frame memory 15 and the like; 17, a data selector; and 18, a 1394 serial bus interface unit (1394 I/F).

In the printer 102, numeral 19 denotes a 1394 serial bus interface unit (1394 I/F); 20, a data selector; 21, a decoder for decoding (decompressing) video (image) data compressed by the predetermined algorithm; 22, an image processor for performing image processing on print image data; 23, a memory for forming a print image; 24, a printhead; 25, a driver for scanning the printhead 24 and performing paper feed; 26, a printer controller as a controller of the printer 102; and 27, an operation unit for user's instruction input.

In the PC 103, numeral 61 denotes a 1394 serial bus interface unit (1394 I/F); 62, a Peripheral Component Interconnect (PCI) bus; 63, an MPU; 64, a decoder for decoding (decompressing) video (image) data compressed by the predetermined algorithm; 65, a display device including a D/A converter and a video memory; 66, a hard disk; 67, a memory such as a RAM or a ROM; and 68, an operation unit having a keyboard, a mouse and the like.

[Operation of Recording/reproduction Device]

First, the operation of the recording/reproduction device 101 will be described.

Upon recording video (image) data, a video (image) signal, outputted from the image sensing system 4, is digitized by the A/D converter 5, and video (image)-processed by the video (image) signal processor 6. One of outputs from the video signal processor 6 is converted by the D/A converter 11 into an analog signal, as a video image (image) in image sensing, and displayed on the EVF 12. Further, the other output from the video (image) signal processor 6 is compressed by the compressor/decompressor 7 by the predetermined algorithm, and recorded by the recording/reproduction system 8 into a recording medium. The representative data compression methods used as the predetermined algorithm are a method by the Joint Photographic Image Coding Experts Group (JPEG method) as a representative compression method for a digital still camera, the discrete cosine transformation (DCT) as a representative compression method for a private-use digital VTR and a variable length coding (VLC), a compression method based on the Moving Picture Image Coding Experts Group (MPEG method) and the like.

Upon reproduction of video (image) data, a desired video image (image) is reproduced from the recording medium by the recording/reproduction system 8. At this time, the video image (image) desired by the user is selected under the control of the system controller 9, based on an instruction inputted from the operation unit 10. Among video (image) data reproduced from the recording medium, data to be transferred in compressed status is outputted to the frame memory 15. When reproduction data is decompressed so as to be transferred as non-compressed data, the compressor/decompressor 7 decompresses the video (image) data and outputs the data into the frame memory 13. Further, when a reproduced video (image) data is displayed on the EVF 12, the reproduction data is decompressed by the compressor/decompressor 7, converted by the D/A converter 11 into an analog signal and supplied to the EVF 12, and the reproduced video image (image) is displayed there.

The memory controllers 14 and 16, controlled by the system controller 9, control writing/reading data from/into the frame memories 13 and 15. Video (image) data read from the frame memories 13 and 15 are sent to the data selector 17. The outputs from the frame memories 13 and 15 are inputted into the data selector 17 at different timings under the control of the system controller 9.

The system controller 9 controls the operations of the respective components of the recording/reproduction device 101. Further, the system controller 9 sends control commands for external devices such as the printer 102 and the PC 103 via the data selector 17 and the 1394 serial bus to the external devices. The command transmission/reception is made by using an FCP packet frame by the isochronous transfer. Further, various commands sent from the printer 102 and the PC 103 are inputted via the data selector 17 into the system controller 9, and sent to the recording/reproduction device 101 and used for controlling the operations of the respective components of the recording/reproduction device 101. Among these commands, a command indicative of existence/absence of a decoder or indicative of a decoder type is inputted as a request command into the system controller 9, and used for selecting whether video (image) data outputted from the recording/reproduction device 101 is to be compressed or not. That is, the system controller 9 sends a command to the memory controller 14 or 16 in accordance with the request command to perform control such that video (image) data corresponding to the request command is read from the frame memory 13 or 15 and transferred.

More specifically, the system controller 9 determines which of compressed data and non-compressed data is transferred, based on decoder information of the respective devices, transferred as a command from the printer 102 or the PC 103. That is, if the system controller 9 determines that video (image) data compressed by the compression method of the recording/reproduction device 101 can be decoded, the system controller 9 transfers compressed video (image) data, while if the system controller 9 determines that the video (image) data cannot be decoded, transfers non-compressed video (image) data.

Video data and a command inputted into the data selector 17 are transferred by the 1394 I/F 18 in accordance with the specification of the 1394 serial bus, and received by the printer 102 or the PC 103. Also, the command is transferred to an appropriate node.

Generally, moving image data, still image data or sound data is transmitted by the isochronous transfer, and a command is transferred by the asynchronous transfer. Note that still image data may be transferred by the asynchronous transfer when it is determined in accordance with situation such as the traffic on the network that it is not necessary to assure realtime transfer.

[Operation of printer]

Next, the operation of the printer 102 will be described.

Data inputted into the 1394 I/F 19 is classified based on data type by the data selector 20, and data to be printed such as video (image) data is decompressed, if compressed, by the decoder 21 and outputted to th e image processor 22. As the recording/reproduction device 101 has determined the compression method and whether or not compression is performed, based on the information indicative of existence/absence of decoder or decoder type provided from the printer 102 to the recording/reproduction device 101 in advance, in case of compressed data, it can be decompressed by the decoder 21 of the printer 102. In case of non-compressed data, it can be passed through the decoder 21 and directly inputted into the image processor 22.

In the image processor 22, image processing appropriate to printing is performed on the input data. Then, the processed data is mapped as print image data in the memory 23 read/write of which is controlled by the printer controller 26. The print image data is sent to the printhead 24, and a visual image is printed on a print sheet based on the print image data. The operation of the driver 25 to scan the printhead 24 and to perform paper feed, that of the printhead 24, and the operations of other components are controlled by the printer controller 26.

The operation unit 27 is used for the user's instruction input for operations of paper feed, reset, ink check, standby/start/stop of printer operation and the like. The printer controller 26 controls the operations of the respective components in accordance with a control command of the instruction input.

Next, if data inputted into the 1394 I/F 19 is a command for the printer 102, it is sent from the data selector 20 to the printer controller 26 as a control command. The printer controller 26 controls the operations of the respective components in accordance with the control command.

Further, one of coding methods supported by the decoder 21 of the printer 102 is the JPEG method. The JPEG-coded data can be decoded by hardware or software. Accordingly, the decoder 21 may decode the JPEG-coded data by a JPEG decoding program by using the program held in a ROM of the decoder 21 as a JPEG decoding program file or transferred from another node.

In a case where JPEG-coded image data is transferred from the recording/reproduction device 101 to the printer 102 and the data is decoded in the printer 102, the transfer efficiency is higher than the transfer efficiency in a case where decompressed data is transferred to the printer 102.

Further, if decoding is performed by a software program, the cost of the decoder 21 of the printer 102 is lower than that of the decoder 21 with hardware construction.

As described above, the processing to transfer image data from the recording/reproduction device 101 to the printer 102 and perform printing is so-called direct printing which enables printing without processing by the PC 103.

[Processing by PC 103]

Next, the processing by the PC 103 will be described.

Video (image) data transferred from the recording/reproduction device 101 to the 1394 I/F 61 of the PC 103 is transferred via the PCI bus 62 to the respective components of the PC 103. The MPU 63 performs various processings by using the memory 67 as a work memory, in accordance with instruction input from the operation unit 68, the operating system (OS) and an application software program, and records the video (image) data into the hard disk 66. As the recording/reproduction device 101 has determined the data compression method and whether or not compression is to be performed, based on the information indicative of existence/absence of decoder or decoder type provided to the recording/reproduction device 101 in advance, in case of compressed data, it can be decompressed by the decoder 64 of the PC 103. Accordingly, if video (image) data is displayed on the display device 65, compressed video (image) data is decoded (decompressed) by the decoder 64 and inputted into the display device 65, while non-compressed video (image) data is directly inputted into the display device 65, D/A converted, and displayed on the display device 65. The decoder 64 may be a decoder card based on the JPEG method, the MPEG method or the like, a circuit installed on the mother board of the PC 103, or a decoder software program stored in a ROM or the like to be executed by the MPU 63.

In this manner, the transferred video (image) data is inputted into the PC 103, and processing such as recording, display or editing is performed on the data, or further, the processed data is transferred from the PC 103 to another device.

[Data Transfer Procedure]

Figure 32:
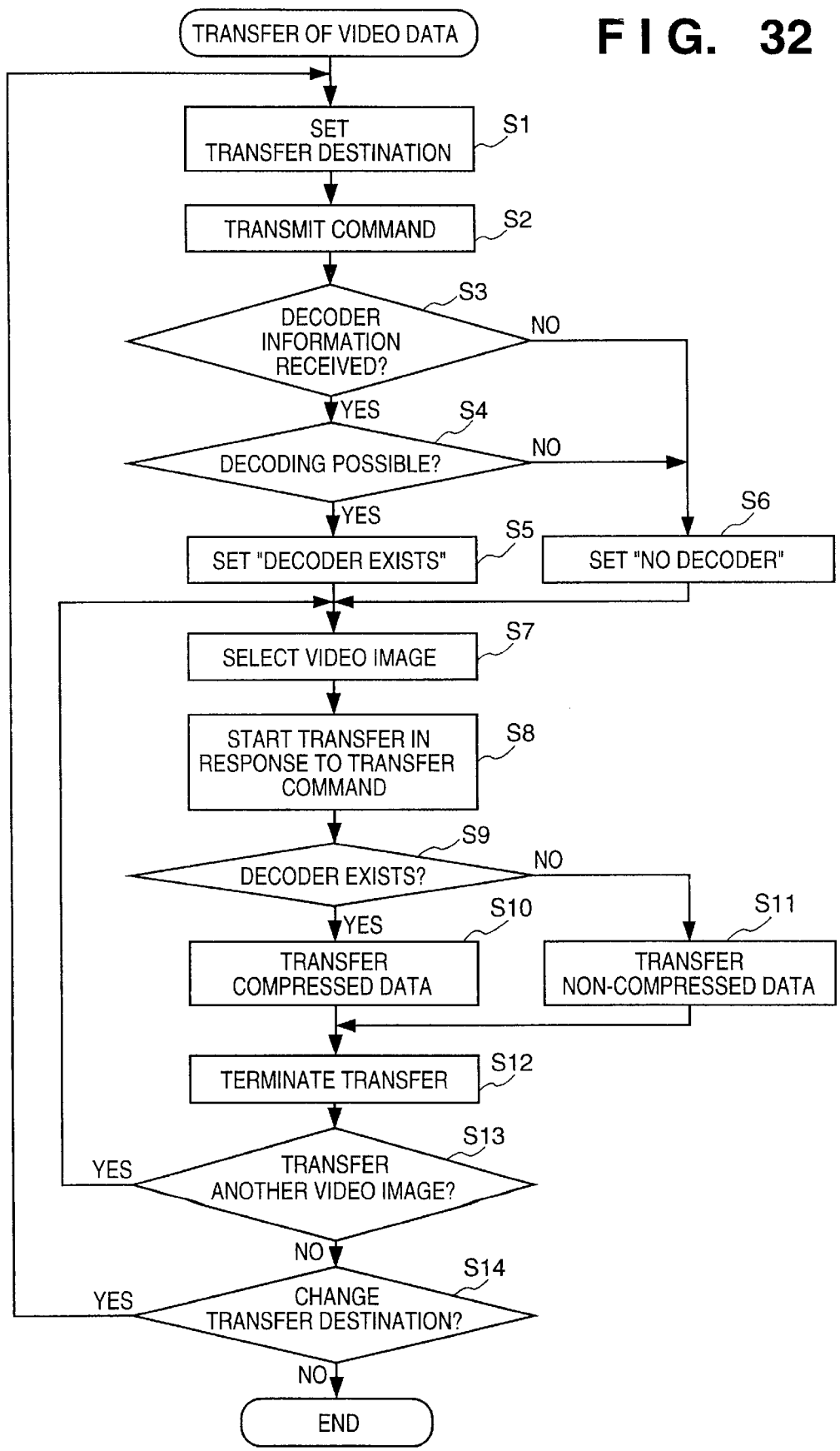
FIG. 32 is a flowchart showing a data transfer procedure by the devices in FIG. 31.

FIG. 32 is a flowchart showing a data transfer procedure in the device constructions in FIG. 31.

In the recording/reproduction device 101, when video (image) data is transferred to another device connected to the 1394 serial bus, the system controller 9 performs transfer setting based on a transfer destination designated by the user (step S1), and at step S2, transmits a command, including predetermined information notifying the destination device of data transfer, and information requiring the destination device to return information indicative of existence/absence of decoder and the type of decoder of the transfer destination device, to the destination device. The transfer destination device receives the command, and returns a predetermined transfer confirmation command, including decoder information, to the recording/reproduction device 101.

At step S3, the system controller 9 of the recording/reproduction device 101 confirms reception of the decoder information, and determines existence/absence of decoder and the type of decoder of the transfer destination. At step S4, the system controller 9 determines whether or not decoding is possible if compressed data is transferred. If it is determined at step S4 that decoding is possible, the system controller 9 sets "decoder exists" status at step S5. If it is determined that decoding is impossible, or the received transfer confirmation command does not include decoder information, the system controller 9 sets "no decoder" status at step S6.

Note that the decoder information included in the transfer confirmation command is used by the transfer originator device to determine which of compressed data and non-compressed data is to be transferred. The decoder information is also used by the transfer destination device as data requiring compressed data or non-compressed data. Further, if the transfer destination device obtains information on the compression method of the transfer originator device in advance, the transfer destination device can directly require compressed data or non-compressed data when returning the transfer confirmation command.

Next, at step S7, the system controller 9 reads data from the recording medium, corresponding to a video image (image) to be transferred to the printer 102 or the PC 103, selected by the user among video images (images) recorded in the recording medium, and at step S8, the system controller 9 starts transmission of the video (image) data read from the recording medium, in response to a transfer start command sent from the printer 102 or the PC 103.

Next, at step S9, the system controller 9 determines the "decoder exists/no decoder" status set at step S9. If the "decoder exists" status is set, the system controller 9 controls the memory controller 16, the data selector 17 and the 1394 I/F 18 so as to read compressed data, which has been read from the recording medium and stored in the frame memory 15, from the frame memory 15 and transmit the read data, at step S10. On the other hand, if the "no decoder" status is set, the system controller 9 controls the memory controller 14, the data selector 17 and the 1394 I/F 18 so as to read non-compressed data, which has been decompressed by the compressor/decompressor 7 and stored in the frame memory 13, from the frame memory 13 and transmit the read data, at step S11.

Note that the video data transfer is performed by using the isochronous transfer of the 1394 serial interface. The recording/reproduction device 101 receives the transfer start command from the PC 103 or the printer 102 at step S8, and transfers video data by repeatedly sending e.g. frames of video data to be transferred.

When the system controller 9 receives a transfer complete command indicative of the completion of reception of video (image) data for one image or a predetermined number of frames from the PC 103 or the printer 102 at step S12, the system controller 9 terminates the video (image) data transfer.

Next, at step S13, the system controller 9 determines whether or not the user has instructed to transfer another video image (image). If YES, the process returns to step S7 to repeat steps S7 to S13, while if NO, the process proceeds to step S14, at which the system controller 9 determines whether or not the user has instructed to transfer the video image (image) to another device. If YES, the process returns to step S1 to repeat steps S1 to S14, while if NO, the process ends.

[Data Structure]

First, the structure of non-compressed image data transferred to the printer will be described.

Figure 33:
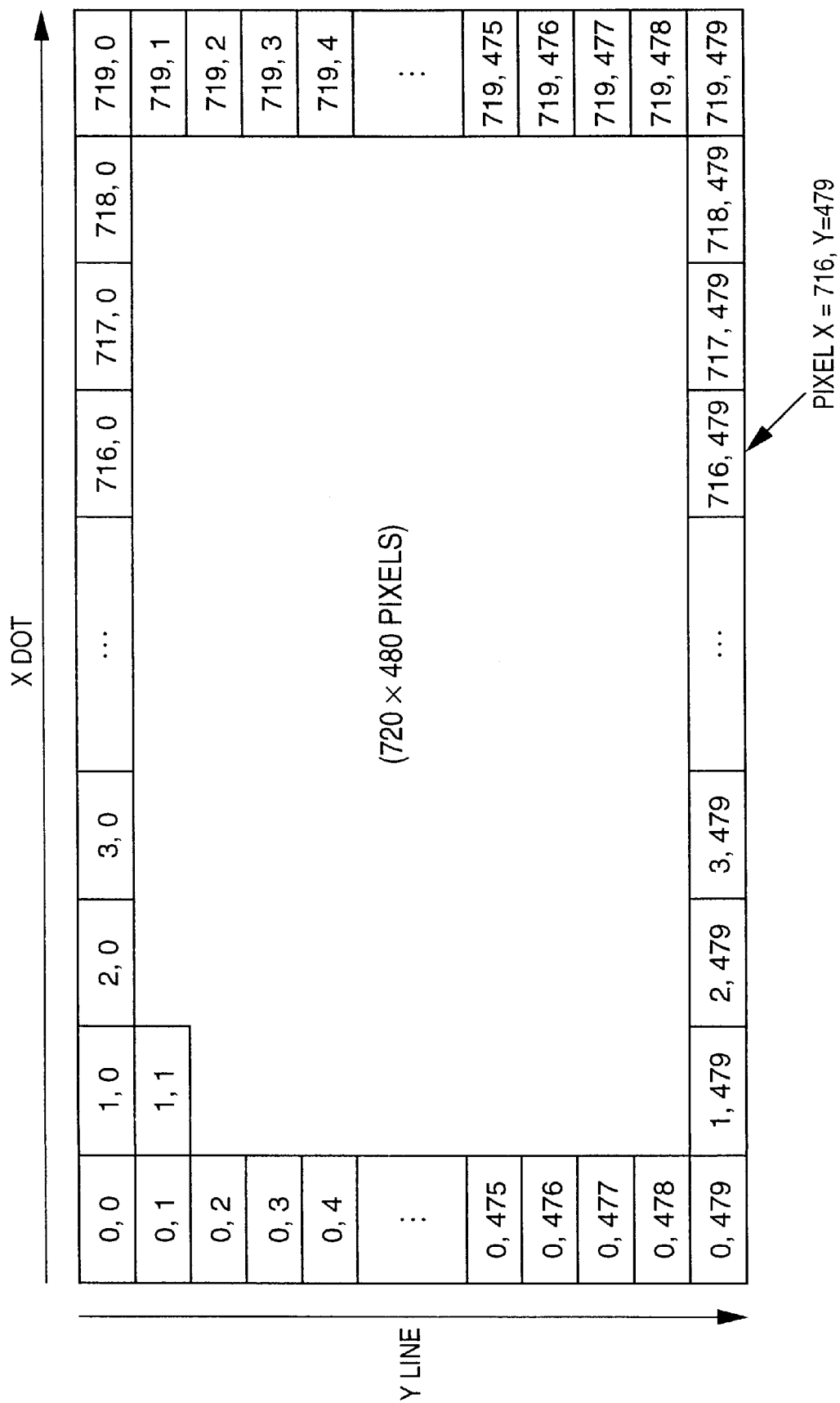
FIG. 33 is a table showing x-y coordinate matrix of non-compressed image data in a 525-60 system based on the NTSC standards used in a digital video system for private use.

FIG. 33 is a table showing x-y coordinate matrix of non-compressed image data in the 525-60 system based on the NTSC standard as one of the video image standards used in private digital video system. The 525-60 system displays video data by interlaced scanning with 525 scan lines and 60 frames per second. FIG. 33 shows a displayed image as a matrix space having a 720×480 pixel valid area with the upper left coordinates (0,0) and the lower light coordinates (719, 479). For example, image data at coordinate positions x=716, y=479 indicates a pixel of the 716th dot in the 479th line.

FIG. 34 shows the structure of image data for one frame of non-compressed format in YUV (4:2:2) representation. Y represents brightness, and U and V, color differences. YUV (4:2:2) is represented by 8-bit brightness data Y and respectively 4-bit color difference data U and V, per one pixel. Further, in a line-base data block, U, Y, V and Y data are arrayed from left to right. Since 2 pixels are represented by 4 byte data, 720 pixels of 1 line are represented by 1440 byte data. In the line-base data block, the data are arrayed from the top to the bottom of the image. In 1 frame, the data are arranged in the order from line 0, line 1, . . . , line 479.

FIG. 35 shows the structure of data for one frame of a non-compressed format in RGB representation. In the RGB data, 1 pixel is represented by respectively 8-bit R, G and B color tone-level data. Further, in a line-base data block, R, G and B data are arrayed from left to right. As 1 pixel is represented by 3 byte RGB data, 720 pixels of 1 line are represented by 2160 byte data. In the line-base data block, the data are arrayed from the top to the bottom of the image. In 1 frame, the data are arranged in the order from line 0, line 1, . . . , line 479.

Figure 36:
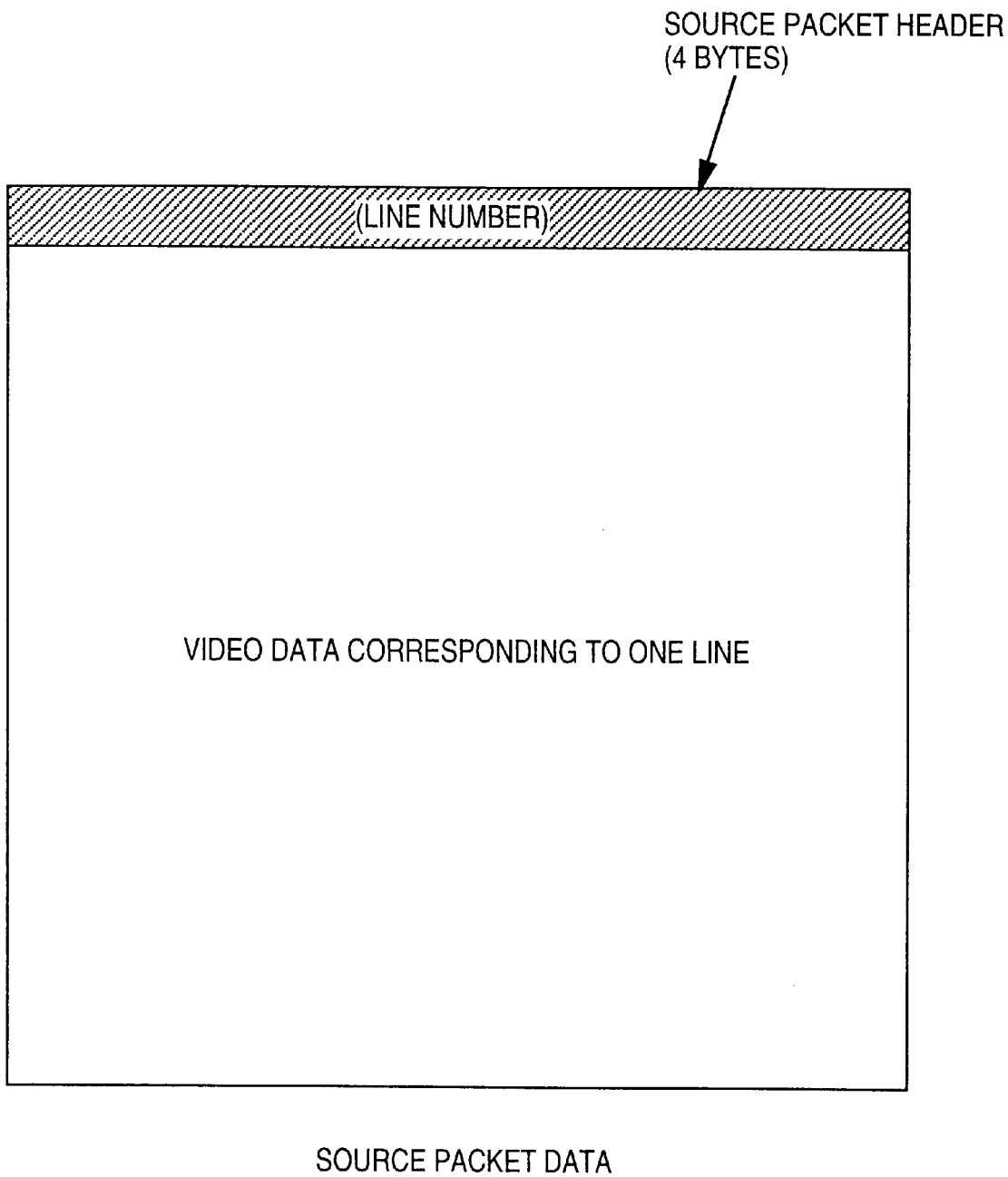
FIG. 36 is a schematic view showing the source packet for isochronous transfer including a line-base data block constructed in non-compressed format.

FIG. 36 shows a source packet for the isochronous transfer, including a line-base data block in a non-compressed format. As shown in FIG. 29, the source packet is a data block unit in the isochronous transfer using the CIP. In this example, a 4-byte source packet header including a line number is added to 1-line data block, as a source packet. Accordingly, the line of the source packet can be confirmed by checking the line number included in the source packet header of isochronous-transferred data. For example, regarding a source packet data which has not been received in reception of data for the first frame, it can be retransmitted by the isochronous transfer by re-reading the data in reception of data for the second frame.

[Isochronous Transfer of Print Image Data]

Figure 37:
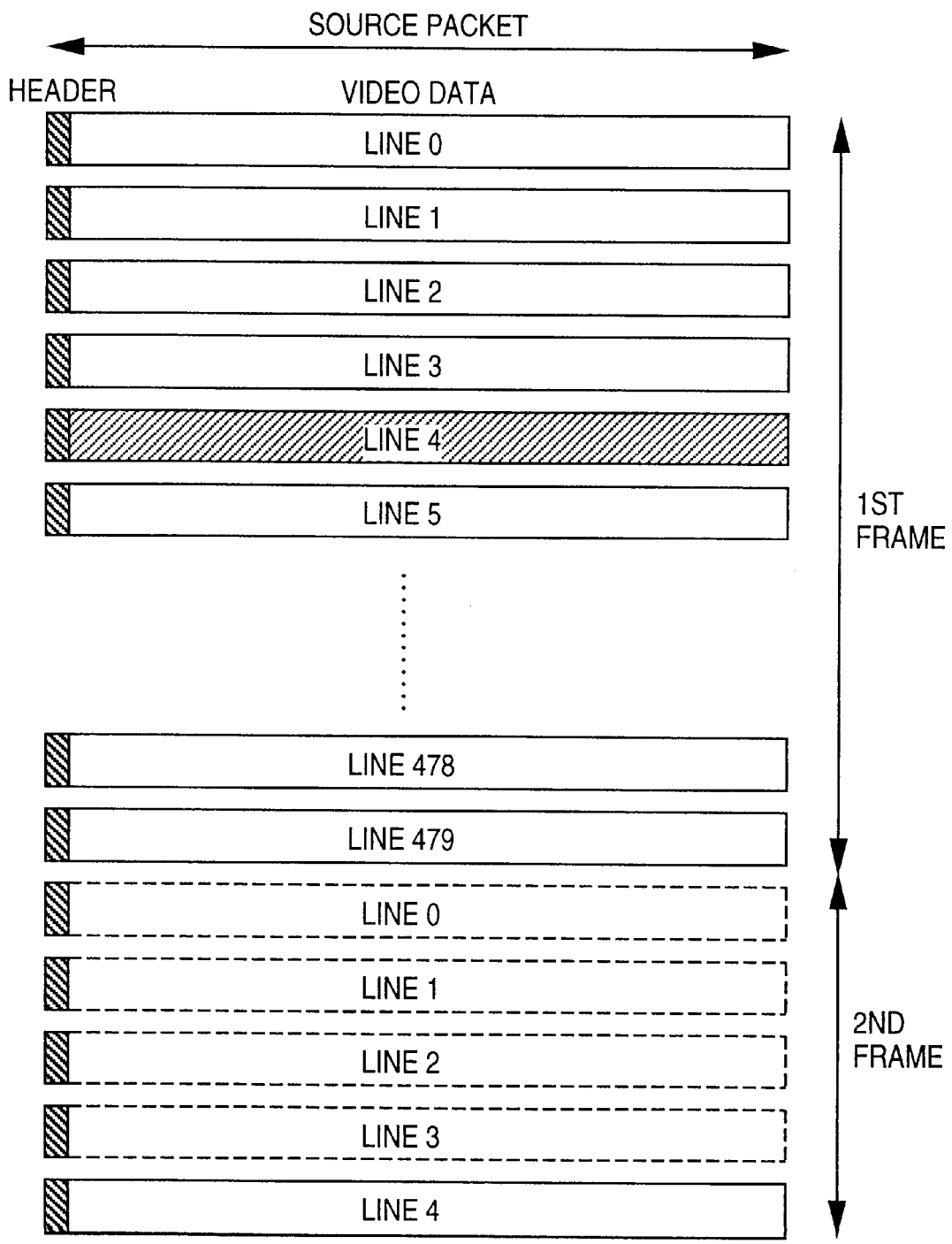
FIG. 37 is a schematic view showing the structure of isochronous transfer data received by a printer.

FIG. 37 shows the structure of isochronous-transfer data received by the printer 102. Description will be made on the processing method for data retransmission by the isochronous transfer by the printer 102, and the construction of the printer 102 to receive data at least necessary for printing. First, data retransmission will be described.

When a transfer command instructing to transfer image data is issued from the printer 102 to the recording/reproduction device 101, the recording/reproduction device 101 repeatedly outputs still image data. Note that the image data is sequentially outputted from data of line 0. In this example, it is assumed that the printer 102 first receives image data for the first frame, however, the printer 102 has not obtained data of the 4th line. Then, the printer 102 reads only the 4th line source packet from image data for the second frame to complete the image data. When the printer 102 determines that all the data have been obtained, the printer 102 returns a transfer end command to the recording/reproduction device 101. Thus, the data transfer sequence ends.

Next, the construction of the printer system to form a printer buffer by a minimum buffer capacity will be described.

In case of an ink-jet printer, different from a page printer, it is not necessary to start printing after all the data for one frame have been received. It is efficient to perform printing when data for one scanning by a printhead, i.e., data for a line determined by the number of dots of a printhead have been received. Further, generally, the period of printing by the printer is longer than the period of image data transfer by the recording/reproduction device 101, accordingly, it is efficient for the printer to sequentially print-output image data while receiving image data.

Assuming that an ink-jet printer having a 48-dot printhead is employed, image data for 48 lines×720 pixels is necessary for one scanning. To perform the first scanning by the printhead, it is only necessary to receive only 48 source packets for line 0 to line 47. When these necessary packet data have been received, the printhead is scanned to print an image for 48 lines. During this printing, as the transfer end command is not issued, the recording/reproduction device 101 repeatedly outputs still image data.

When data for the second scanning by the printhead is necessary, the printer 102 reads next 48 packets for line 48 to line 95, and prints an image for 48 lines.

The printer 102 repeats the above operation, and when data of line 432 to the final line 479 for the 10th scanning has been read, the printer 102 issues the transfer end command.

That is, as the recording/reproduction device 101 repeatedly outputs still image data by the isochronous transfer while the printer 102 performs printing, the printer 102 can obtain data corresponding to the buffer capacity of the buffer memory or the number of dots of the printhead and perform printing.

Next, a case where image data transferred to the printer is compressed data in the DV format used in a digital video system will be described.

Figure 38:
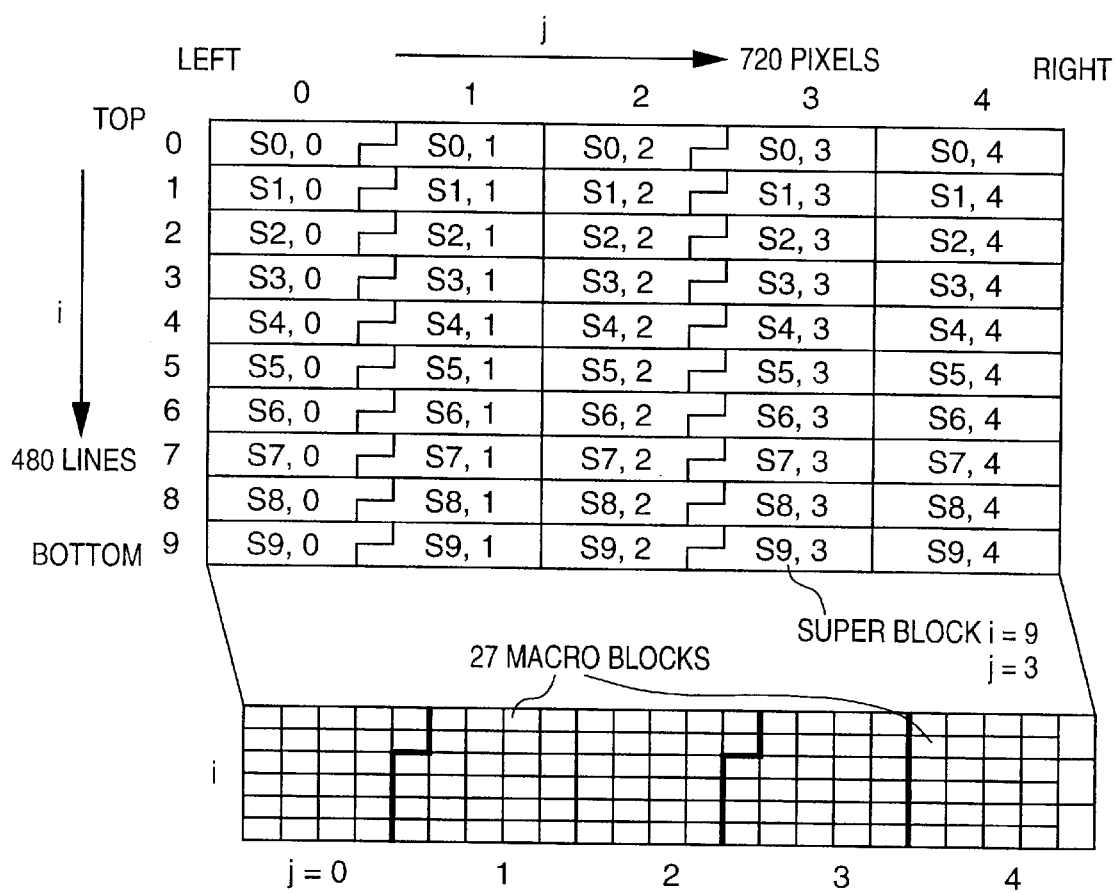
FIG. 38 is an explanatory view showing the structure of video data DCT compressed in the 525-60 used in the digital video system.
Figure 39:
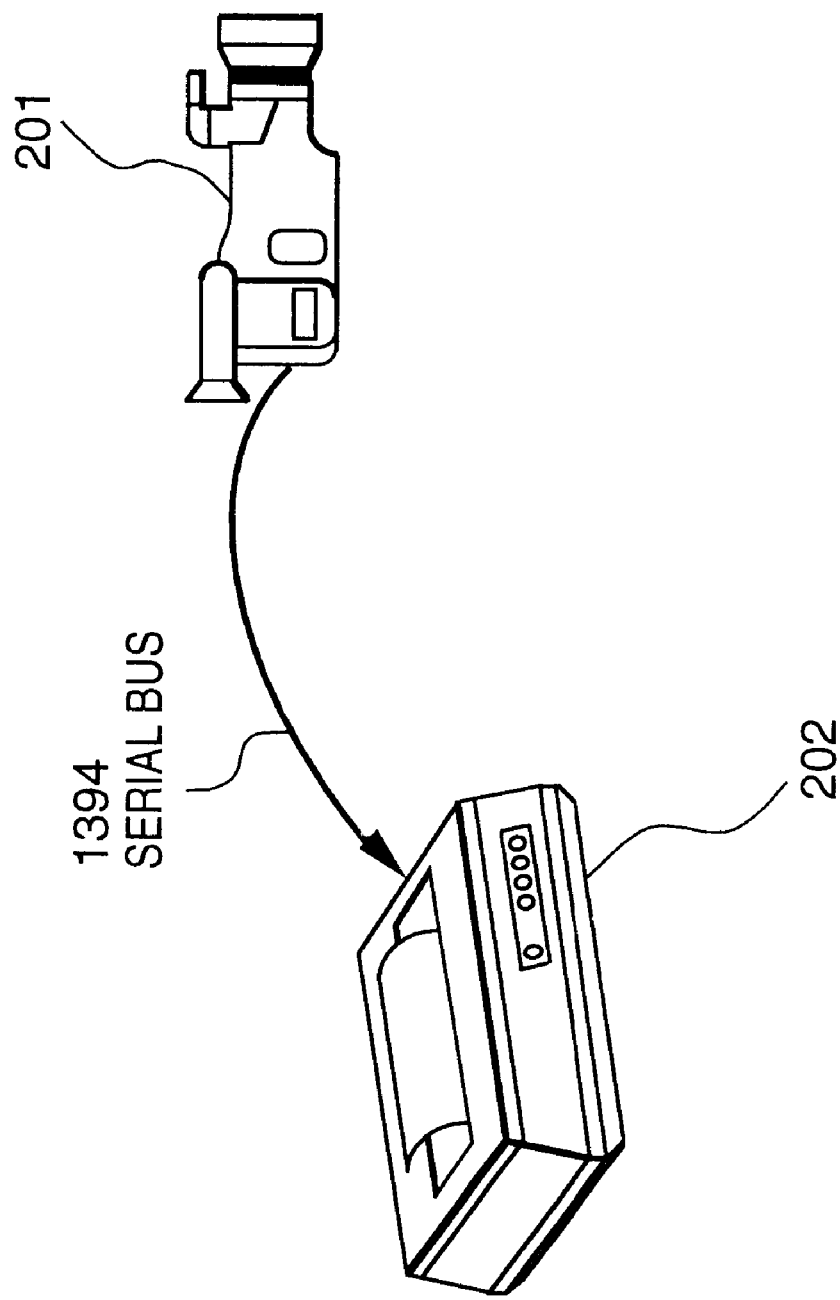
FIG. 39 is an explanatory view showing a second example of a system to which the present invention is applied.

FIG. 38 shows the structure of DCT-compressed video data in the 525-60 system used in the digital video system.

The basic structure is made by dividing vertical 480 lines by 10 in 48-line units, then dividing each lines by 5 into super blocks, and further dividing each super block into 27 macroblocks. The video data is compressed in macroblock units. Accordingly, a superblock (S9,3) in FIG. 38 indicates a 4th block from the left in the final 48th line.

In this example, the detailed description of the DCT compression used in the digital video camera and the DV format data will be omitted. The data obtained by dividing each superblock of the video data by 50 is assigned to a source packet, and the video data is transmitted/received by the isochronous transfer. Further, as one source packet includes audio data and control data as well as the video data, when still image data continuously outputted from the recording/reproduction device 101 is received by the printer 102, the super block number included in each source packet header is checked, and if any data has been omitted when data for the first frame have been received, retransmission of the omitted data is performed such that the omitted data is received in reception of data for the second frame and the data is decompressed.

In this manner, according to the present embodiment, in a construction where a PC and peripheral devices such as a printer, a digital still camera and a digital video camera are connected to a network using a general interface such as an IEEE 1394 serial interface, a transmitting node repeatedly isochronous-transfers the same data to a receiving node until the receiving node has completed data reception, which easily obtains omitted transfer data. Further, when the printer performs printing based on data transferred from a recording/reproduction device such as the digital still camera or the digital video camera, the recording/reproduction device repeatedly isochronous-transfers still image data, so that the printer can receive data packets corresponding to the data size based on the printer capability determined by the buffer size or printhead specification of the printer, which facilitates data transfer even if the printer buffer size is small.

Second Embodiment

Hereinbelow, the image processing system according to a second embodiment of the present invention will be described. Note that in this embodiment, elements substantially identical to those in the first embodiment have the same reference numerals and detailed explanations of these elements will be omitted.

[Construction]

As the second embodiment, description will be made on a system where a recording/reproduction device 201 is directly connected to a printer 202 via the 1394 serial bus. In this embodiment, direct printing is realized such that the printer 202 performs printing based on video (image) data directly inputted from the recording/reproduction device 201.

Figure 40:
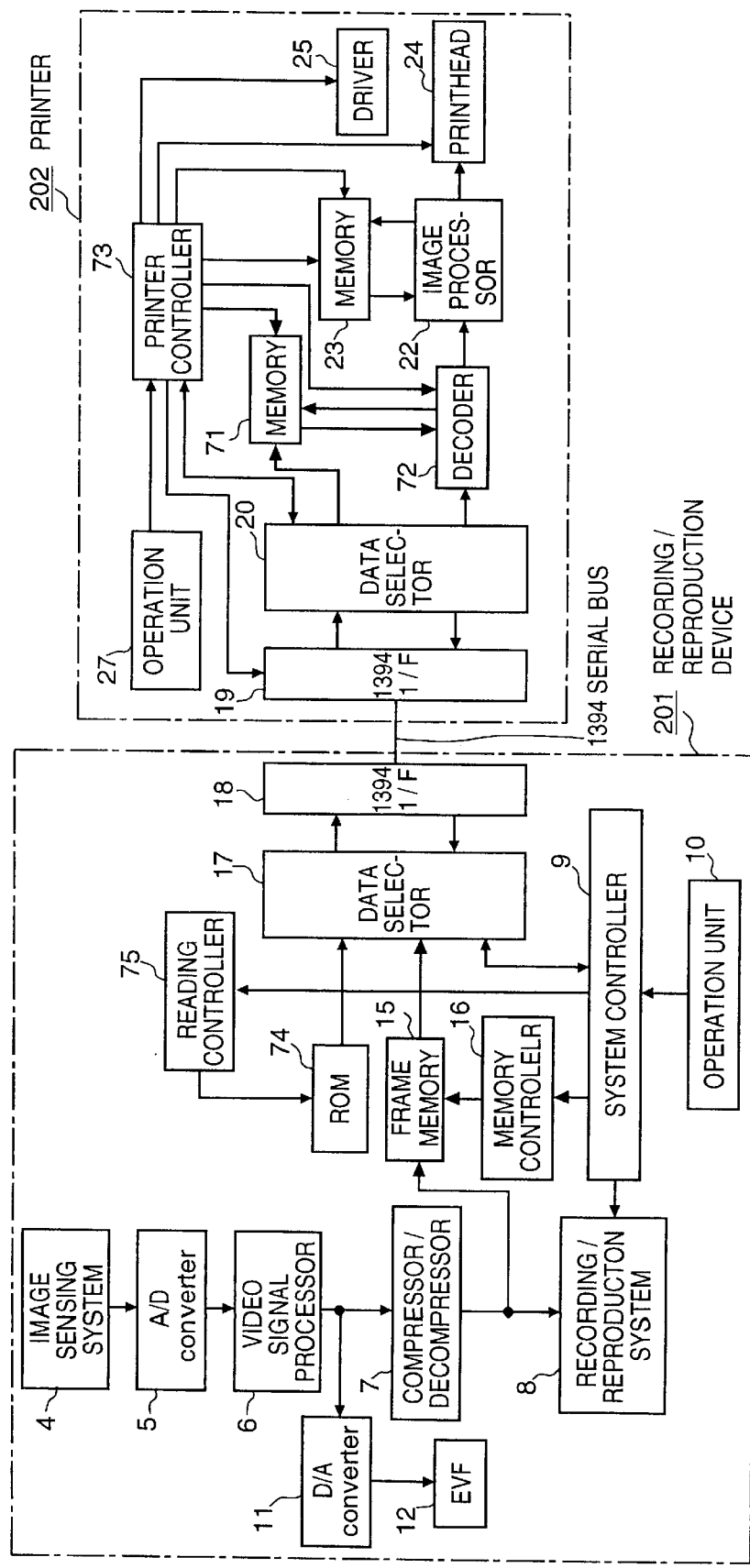
FIG. 40 is a block diagram showing the construction of the system according to a second embodiment of the present invention.

FIG. 40 is a block diagram showing the construction of the system according to the second embodiment. Basically, the PC 102 in the construction of the first embodiment is removed, and the recording/reproduction device 201 and the printer 202 are interconnected via the 1394 serial bus.

The difference between the construction of the first embodiment and that of the present embodiment is that the recording/reproduction device 201 has a ROM 74 which contains at least one decoding program to decompress compressed data, corresponding to at least one of video (image) data compression methods such as the MPEG, JPEG, DV methods and the like, performed by the compressor/decompressor 7. Further, the recording/reproduction device 201 as shown in FIG. 40 does not have the frame memory 13 and the memory controller 14 for transferring non-compressed data.

The decoding program is read from the ROM 74 in accordance with necessity, under the control of a reading controller 73 controlled by the system controller 9, and transferred via the data selector 17 and the 1394 I/F 18 to the printer 202. The decoding program is mainly transferred by the asynchronous transfer before or in parallel to video (image) data transfer such that the decoding program is inserted between video (image) data packets.

The printer 202 stores the received decoding program into a memory 71 which is entirely or partially rewritable, as a circuit for video (image)data decoding, and decodes video (image) data received by a decoder 72 which operates in accordance with the decoding program stored in the memory 71. The memory 71 is capable of storing the decoding program corresponding to the compression method of a device which transmits the compressed data, and the memory 71 functions as a decoder corresponding to a plurality of compression methods, when used with the decoder 72. Note that it may be arranged such that the memory 71 does not function as a decoder if the decoding program is not stored into the memory 71. Further, it may be arranged such that predetermined decoding programs are stored into the memory 71 in advance.

[Operation]

As an example of the operation of the second embodiment, description will be made on a case where a decoding program, corresponding to a video (image) data compression method used by the recording/reproduction device 201, is read from the ROM 74 and the decoding program is transferred to the printer 202, stored into the memory 71, before compressed video (image) data is transferred from the recording/reproduction device 201 to the printer 202, and used for decoding on the compressed video (image) data. In this case, even if the printer 202 does not have a decoder corresponding to the video (image) data compression method used by the recording/reproduction device 201, the compressed video (image) data can be always transferred. This improves the transfer efficiency in comparison with transfer of non-compressed video (image) data.

Figure 41:
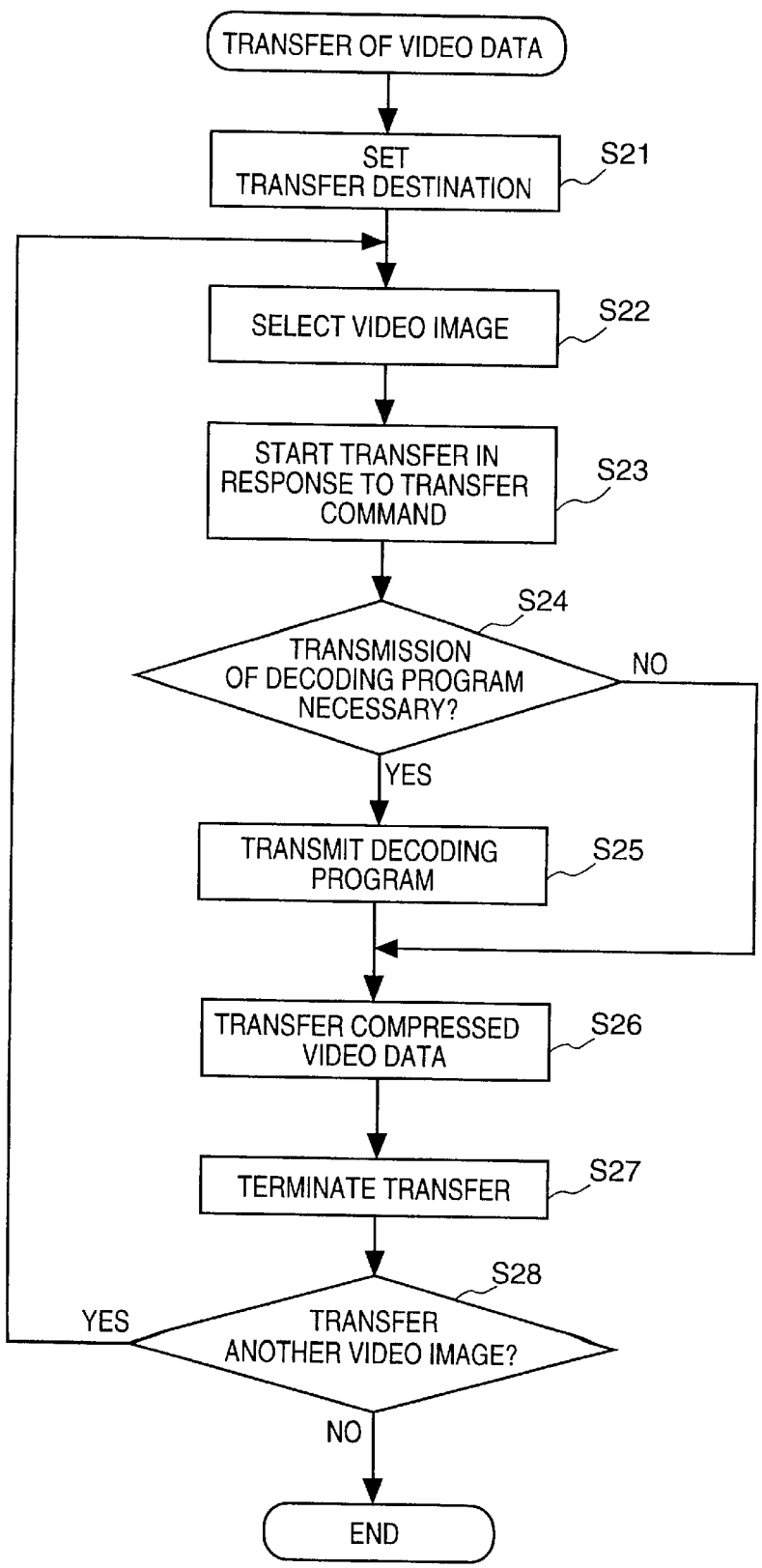
FIG. 41 is a flowchart showing the operation of the second embodiment.

The recording/reproduction device 201 may perform one compression method on all the video (image) data to be recorded in a recording medium, or may select one of a plurality of compression methods in accordance with data amount or recording time. FIG. 41 is a flowchart showing the operation of the present embodiment.

The system controller 9 performs transfer setting in accordance with the transfer destination designated by the user, i.e., the printer 202 in this case (step S21), and at step S22, reads data corresponding to a video image (image) selected by the user, to be transferred to the printer 202, from a plurality of video (image) data stored in the recording medium. At step S23, the system controller 9 starts transfer of the video (image) data read from the recording medium, in response to a transfer start command sent from the printer 203.

Next, the system controller 9 determines at step S24 whether or not it is necessary to transfer a decoding program to the printer 202 as the destination of video (image) data transfer. If YES, the system controller 9 reads the decoding program from the ROM 74 and transfers the program to the printer 202, at step S25. If it is not necessary to transfer the decoding program, i.e., the printer 202 has a function to decode the compressed video (image) data to be transferred, or the decoding program has been transferred already, the system controller 9 does not transfer the decoding program.

Then, at step S26, the system controller 9 controls the memory controller 16, the data selector 17 and the 1394 I/F 18 so as to read the compressed video (image) data, which has been read from the recording medium and stored into the frame memory 15, from the frame memory 15 and transfer the read data. The printer 202 decodes the compressed video (image) data in accordance with a predetermined operation procedure, and starts print processing on the obtained video (image) data.

When the transfer of the video (image) data has been completed at step S27, the system controller 9 determines at step S28 whether or not transfer of another video (image) data has been instructed by the user. If YES, the process returns to step S22 to repeat steps S22 to S28.

In the second embodiment having the above construction, compressed video (image) data is repeatedly transmitted by the asynchronous transfer, similar to the first embodiment as shown in FIG. 38, which enables retransmission of the video (image) data. Further, the printer 202 obtains data of a size corresponding to the buffer capacity of the buffer memory or the number of dots of the printhead of the printer 202, and performs printing based on the obtained data. Further, there is no problem in a case where print video (image) data is transferred as non-compressed video (image) data as shown in FIG. 33 from the recording/reproduction device 201 to the printer 202.

In this manner, according to the second embodiment, similar advantages to those of the first embodiment can be obtained in direct printing where video (image) data is directly transferred from a recording/reproduction device to a printer without processing by a PC or the like.

Note that in the above description, the abnormal status where data or a packet is omitted is mainly treated as a transfer error, however, abnormality of data, e.g., an error included in received data, detected by error checking, is also treated as a transfer error, and the present invention can corrects the abnormal portion caused by such transfer error.

As described above, according to the present invention, the information processing system and image processing system comprising a plurality of devices interconnected via a serial bus capable of the isochronous transfer and methods thereof, and image processing apparatus and computer readable memory, enable high-speed data transfer by the isochronous transfer and data correction in case of occurrence of abnormal portion such as omission of isochronous-transferred data. Accordingly, the obtained information has high accuracy and is reliable. This advantage is especially effective upon printing a still image.

[Third Embodiment]

Figure 42:
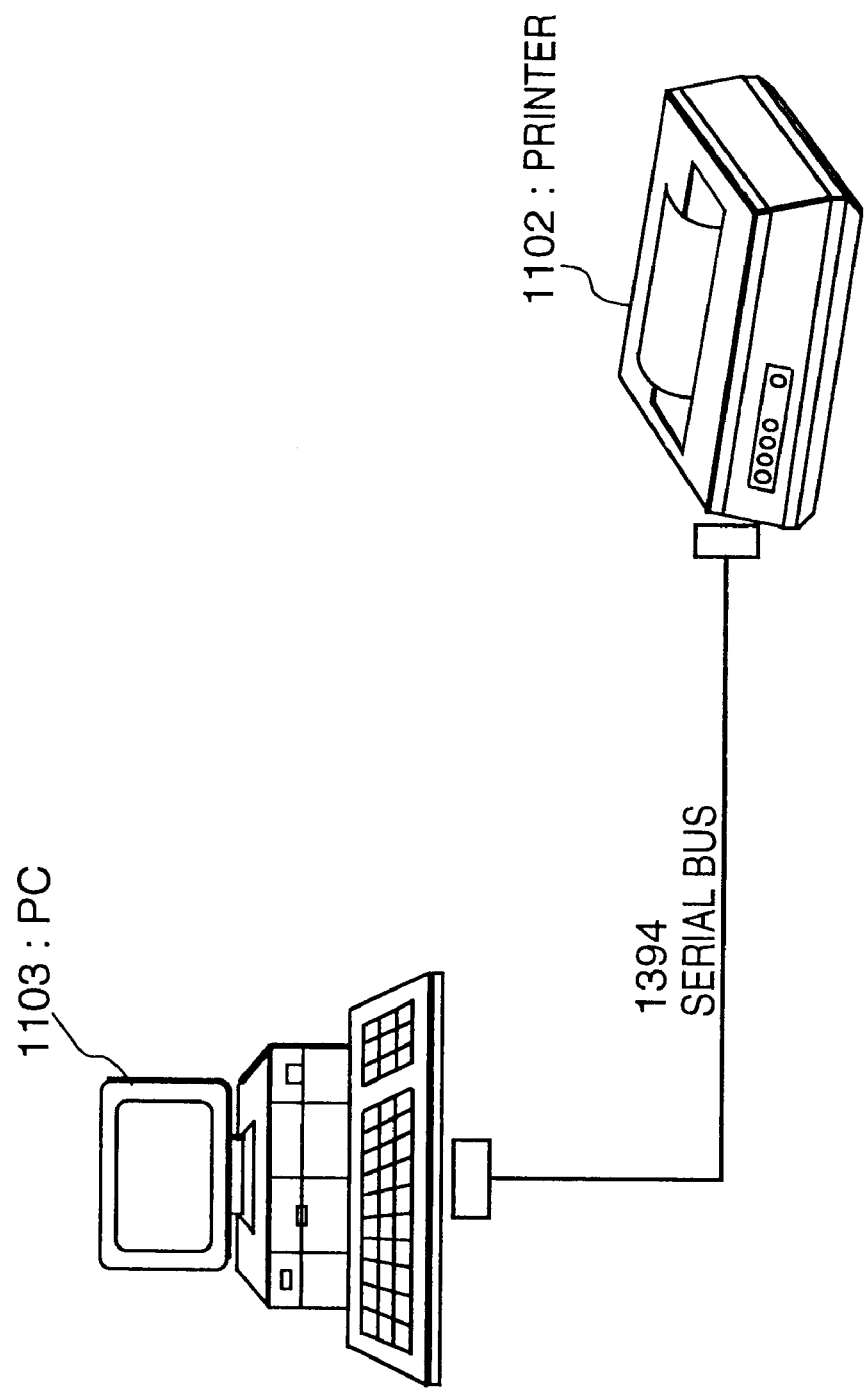
FIG. 42 is a diagram illustrating the configuration of a printing system in which various digital devices are connected in accordance with a third embodiment of the present invention.

FIG. 42 is a diagram illustrating the configuration of a printing system in accordance with a third embodiment of the present invention. Here the digital interface connecting the devices of the system employs an IEEE 1394 interface. This embodiment will be described for a case where the system is constructed by connecting the devices using a 1394 serial bus cable of the kind shown in FIG. 42.

The bus arrangement in FIG. 42 is constituted by a printer 1102 and a host (PC) 1103 connected by the 1394 serial bus, which is indicated by the solid line. The arrangement is such that the two devices can perform a data transmission based upon the specifications of the serial bus. The 1394 serial bus connection method is not limited to that shown in FIG. 42 and it is possible to construct the bus by any connection between the two devices. Further, the arrangement may be one in which data communication devices other than those illustrated in FIG. 42 are connected. It should be noted that the network shown in FIG. 42 is a group of devices serving as one example, and that the connected devices may be of any kind, e.g., an external storage device such as a hard disk, a CD-R and a DVD, etc., so long as a network can be constructed by the 1994 serial bus.

Figure 43:
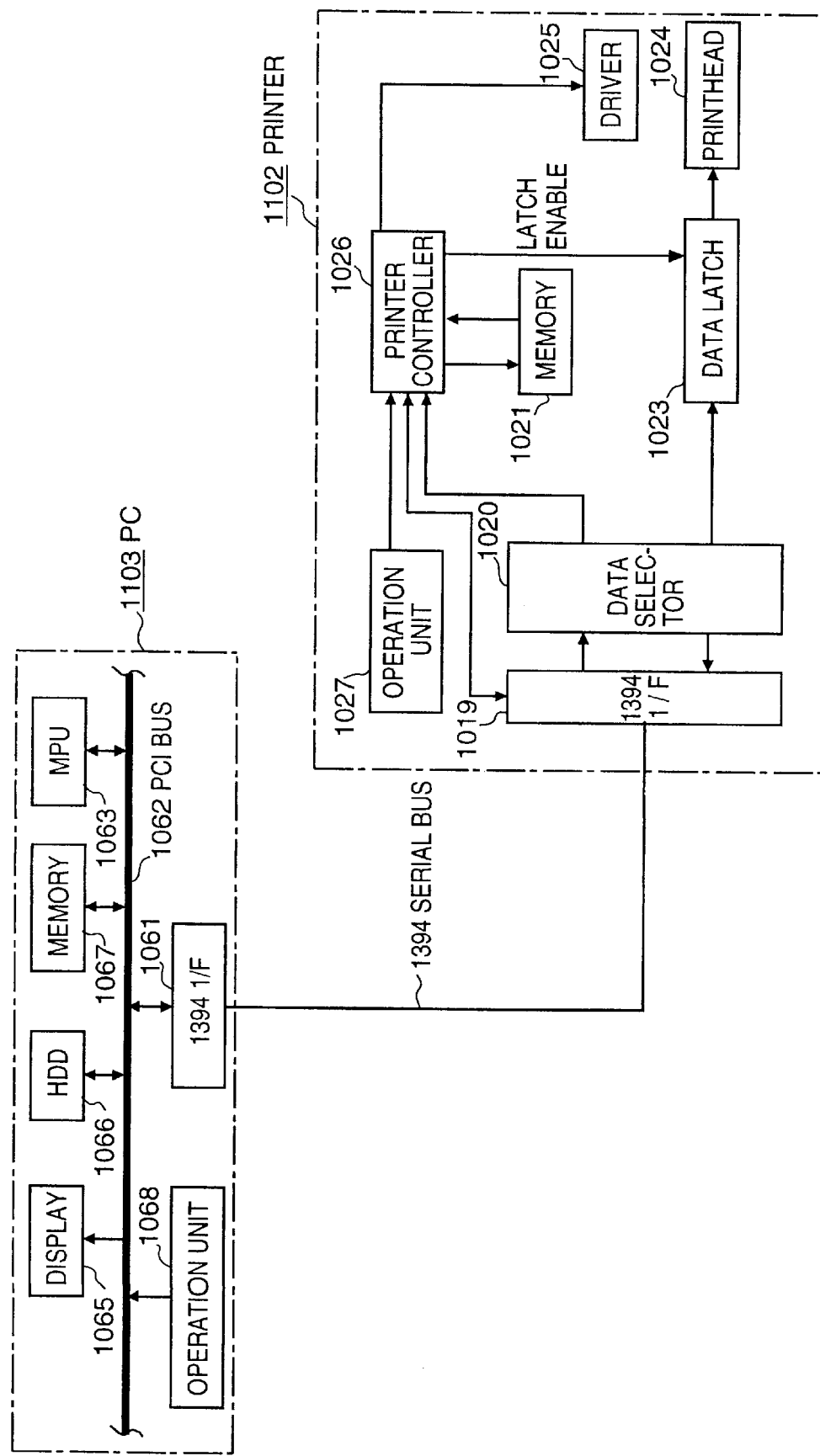
FIG. 43 is a block diagram showing the construction of a printing apparatus and the construction of a PC according to the third embodiment.

FIG. 43 is a block diagram showing the internal construction of each device depicted in FIG. 42. The illustrated system comprises the printer 1102 and the PC 1103.

The PC 1103 includes a 1394 interface (1394 I/F) 1061 through which data is exchanged with other devices; a PCI bus 1062 through which the other devices in the PC 1103 exchange data; an MPU 1063 for main control of the overall PC 1103; a display device 1065 for presenting a display; a hard disk 1066 serving as an auxiliary storage device; a main memory 1067 for main storage; and an operation unit 1068 manipulated by an operator and having a keyboard, a mouse and the like for entering various data in response to the particular operation.

The printer 1102 includes a 1394 interface (1394 I/F) 1019; a data selector 1020; a data latch 1023 for latching print data; a printhead 1024; a motor driver 1025 for driving various motors serving as driving sources which control the scanning of the printhead 1024 and the feeding of paper; a printer controller 1026 having a microcomputer or the like for performing overall control of the printer 1102; and a printer operation unit having various keys manipulated by the operator as well as a display device such as a liquid crystal panel.

The operation of the PC 1103 will be described first. Consider a case where the image data of an image data file having the ordinary RGB format and saved in the hard disk 1066 is printed in an environment in which an operator is running a graphic processing application on the PC 1103 using the operation unit 1068.

Image data conversion processing is executed first. Specifically, image data is temporarily written to the main memory 1067 by the application, image conversion processing is applied to the data by the MPU 1063 to convert the data having the RGB format to binarized data in the YMCK format that is suited to the output format of the printhead 1024 of printer 1102, and the resulting data is written to the hard disk 1066 again. Next, if a print instruction issued by the application is received, the binarized image data that has been stored in the hard disk 1066 is read out at a suitable time and is sent to the printer 1102 via the 1394 I/F 1061. It should be noted that command data for printer control such as scanning of the printhead 1024, paper line feed and paper discharge is sent to the printer 1102 first in conformity with the operation of the printer. When printing is performed, this is executed while only the image data is transmitted in real-time.

The operation of the printer 1102 will be described next.

Data that has entered via the 1394 I/F unit 1019 is classified by the data selector 1020 according to data type. First, image data that has been transmitted by isochronous transmission is sent to the data latch 1023. When data in a quantity corresponding to one vertical row of the printhead 1024 has been latched in the data latch 1023, the data is output to the printhead 1024 at the timing of a trigger signal from the printer controller 1026. Further, command data is stored temporarily in the memory 1021 of the printer controller 1026. When a print start instruction (print start command) based upon isochronous transmission is issued, control of scanning by the printhead 1024 and of timing of an ink discharge trigger is carried out. At this time print image data that has entered the data latch 1023 is YMCK bi-level data that the PC 1103 has subjected to image processing suited to the printer. Accordingly, the data can be sent directly to the printhead 1024 and printed thereby. Furthermore, control signals based upon the command data and issued by the printer controller 1026 actuate the motors of the printer 1102 via the driver 1025, and the image data that has been written to the data latch 1023 is output from the latch to the printhead 1024 at a timing that conforms to control of the motors, whereby a printing operation is performed. The printer operation unit 1027 is for entering commands for such operations as paper feed, reset, ink check and standby/start/stop of printer operation. Various components are controlled by the printer controller 1026 in response to the commands entered. By thus sending image data binarized in the PC 1103 to the printer 1102 by synchronous transmission, it is possible to print even a large quantity of image data without providing the interior of the printer 1102 with a large-capacity print buffer.

Figure 44:
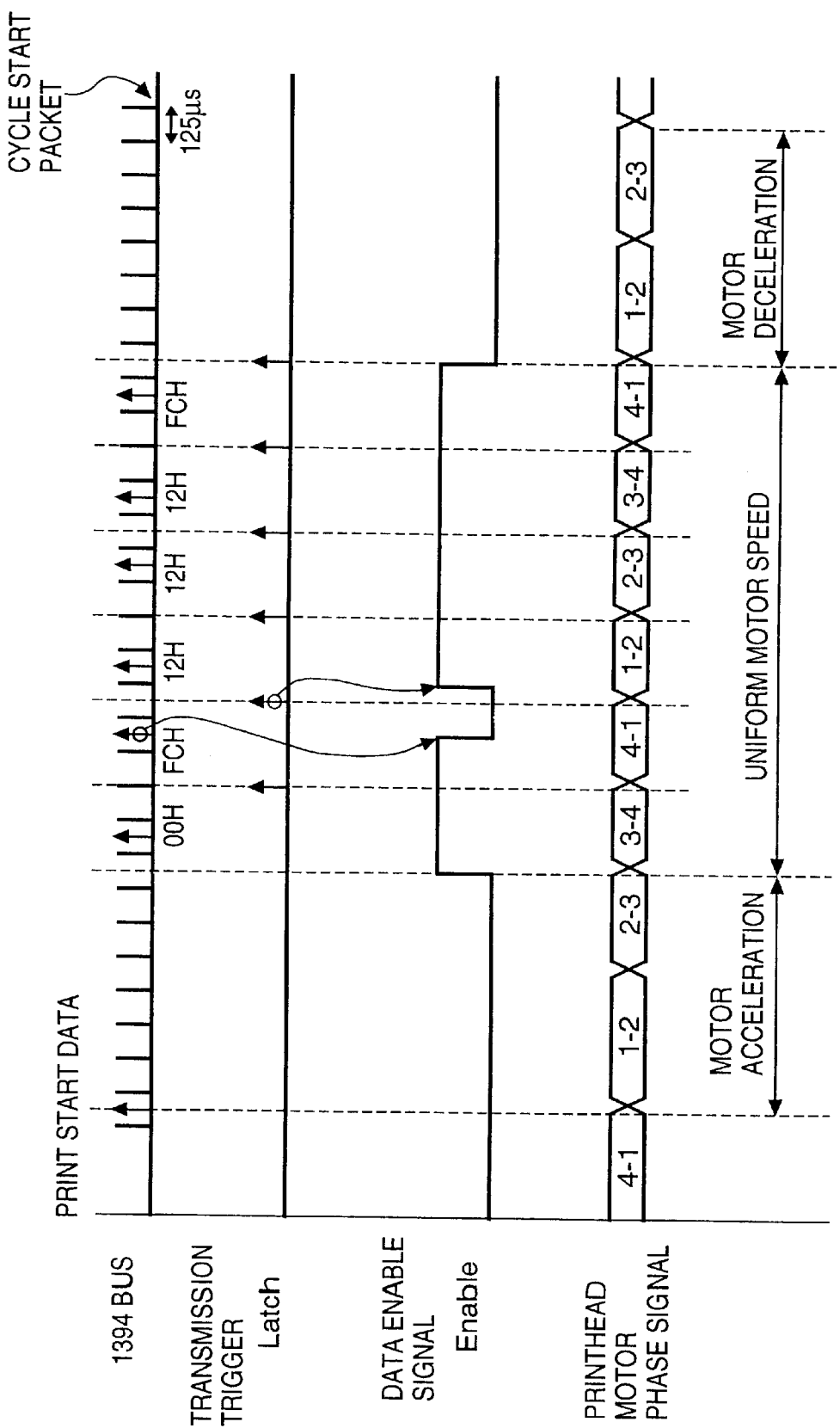
FIG. 44 is a timing chart illustrating the flow of data transmission between the PC and printing apparatus according to the third embodiment.

FIG. 44 is a timing chart showing the relationship between the timing of isochronous transmission of image data on the 1394 serial bus and the timings of a transmission trigger signal, data enable signal and printhead motor phase signal that are output from the printer controller 1026 following the readout of command data that has been stored temporarily in the memory 1021 of the printer 1102.

Cycle start packets are generated in units of 125 s and data is sent to the 1394 serial bus by isochronous transmission in sync with the cycle start packets. When printing is performed, it is required that the image data be sent from the PC 1103 in conformity with the motion of the printhead 1024. Accordingly, the printer 1102 begins counting time for print start at the moment image data for print start (PrintStart) is received. Since a group of command data that has been stored temporarily in the memory 1021 is information relating to sequence control for driving the printhead 1024, the command data is read out of the memory 1021 successively while synchronization is achieved with the time count after the print start data is received, and the printhead 1024 is accelerated while changing over the motor phase signal (the case illustrated in FIG. 44 is 1–2 phase excitation) in order to scan the printhead 1024. From the moment the carriage (head) enters a region of uniform speed, image data is acquired from the PC 1103 and the transmission trigger is output at the timing of the next ink discharge, whereby ink-jet printing is performed. It should be noted that "00H", "FCH", "12H", "12H", "12H" and "FCH" in the image data shown in FIG. 44 correspond to the character pattern data of FIG. 47, where "H" indicates a hexadecimal number.

More specifically, image data can be transmitted from the PC 1103 in successive fashion and printer control synchronized to the motion of the printhead 1024 can be carried out by the timing at which the printhead 1024 reaches the set position (the region of uniform speed) and the transmission trigger is issued. Since the image data has been converted to binary YMCK data that corresponds to the print data of the ink-jet printer 1102, the printer 1102 is capable of transmitting the print data directly to the printhead 1024 through the data latch 1023 without the intermediary of a printer buffer. After the transmission of one line of image data is completed, the carriage motor that scans the printhead 1024 is decelerated in accordance with the command data that has been stored in the memory 1021 and the motor eventually comes to rest when one line of image data has been printed.

The foregoing is a description of the printing operation sequence using isochronous transmission.

Figure 45:
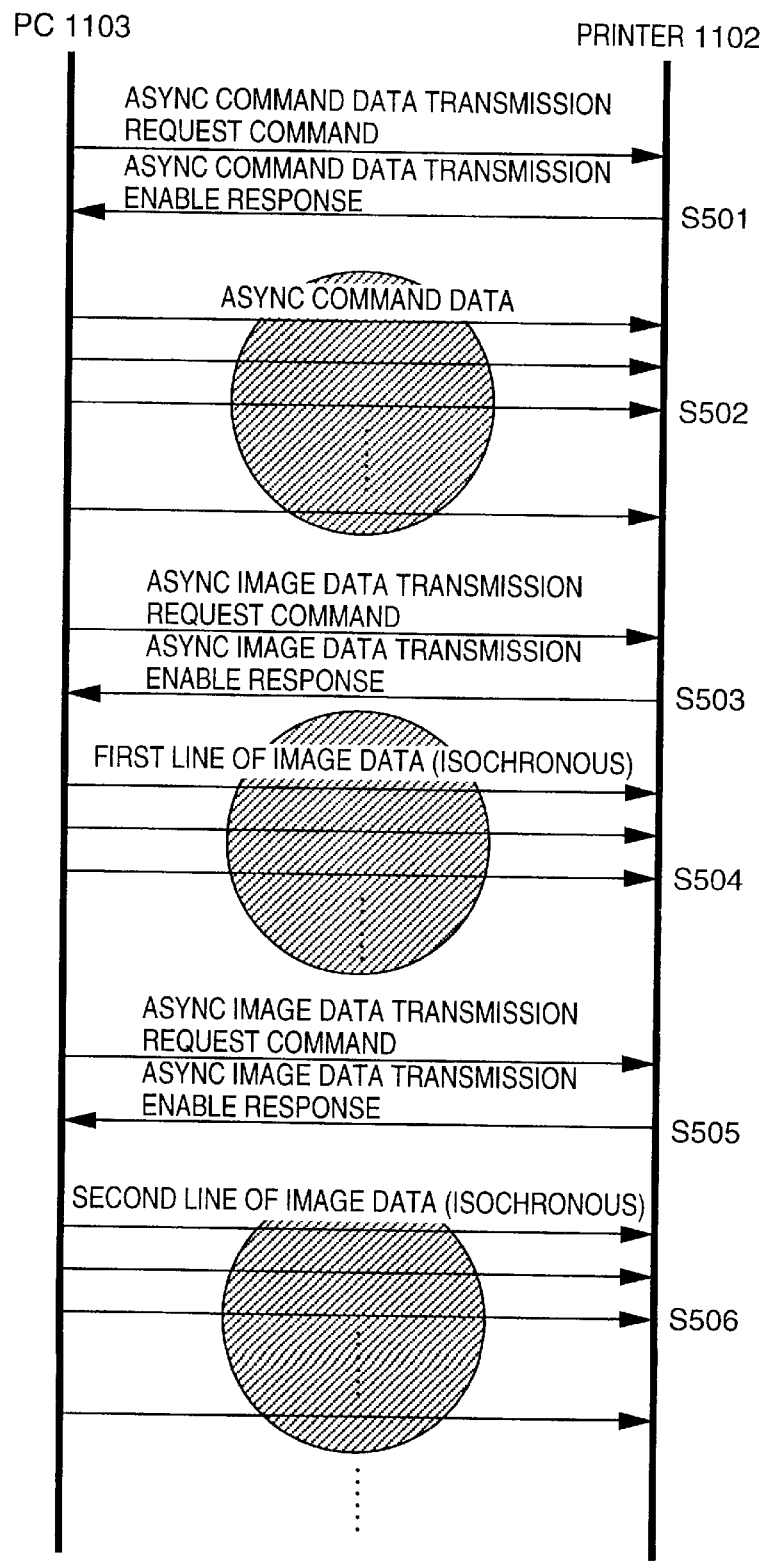
FIG. 45 is a diagram useful in describing the sequence of a data transmission, which is for performing printing, between the PC and printing apparatus according to the third embodiment.

FIG. 45 is a diagram useful in describing the sequence of a data transmission for printing using asynchronous and isochronous transmission between the PC 1103 and printer 1102.

First, if the printer 1102 has been prepared to accept an input, then transmission enable using response data is indicated by a command data transmission request command, which uses asynchronous transmission, from the PC 1103 at S501. If the printer 1102 has not been prepared, then transmission standby is indicated using response data and the system waits until the PC 1103 makes an inquiry again.

If transmission enable is sent back to the PC 1103, then command data composed of a control sequence that is for causing the printhead 1024 to move one line is sent to the printer 1102 at a stroke at step S502 using asynchronous transmission. To accomplish the transmission of command data, only a data transmission is performed and no particular response is required.

Next, at S503, the PC 1103 transmits an image data transmission request command that uses asynchronous transmission. If the printer 1102 is already in a state in which it is capable of printing, then the PC 1103 designates transmission enable based upon response data. If the printer 1102 has not attained a state in which it can print, then transmission standby is designated using the response data and the system waits until an inquiry arrives from the PC 1103 again.

Next, S504 indicates a step for a case where transmission of image data has been allowed. At this step the PC 1103 sends one line of image data by isochronous transmission in conformity with the operation of the printhead 1024. The printing operation starts from the timing at which the print start data is transmitted, and the motor control signals for the printhead 1024 and transmission trigger signal are output at any timing while the command data in memory 1021 is successively read out. At this time the PC 1103 performs a real-time data transmission for transmitting image data prior to the timing at which the transmission trigger is generated. This means that it is unnecessary to provide the printer 1102 with a print buffer. Printing is completed when transmission of one line of data is finished. However, if the printing mode is for printing in one direction, then it is required to perform a head position return operation and a paper line-feed operation in order to print the second line. If the printing mode is for printing in two directions, only the paper line-feed operation need be performed.

If the printer 1102 is already in a state in which it is capable of printing the second line, then transmission enable using response data is indicated by an image data transfer request command for the second line based upon asynchronous transmission, this command being issued by the PC 1103 at S505. If the printer 1102 has not yet attained the state in which it can print the second line, then transmission standby is indicated using response data and the system waits until the PC 1103 makes an inquiry again.

At step S506 the PC 1103 sends the second line of image data by isochronous transmission in conformity with the printing operation of the printer 1102.

The printing of one page can be carried out by repeating this operation.

Figure 46:
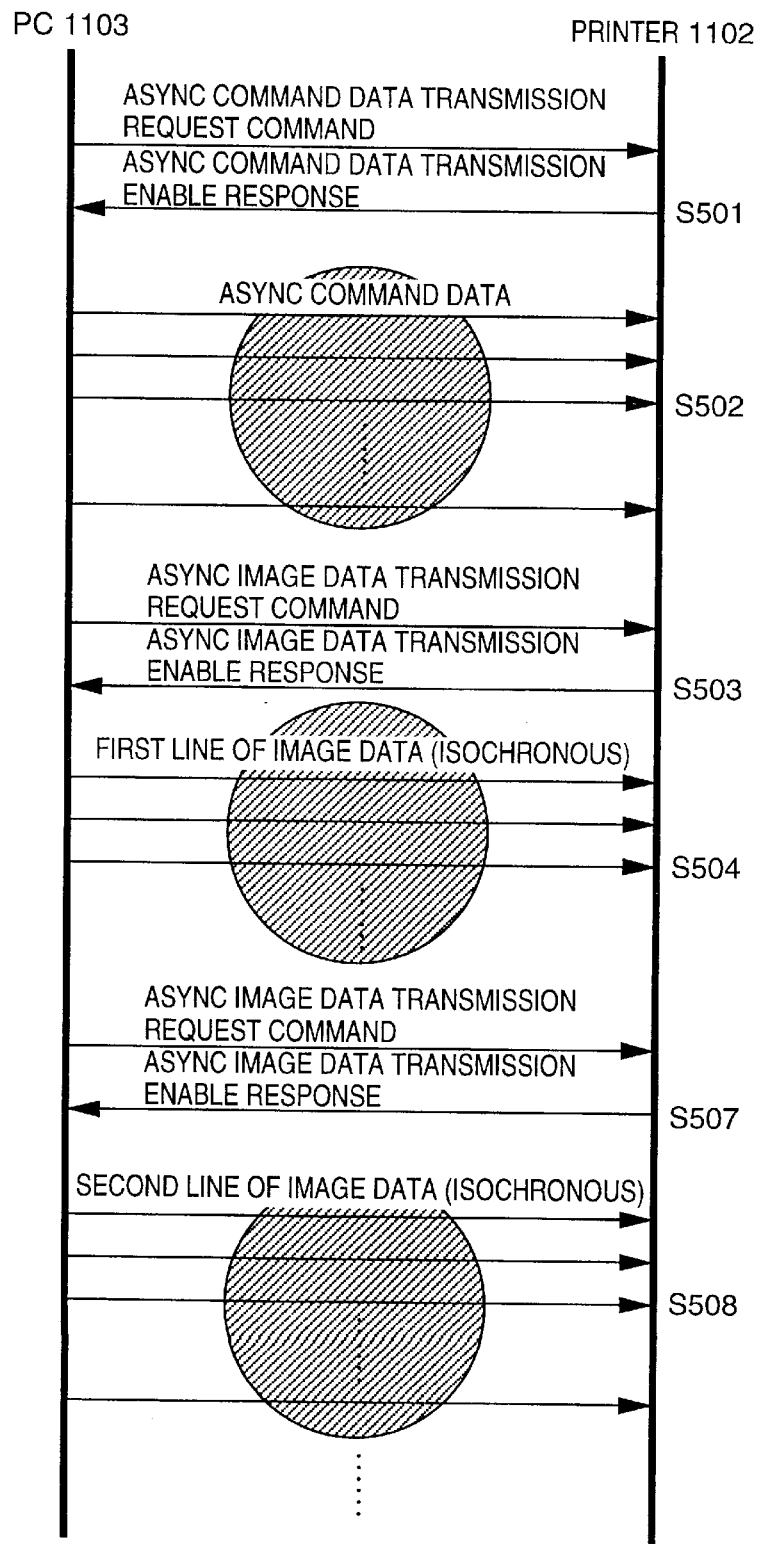
FIG. 46 is a diagram useful in describing the sequence of a data transmission, which is for performing printing, at the time of occurrence of an error in an isochronous transmission between the PC and printing apparatus according to the third embodiment.

FIG. 46 is a diagram useful in describing a case where the packet transmission of image data by isochronous transmission develops a transmission error on the 1394 serial bus, resulting in incorrect transmission of data during printing.

Steps S501 to S504 indicate processing similar to that of the identically numbered steps in FIG. 45. In a case where an error develops in an isochronous transmission, the printer 1102 issues an image data re-transmission response which specifies retrying of the image data by response data in response to the image data transmission request command. The PC 1103 responds at step S508 by repeating the output of one line of image data in the same manner as at step S504, thereby making it possible to deal with an error in a data packet. In regard to the response data, it is not required to verify in which packet the error occurred, and it will suffice if the image data output from the PC 1103 again is exactly the same data at that of the first line output previously. In other words, it is so arranged that processing regarding the error data is executed on the side of the printer 1102.

This error processing executed by the printer 1102 will be described with reference to FIGS. 47 through 49.

Figure 47:
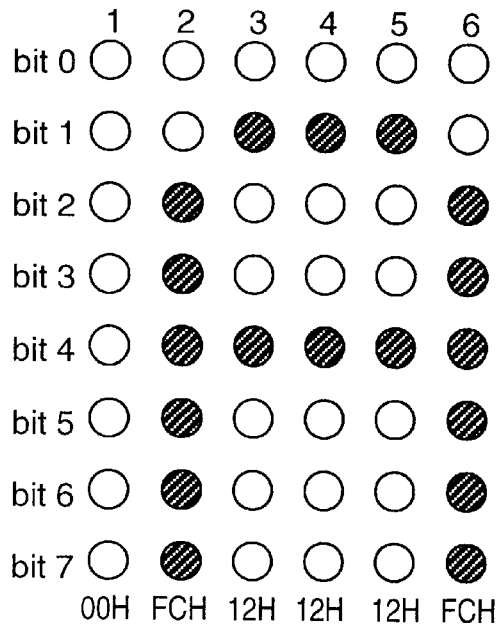
FIG. 47 is a diagram illustrating an example of the structure of character pattern data of image data "A" formed by eight vertical dots and six horizontal dots.

FIG. 47 is a diagram illustrating an example of a character pattern of image data "A" formed by eight vertical dots and six horizontal dots.

With reference to this pattern and the timing chart of FIG. 44, the 8×6 dot data can be printed using the printhead 1024, which jets eight dots of ink at one time, and six transmission triggers. The image data transmitted at this time is "00H", "FCH", "12H", "12H", "12H", "FCH" in the order of printing.

Figure 48:
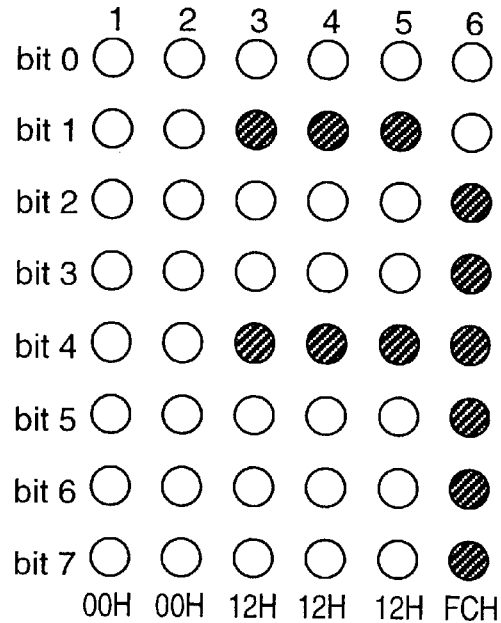
FIG. 48 is a diagram illustrating data in a case where a second item of data "FCH" has not been sent to the printing apparatus owing to occurrence of a data transmission error.

FIG. 48 is a diagram illustrating a case where the second item of data "FCH" has not been sent to the printer 1102 owing to occurrence of a data transmission error. When an error packet has occurred, an error flag only is transmitted instead of data. At this time, therefore, the printer 1102 executes processing upon replacing the erroneous image data by "00H". In other words, the operation sequence is completed with the result of printing being such that the data in the second column from the left is missing.

The data enable signal in FIG. 44 indicates operation in this case. If the second item of data "FCH" is an error packet, this data enable signal is set to the low level (disabled) and the output of transmission data is converted to "00H". Thereafter, following the issuance of the transmission trigger, the data enable signal is set to the high level (enabled) again.

Figure 49:
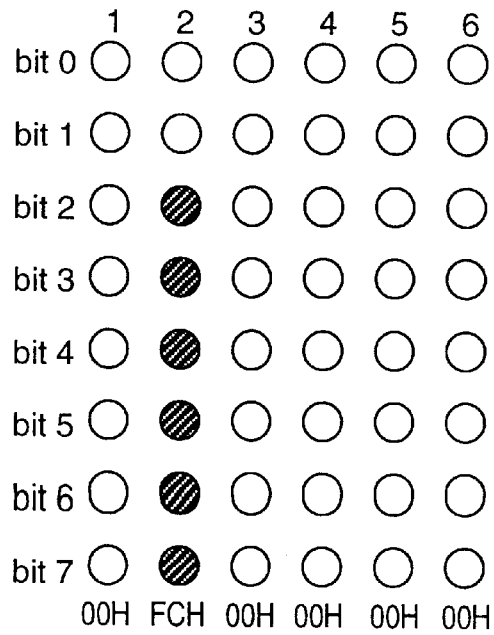
FIG. 49 is a diagram illustrating data for performing printing again to compensate for a transmission data error when such an error occurs.

FIG. 49 is a diagram illustrating data for performing printing again to compensate for a transmission data error.

In a case where the printer 1102 prints in one direction, the printer 1102 performs a line-feed operation to feed one line of the printing paper and a return operation to return the printhead 1024 at the stage where the operation sequence is completed, whereby the printhead 1024 is moved to the initial position to prepare for the printing of the ensuing image data. If the image data transmission request command is now transmitted, the transmission enable response is issued. However, when an error packet occurs in the printing of this line, the printhead 1024 only is returned without the single line feed of the printing paper being performed, and the re-transmission response data is issued to the PC 1103 so as to re-transmit image data, which is the same as the previous image data, as is. The location of a data packet in which an error occurred previously has been stored by an error flag. Therefore, when the printer 1102 executes printing again, the portion of the data in which there was no error previously is converted to "00H" by disabling the output enable bit of the data latch 1023, only the data packet portion for which the previous error flag exists is enabled and the image data is transmitted to the printhead 1024.

Figure 50:
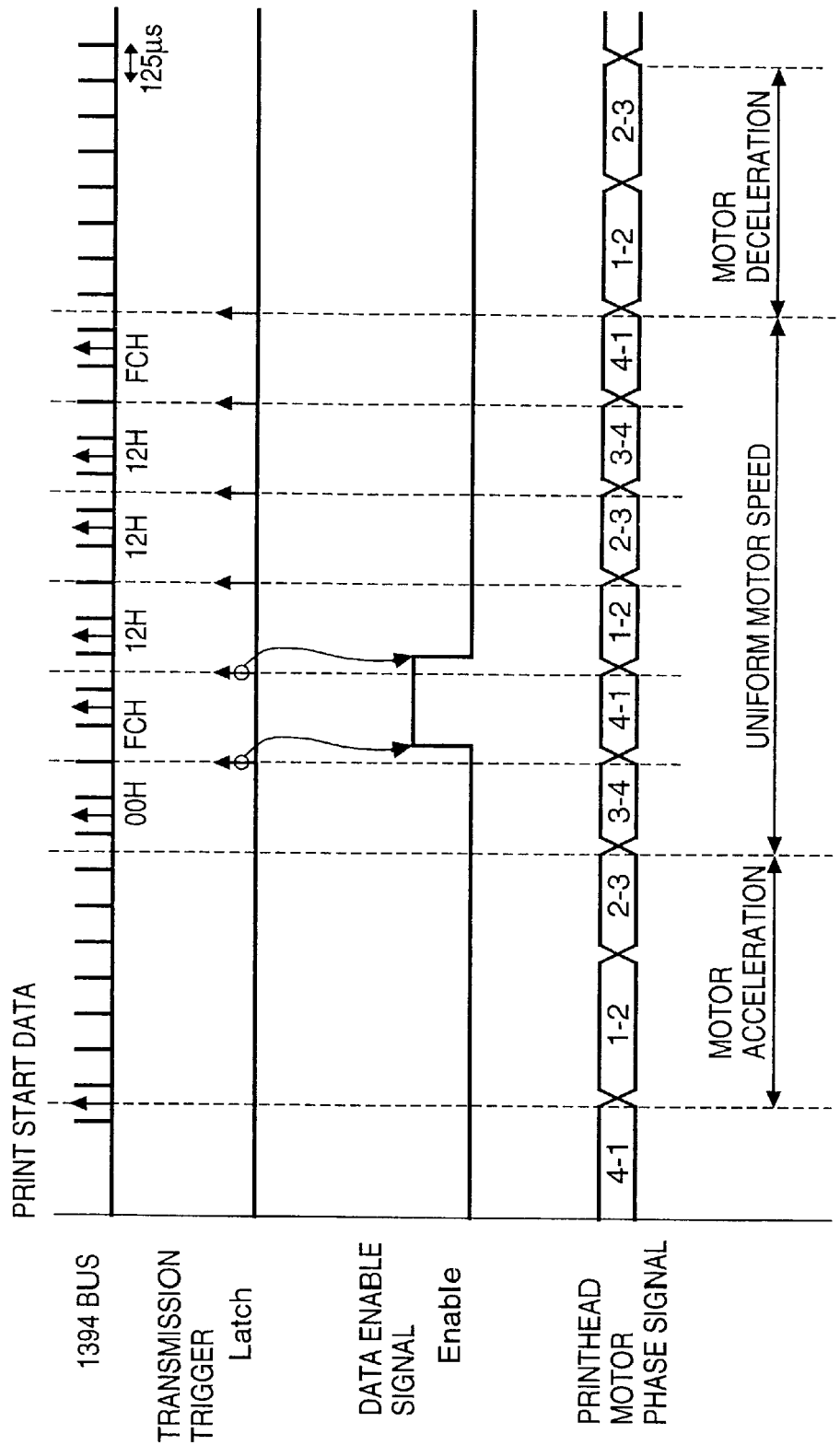
FIG. 50 is a timing chart illustrating the flow of data transmission based upon error retry in a data transmission between the PC and printing apparatus according to the third embodiment.

FIG. 50 is a timing chart illustrating, in regard to processing for a printing operation based upon error retry, the relationship between the timing of isochronous transmission of image data on the 1394 serial bus and the timings of a transmission trigger signal, data enable signal and motor drive signal that are output from the printer controller 1026 attendant upon the command data that has been stored temporarily in the memory 1021 of the printer 1102.

The data enable signal in FIG. 50 becomes an error packet correction signal controlled by the printer 1102. Error processing is executed by setting this signal to the high level (enabled) only at the time of the second packet "FCH", for which there was an immediately preceding error flag and, since printing has already been completed previously in regard to the other packets, by setting this signal to the low level (disabled) with respect to these other packets.

The exchange of commands and responses in asynchronous transmission according to the third embodiment is carried out using the command frame and response frame of the FCP described above.

The type of command frame can be set by the four bits of ctype (command type). However, "0H" prevails at the time of an ordinary command, and the status is "1H". Accordingly, as an extended function, the value of ctype is made "4H" when the printer control command data is sent by the no-response FCP, and is set to "5H" when the image data is sent by the no-response FCP. More specifically, when the data is sent, ctype is set to "4H" or "5H", and it is possible to embed the command data or image data directly instead of an operand op code. When ordinary command data is sent, the value of ctype is set to "0H" and the command data transmission request command or image data transmission request command is transmitted in the form of an operand op code.

Further, in regard to the reply to a command frame, an enable response, standby response or re-transmission response is transmitted in the form of an op code operand using the response frame, thereby making it possible to execute a transaction operation.

In the system in which the image data is transmitted to the printer 1102 by isochronous transmission, the above-described error processing is such that if an error packet occurs, an image data re-transmission request is issued using a re-transmission response, and the PC 1103 transmits image data that is the same as the immediately preceding image data, whereby it is possible to correct for the data on the side of the printer 1102.

More specifically, it is not required for the PC 1103 to expressly produce correction data anew in data packet units. As a result, data creation time is shortened. Further, a finely detailed exchange is not necessary between the printer 1102 and PC 1103, and error processing is executed merely by having the printer 1102 notify the PC 1103 whether or not an error has occurred by means of response data, namely data that is in response to an image data transmission request.

Figure 51:
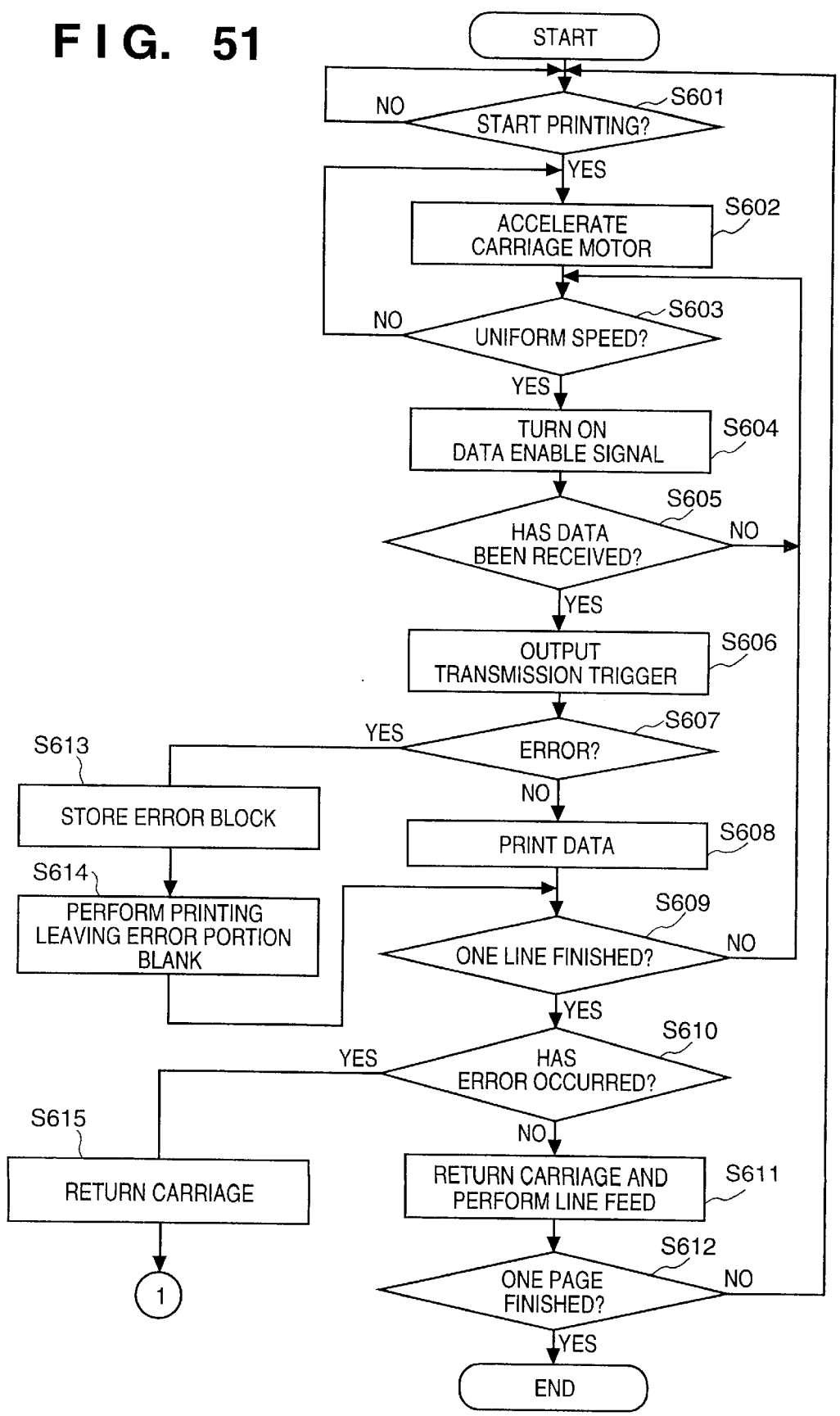
FIG. 51 is a flowchart illustrating print processing in the printing apparatus of a printing system according to the third embodiment.
Figure 52:
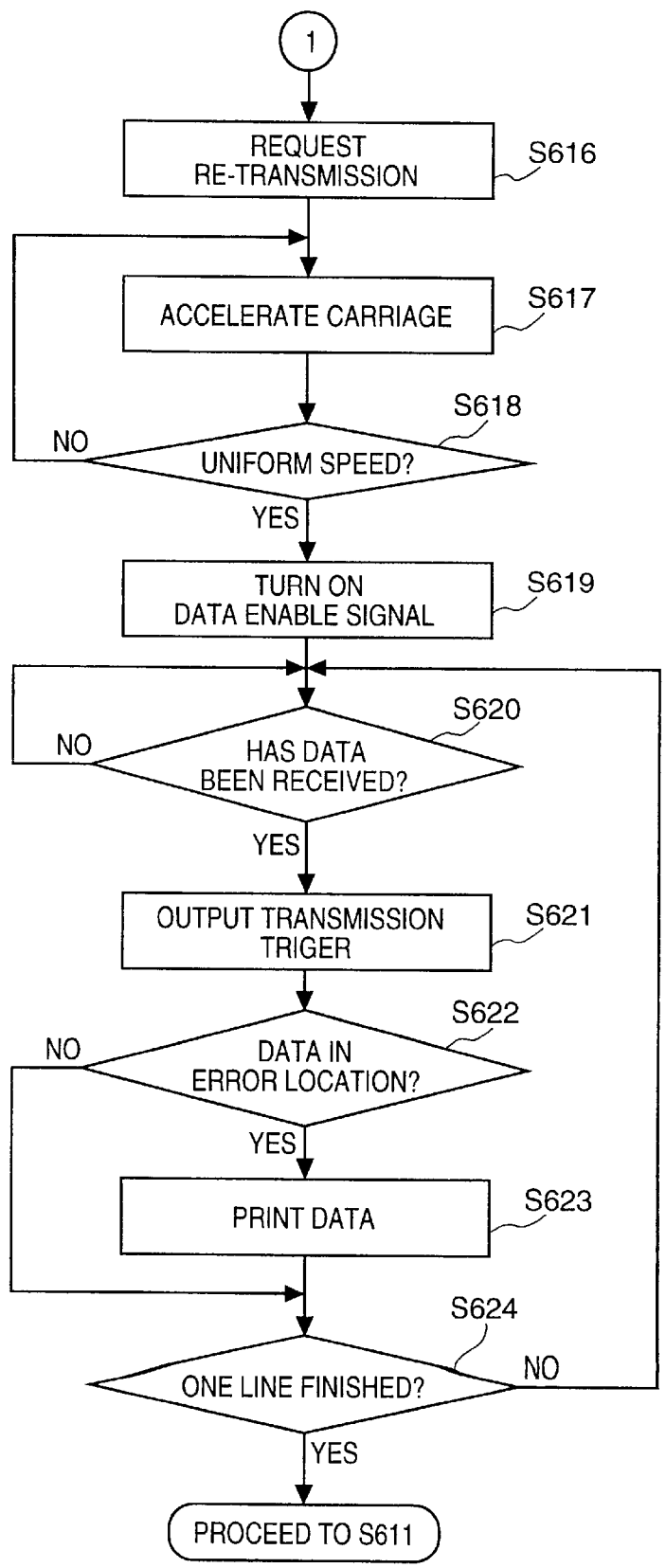
FIG. 52 is a flowchart illustrating print processing in the printing apparatus of a printing system according to the third embodiment.

FIGS. 51 and 52 are flowcharts illustrating processing executed by the printer 1102 of the printing system according to the third embodiment.

When a print start signal is received from the PC 1103 at step S601, the program proceeds to step S602, at which the printer starts the acceleration of the carriage motor (printhead 1024), and then to step S603. If it is determined here that the speed has become uniform, then the data enable signal is turned on (raised to the high level) at step S604. The program then proceeds to step S605, at which the printer determines whether data has been received from the PC 1103. If the data has been received, the transmission trigger is output at step S606 so that the received data is latched in the data latch 1023. Next, at step S607, the printer determines whether the received data block has an error. If there is no error, the program proceeds to step S608, at which the data is output to the printhead 1024 and printed. The printer then determines at step S609 whether the printing of one line is finished. If the printing of one line is not finished, then the program returns to step S605 and the above-described processing is executed again.

If it is found at step S607 that an error has occurred, then the program proceeds to step S613, at which the location of the data block in which the image has occurred is stored and the erroneous portion is left blank in the printing operation. If it is found at step S609 that the printing of one line is finished, then the program proceeds to step S610, at which the printer determines whether an error has occurred in this line. If no error has occurred, then the program proceeds to step S611, where the carriage is returned and the printing paper is fed by one line. This is followed by step S612, at which the printer determines whether the printing of one page is finished. The above-described processing is executed until the processing for printing one page is completed.

If it is found at step S610 that an error has occurred, then the program proceeds to step S615, at which only the carriage return operation is carried out, and then to step S616, at which the printer issues the data re-transmission request to the PC 1103. Next, steps S617~S621 are executed. In a manner similar to that of the steps S602~S606 described above, the printer executes these steps to accelerate the carriage, receive data from the PC 1103 and latch the data in the data latch 1023. The printer determines at step S622 whether the data that has been received and latched is data that corresponds to the location at which the error occurred the previous time. If the answer is "YES", then the program proceeds to step S623, where the printer prints the portion of the data corresponding to the error location. If the answer is "NO", then the reading of the data is skipped.

[Fourth Embodiment]

Generally, in a serial-type ink-jet printer, the accuracy of the amount of feed at the time of paper line feed often is lower than the resolution of the printhead. Consequently, if printing is performed in single line units, then the gap (unevenness) from line to line becomes conspicuous. Accordingly, multiple-pass printing is used to make this unevenness unnoticeable. Specifically, the printing of data is split into two or more passes and the amount of paper line feed is reduced correspondingly to one-half or less, whereby the data is printed in overlapping fashion while being shifted accordingly. In such multiple-pass printing, a case in which the print data is printed in two, three or four cycles is referred to as 2-pass, 3-pass and 4-pass printing, respectively. In case of 2-pass printing, the image data is divided up into two-stage data using random patterns that will make unevenness unnoticeable, and printing is performed in units of one-half line, thus making it possible to print one page of image data without producing gaps in units of one line. Though unevenness can be made difficult to notice whenever the number of passes is increased, as to three passes or four passes, a drawback is that printing time lengthens correspondingly. Printing quality and speed, therefore, are mutually exclusive.

Accordingly, consider multiple-pass printing carried out in a system in which printing is performed in real-time using image data relying upon isochronous transmission in a 1394 serial bus. If use is made of a method in which printing is performed using the same data as previously when an error packet has occurred, as in the third embodiment described above, multiple-pass printing, which is already low in speed, becomes even slower.

According to the fourth embodiment, therefore, when error processing is executed in isochronous transmission, information that is capable of specifying the location of packet data in which there was an error last time is placed in the response data issued in response to the image data transmission start command, and only the portion of the data in the data packet for which the previous error occurred is superimposed on the image data sent next. In other words, image data of the portion which has become blank data owing to an error is superimposed on the next image data and processed on the side of the PC 1103, whereby the printer 1102 need only print the image data as is to implement error processing. This makes it possible to avoid excessive printing time.

The processing for this case will be described with reference to the flowchart of FIG. 53.

Figure 53:
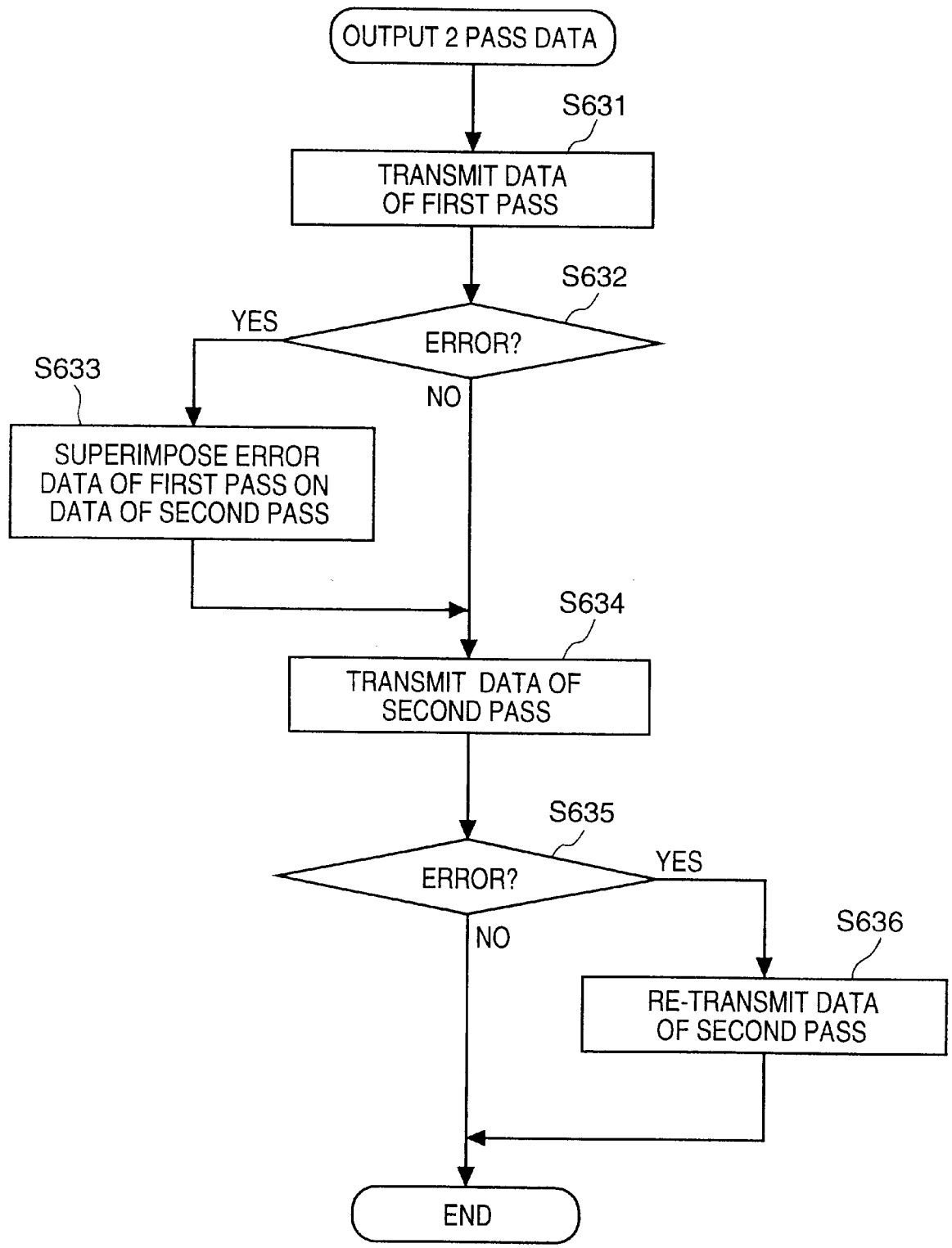
FIG. 53 is a flowchart illustrating print data transmission processing in a PC according to a fourth embodiment of the present invention.

FIG. 53 is a flowchart illustrating transmission processing, which is executed by the PC 1103, for transmitting multiple-path print data (data printed in two passes by the printer 1102) to the printer 1102.

The PC 1103 transmits the print data of one pass to the printer 1102 at step S631 in the same manner as in the third embodiment. After the transmission of one pass of data, the PC 1103 determines whether error re-transmission information has been sent from the printer 1102. If the answer is "NO", then the program proceeds to step S634, at which the PC 1103 transmits the data of the second pass.

When an error has occurred in the data transmission of the first pass, the program proceeds to step S633. Here the print data in which the error occurred in the first pass is superimposed on the data of the second pass transmitted next, whereby there is created new print data for the second pass. This data is transmitted to the printer 1102. As a result, the printer 1102 is capable of performing printing in the same manner as in the case of ordinary data reception. If an error occurs in the second pass, it will suffice for the PC 1103 to re-transmit only that portion of the data of the second path in which the error occurred. Alternatively, an arrangement may be adopted in which the PC 1103 re-transmits all of the data of the second pass, as in the manner of the third embodiment, and the printer 1102 performs printing upon determining the relevant position.

In accordance with this embodiment, as described above, there is provided means for eliminating, to the maximum extent, the problems encountered with the conventional interface. Specifically, when peripheral equipment such as a PC or printer or a recording/reproduction device such as a digital still camera or digital video camera is connected to a network, the communication of data between these digital devices is performed by a real-time data transmission at high speed, and processing is executed to compensate for any loss of data at such time.

Further, optimum data transmission means is provided through an arrangement in which image data to be printed is sent by isochronous transmission from the PC 1103 to the printer 1102, the printer 1102 performs printing while acquiring in real-time the image data necessary for printing, and it is unnecessary for a large-capacity print buffer to be provided on the side of the printer 1102.

Furthermore, it is possible to realize, through the same system configuration, direct printing in which image data is transmitted directly from a data output device such as a digital video camera to the printer without using a PC.

In accordance with the present invention, as described above, print data transmitted from a host can be printed while making up for any loss of data.

Further, in accordance with the present invention, as described above, high-speed printing can be performed without requiring that the printing apparatus have a large-capacity print buffer.

Further, in accordance with the present invention, as described above, if an error develops in print data, it is possible to recover from the error efficiently so that printing can be performed at high speed.

[Other Embodiment]

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

What is claimed is:

1. An information processing system having devices connected by a serial bus which is capable of isochronous transfer, said system comprising:

supply means for repeatedly transmitting data stored in a storage medium by the isochronous transfer; and reception means for receiving the data transmitted by the isochronous transfer;

wherein if the data received by said reception means includes an abnormal portion, said reception means corrects the abnormal portion by using the data repeatedly transmitted by the isochronous transfer.

2. The system according to claim 1, wherein if said supply means transmits coded data by the isochronous transfer, said supply means transmits a decoding program corresponding to a coding method of the coded data prior to transmission of the coded data.

3. The system according to claim 2, further comprising decoding means for decoding the coded data received by said reception means, based on the decoding program received by said reception means.

4. The system according to claim 2, wherein the decoding program is transmitted by asynchronous transfer.

5. The system according to claim 4, wherein the asynchronous transfer is adapted to or based on the IEEE 1394 standards.

6. The system according to claim 1, wherein the serial bus is a bus adapted to or based on the IEEE 1394 standards.

7. The system according to claim 1, wherein the isochronous transfer is adapted to or based on the IEEE 1394 standards.

8. The system according to claim 1, further comprising output means for outputting the data received by said reception means to a printer.

9. The system according to claim 8, wherein the printer is an ink-jet printer.

10. An information processing method for devices connected by a serial bus which is capable of isochronous transfer, said method comprising the steps of:

repeatedly transmitting data stored in a storage medium by the isochronous transfer;

receiving the data transmitted by the isochronous transfer; and if the data received at said reception step includes an abnormal portion, correcting the abnormal portion by using the data repeatedly transmitted by the isochronous transfer.

11. An information processing system having devices connected by a serial bus which is capable of isochronous transfer, said system comprising:

supply means for repeatedly transmitting data stored in a storage medium by the isochronous transfer;

reception means for receiving the data transmitted by the isochronous transfer; and output means for outputting the data received by said reception means to a printer, wherein said reception means receives the data repeatedly transmitted by the isochronous transfer by said supply means, in a unit corresponding to a capability of the printer.

12. The system according to claim 11, wherein the printer is an ink-jet printer.

13. The system according to claim 11, wherein if said supply means transmits coded data by the isochronous transfer, said supply means transmits a decoding program corresponding to a coding method of the coded data prior to transmission of the coded data.

14. The system according to claim 13, further comprising decoding means for decoding the coded data received by said reception means, based on the decoding program received by said reception means.

15. The system according to claim 13, wherein the decoding program is transmitted by asynchronous transfer.

16. The system according to claim 15, wherein the asynchronous transfer is adapted to or based on the IEEE 1394 standards.

17. The system according to claim 11, wherein the serial bus is a bus adapted to or based on the IEEE 1394 standards.

18. The system according to claim 11, wherein the isochronous transfer is adapted to or based on the IEEE 1394 standards.

19. An information processing method for devices connected by a serial bus which is capable of isochronous transfer, said method comprising the steps of:

repeatedly transmitting data stored in a storage medium by the isochronous transfer;

receiving the data repeatedly transmitted by the isochronous transfer, in a unit corresponding to a capability of a printer as a receiver of the data; and outputting the data received at said reception step to the printer.

20. An image processing system having devices connected by a serial bus which is capable of isochronous transfer, said system comprising:

supply means for repeatedly transmitting image data stored in a storage medium by the isochronous transfer;

reception means for receiving the image data transmitted by the isochronous transfer; and formation means for forming a visual image on a printing medium based on the image data received by said reception means, wherein if the image data received by said reception means includes an abnormal portion, said reception means corrects the abnormal portion by using the image data repeatedly transmitted by the isochronous transfer.

21. The system according to claim 20, wherein each time said reception means has received a predetermined amount of the image data transmitted by the isochronous transfer in predetermined packet units, corresponding to a size of a reception buffer, said reception means supplies the predetermined amount of image data to said formation means.

22. The system according to claim 20, wherein each time said reception means has received a predetermined amount of the image data transmitted by the isochronous transfer in predetermined packet units, corresponding to a unit of image formation of said formation means, said reception means supplies the predetermined amount of image data to said formation means.

23. The system according to claim 20, wherein if said supply means transmits coded image data by the isochronous transfer, said supply means transmits a decoding program corresponding to a coding method of the coded image data prior to transmission of the coded image data.

24. The system according to claim 23, further comprising decoding means for decoding the coded image data received by said reception means, based on the decoding program received by said reception means.

25. The system according to claim 23, wherein the decoding program is transmitted by asynchronous transfer.

26. The system according to claim 25, wherein the asynchronous transfer is adapted to or based on the IEEE 1394 standards.

27. The system according to claim 20, wherein the serial bus is a bus adapted to or based on the IEEE 1934 standards.

28. The system according to claim 20, wherein the isochronous transfer is adapted to or based on the IEEE 1394 standards.

29. An image processing method for devices connected by a serial bus which is capable of isochronous transfer, said method comprising the steps of:

repeatedly transmitting image data stored in a storage medium by the isochronous transfer;

receiving the image data transmitted by the isochronous transfer;

if the image data received at said reception step includes an abnormal portion, correcting the abnormal portion by using the image data repeatedly transmitted by the isochronous transfer; and forming a visual image on a printing medium based on the image data received at said reception step.

30. An information processing apparatus connected to at least one device through a serial bus which is capable of isochronous transfer, said apparatus comprising:

reception means for receiving data repeatedly transmitted by the isochronous transfer; and correction means for, if the data received by said reception means includes an abnormal portion, correcting the abnormal portion by using the data repeatedly transmitted by the isochronous transfer.

31. The apparatus according to claim 30, further comprising output means for outputting the data received by said reception means to a printer.

32. The apparatus according to claim 31, wherein the printer is an ink-jet printer.

33. The apparatus according to claim 30, wherein the serial bus is a bus adapted to or based on the IEEE 1394 standards.

34. The apparatus according to claim 30, wherein the isochronous transfer is adapted to or based on the IEEE 1394 standards.

35. An information processing method for an apparatus connected to at least one device through a serial bus which is capable of isochronous transfer, said method comprising the steps of:

receiving data repeatedly transmitted by the isochronous transfer; and if the data received at said reception step includes an abnormal portion, correcting the abnormal portion by using the data repeatedly transmitted by the isochronous transfer.

36. An information processing apparatus connected to at least one device through a serial bus which is capable of isochronous transfer, said apparatus comprising:

reception means for receiving data repeatedly transmitted by the isochronous transfer; and output means for outputting the data received by said reception means to a printer, wherein said reception means receives the data repeatedly transmitted by the isochronous transfer, in a unit corresponding to a capability of the printer.

37. The apparatus according to claim 36, wherein the printer is an ink-jet printer.

38. The apparatus according to claim 36, wherein if said reception means receives coded data, said reception means receives a decoding program corresponding to a coding method of the coded data prior to reception of the coded data.

39. The apparatus according to claim 38, further comprising decoding means for decoding the coded data received by said reception means, based on the decoding program received by said reception means.

40. The apparatus according to claim 38, wherein the decoding program is transferred by asynchronous transfer.

41. The apparatus according to claim 40, wherein the asynchronous transfer is adapted to or based on the IEEE 1394 standards.

42. The apparatus according to claim 36, wherein the serial bus is a bus adapted to or based on the IEEE 1394 standards.

43. The apparatus according to claim 36, wherein the isochronous transfer is adapted to or based on the IEEE 1394 standards.

44. An information processing method for an apparatus connected to at least one device through a serial bus which is capable of isochronous transfer, said method comprising:

receiving data repeatedly transmitted by the isochronous transfer, in a unit corresponding to a capability of a printer as a receiver of the data; and outputting the data received at said reception step to the printer.

45. A computer program product comprising a computer readable medium having computer program codes, for executing information processing for devices connected by a serial bus which is capable of isochronous transfer, said product comprising:

transmission process procedure codes for repeatedly transmitting data stored in a storage medium by the isochronous transfer;

reception process procedure codes for receiving the data transmitted by the isochronous transfer; and correction process procedure codes for, if the data received at said reception process includes an abnormal portion, correcting the abnormal portion by using the data repeatedly transmitted by the isochronous transfer.

46. A computer program product comprising a computer readable medium having computer program codes, for executing information processing for devices connected by a serial bus which is capable of isochronous transfer, said product comprising:

transmission process procedure codes for repeatedly transmitting data stored in a storage medium by the isochronous transfer;

reception process procedure codes for receiving the data repeatedly transmitted by the isochronous transfer, in a unit corresponding to a capability of a printer as a receiver of the data; and output process procedure codes for outputting the data received at said reception process to the printer.

47. A computer program product comprising a computer readable medium having computer program codes, for executing image processing for devices connected by a serial bus which is capable of isochronous transfer, said product comprising:

transmission process procedure codes for repeatedly transmitting image data stored in a storage medium by the isochronous transfer;

reception process procedure codes for receiving the image data transmitted by the isochronous transfer;

correction process procedure codes for, if the image data received at said reception process includes an abnormal portion, correcting the abnormal portion by using the image data repeatedly transmitted by the isochronous transfer; and formation process procedure codes for forming a visual image on a recording medium based on the image data received at said reception process.

48. A computer program product comprising a computer readable medium having computer program codes, for executing information processing for an apparatus connected to at least one device through a serial bus which is capable of isochronous transfer, said product comprising:

reception process procedure codes for receiving data repeatedly transmitted by the isochronous transfer; and correction process procedure codes for, if the data received at said reception process includes an abnormal portion, correcting the abnormal portion by using the data repeatedly transmitted by the isochronous transfer.

49. A computer program product comprising a computer readable medium having computer program codes, for executing information processing for an apparatus connected to at least one device through a serial bus which is capable of isochronous transfer, said product comprising:

reception process procedure codes for receiving data repeatedly transmitted by the isochronous transfer, in a unit corresponding to a capability of a printer as a receiver of the data; and output process procedure codes for outputting the data received at said reception process to a printer.

50. A data communication method for transmitting print data from a host to a printing apparatus by isochronous transmission, comprising the steps of:

causing said host to transmit the print data, which has been converted to a print data structure that is in accordance with said printing apparatus, in data block units by isochronous transmission in conformity with the functions of said printing apparatus; and if an error occurs in a data block in isochronous packet transmission thereof after the data block is transmitted, storing error information relating to the error in said printing apparatus, and sending back the error information from said printing apparatus to said host by isochronous transmission when transmission of the next data block starts.

51. The method according to claim 50, wherein said printing apparatus prints as blank data the print data of a data block in which the error occurred, and performs printing again using the print data of the data block in which the error occurred taken from a data block re-transmitted by said host on the basis of the error information sent back to said host, thereby causing printing to recover from said error.

52. The method according to claim 50, wherein said printing apparatus performs printing by multiple passes, and said host, on the basis of the error information, superimposes print data of a data block lost due to error on the corresponding data block of print data to be printed by the next pass of the printing apparatus, and transmits the resulting data to said printing apparatus.

53. A data communication apparatus for transmitting print data to a printing apparatus in order that the print data will be printed, comprising:

data converting means for creating print data that has been converted to a print data structure that is in accordance with said printing apparatus;

transmitting means for transmitting the print data in data block units by isochronous transmission in conformity with the functions of said printing apparatus; and re-transmitting means which, if occurrence of an error in a data block in isochronous packet transmission thereof is transmitted from said printing apparatus after the data block is transmitted by said transmitting means, is for re-transmitting the data block to said printing apparatus.

54. The apparatus according to claim 53, further comprising data transmission control means for superimposing print data of the data block in which the error occurred, which data corresponds to multiple-pass printing in said printing apparatus, on the corresponding data block of print data to be printed by the next pass of the printing apparatus, and transmitting the resulting data to said printing apparatus.

55. A printing apparatus for receiving and printing print data sent from a host by isochronous transmission, comprising:

sensing means for sensing occurrence of an error in isochronous packet transmission of the print data when the print data is received;

storing means for storing error information relating to the error sensed by said sensing means;

printing means for printing the print data leaving blank the location of an error sensed by said sensing means;

re-transmission requesting means for issuing a data re-transmission request to said host in response to occurrence of the error;

discriminating means for discriminating, in print data re-transmitted from said host in response to the re-transmission request from said re-transmission requesting means, and on the basis of the error information stored in said storing means, a portion of the print data that corresponds to the location of the error; and printing control means for printing the error of the location using the portion of the print data discriminated by said discriminating means.

56. The apparatus according to claim 55, wherein the print data transmitted from said host corresponds to drive data for driving a printhead a single time.

57. A printing system for transmitting print data from a host to a printing apparatus by isochronous transmission, wherein said host transmits the print data, which has been converted to a print data structure that is in accordance with said printing apparatus, in data block units by isochronous transmission in conformity with the functions of said printing apparatus; and said printing apparatus includes:

sensing means for sensing occurrence of an error in isochronous packet transmission of the print data when the print data is received;

storing means for storing error information relating to the error sensed by said sensing means;

printing means for printing the print data leaving blank the location of an error sensed by said sensing means;

re-transmission requesting means for issuing a data re-transmission request to said host in response to occurrence of the error;

discriminating means for discriminating, in print data re-transmitted from said host in response to the re-transmission request from said re-transmission requesting means, and on the basis of the error information stored in said storing means, a portion of the print data that corresponds to the location of the error; and printing control means for printing the error of the location using the portion of the print data discriminated by said discriminating means.

58. The system according to claim 57, wherein said printing apparatus prints as blank data the print data of a data block in which the error occurred, and performs printing again using the print data of the data block in which the error occurred taken from a data block re-transmitted by said host on the basis of the error information sent back to said host, thereby causing printing to recover from said error.

59. A printing system for transmitting print data from a host to a printing apparatus by isochronous transmission, wherein said printing apparatus includes:

sensing means for sensing occurrence of an error in isochronous packet transmission of the print data when the print data is received;

printing means for executing printing by multiple passes based upon the print data, and printing the print data leaving blank the location of an error sensed by said sensing means;

re-transmission requesting means for issuing a data re-transmission request to said host in response to occurrence of the error; and discriminating means for discriminating, in print data re-transmitted from said host in response to the re-transmission request from said re-transmission requesting means, and on the basis of the error information stored in said storing means, a portion of the print data that corresponds to the location of the error; and said hold includes:

transmitting means for transmitting the print data, which has been converted to a print data structure that is in accordance with said printing apparatus, in data block units by isochronous transmission in conformity with the functions of said printing apparatus; and data transmitting means for creating and transmitting print data in response to the re-transmission request issued by said re-transmission requesting means, wherein the print data is obtained by superimposing a data block, in which the error has occurred, on print data to be printed by the next pass of said printing apparatus.

* * * * *

UNITED STATES PATENT AND TRADEMARK OFFICE
CERTIFICATE OF CORRECTION

PATENT NO. : 6,018,816

DATED : January 25, 2000

INVENTOR(S) : JIRO TATEYAMA

It is certified that error appears in the above-identified patent and that said Letters Patent is hereby corrected as shown below:

COLUMN 10

Line 62, ""par-"" should read --"Par-"--.

COLUMN 12

Line 29, "the link layer 812," ($2^{nd}$ occurrence) should be deleted.

COLUMN 14

Line 26, "an" should read --a--.

COLUMN 25

Line 38, "(image)data" should read --(image) data--.

COLUMN 26

Line 63, "corrects" should read --correct--.

UNITED STATES PATENT AND TRADEMARK OFFICE
CERTIFICATE OF CORRECTION

PATENT NO. : 6,018,816

DATED : January 25, 2000

INVENTOR(S) : JIRO TATEYAMA

It is certified that error appears in the above-identified patent and that said Letters Patent is hereby corrected as shown below:

COLUMN 28

Line 50, "125 s" should read --125 $\alpha$ s--.

COLUMN 36

Line 61, "1934" should read --1394--.

Signed and Sealed this

Thirteenth Day of February, 2001

Attest:

NICHOLAS P. GODICI

Attesting Officer    Acting Director of the United States Patent and Trademark Office